United States Patent
Kim et al.

(10) Patent No.: US 12,389,241 B2
(45) Date of Patent: Aug. 12, 2025

(54) ELECTRONIC DEVICE FOR PERFORMING NETWORK MANAGEMENT OPERATION AND OPERATING METHOD THEREOF

(71) Applicant: Samsung Electronics Co., Ltd., Gyeonggi-do (KR)

(72) Inventors: Seokhyun Kim, Gyeonggi-do (KR); Namjin Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 458 days.

(21) Appl. No.: 17/835,377

(22) Filed: Jun. 8, 2022

(65) Prior Publication Data

US 2023/0007510 A1    Jan. 5, 2023

Related U.S. Application Data

(63) Continuation of application No. PCT/KR2022/006646, filed on May 10, 2022.

(30) Foreign Application Priority Data

Jul. 2, 2021 (KR) .................. 10-2021-0086905

(51) Int. Cl.
*H04W 24/04* (2009.01)
*H04W 8/24* (2009.01)
(Continued)

(52) U.S. Cl.
CPC ............. *H04W 24/04* (2013.01); *H04W 8/24* (2013.01); *H04W 60/00* (2013.01); *H04W 88/08* (2013.01)

(58) Field of Classification Search
CPC ....... H04W 24/04; H04W 8/24; H04W 60/00; H04W 88/08; H04W 60/04; H04W 4/70; H04W 88/18; H04W 88/06; H04L 41/16
See application file for complete search history.

(56) References Cited

U.S. PATENT DOCUMENTS

2005/0135236 A1    6/2005  Benson et al.
2012/0254022 A1   10/2012  Kimura et al.
(Continued)

FOREIGN PATENT DOCUMENTS

CN    105578467 A    5/2016
CN    107517477 A   12/2017
(Continued)

OTHER PUBLICATIONS

International Search Report dated Sep. 28, 2022.
Extended European Search Report dated Sep. 23, 2024.

*Primary Examiner* — Ayaz R Sheikh
*Assistant Examiner* — Mang Boi Thawng
(74) *Attorney, Agent, or Firm* — Cha & Reiter, LLC.

(57) ABSTRACT

According to certain embodiments, an electronic device, comprises: a communication circuit; and at least one processor operatively connected with the communication circuit, wherein the at least one processor is configured to: transmit, to a server through the communication circuit, a registration request message including information indicating that it is possible for the electronic device to perform an access point (AP) operation, receive, from the server through the communication circuit, an AP operation command message commanding to perform an AP operation and including access information of an AP in which a failure state has occurred, and perform the AP operation which is based on the access information of the AP.

6 Claims, 16 Drawing Sheets

(51) Int. Cl.
  *H04W 60/00*  (2009.01)
  *H04W 88/08*  (2009.01)

(56) References Cited

U.S. PATENT DOCUMENTS

| | | | |
|---|---|---|---|
| 2014/0328257 A1 | 11/2014 | Kamlani | |
| 2015/0195365 A1 | 7/2015 | Choi et al. | |
| 2016/0134613 A1* | 5/2016 | Rong | H04L 63/08 |
| | | | 726/7 |
| 2018/0295662 A1* | 10/2018 | Kang | H04W 76/15 |
| 2019/0149443 A1 | 5/2019 | Gunasekara et al. | |
| 2019/0320407 A1* | 10/2019 | Goyal | H04L 41/5058 |
| 2020/0068658 A1* | 2/2020 | Lee | H04W 48/12 |
| 2020/0196366 A1* | 6/2020 | Ahn | H04W 76/15 |
| 2020/0329414 A1 | 10/2020 | Talukdar et al. | |
| 2021/0127261 A1* | 4/2021 | Helms | H04W 12/084 |

FOREIGN PATENT DOCUMENTS

| | | | |
|---|---|---|---|
| JP | 2005-242845 A | 9/2005 | |
| JP | 2008-48224 A | 2/2008 | |
| JP | 2021-087162 A | 6/2021 | |
| KR | 10-2005-0000115 A | 1/2005 | |
| KR | 10-2012-0060534 A | 6/2012 | |
| KR | 10-1590746 B1 | 2/2016 | |
| KR | 10-2018-0096130 A | 8/2018 | |
| KR | 10-2021-0000976 A | 1/2021 | |
| KR | 10-2213325 B1 | 2/2021 | |
| WO | WO2019/229980 Y1 | 12/2019 | |

* cited by examiner

ELECTRONIC DEVICE FOR PERFORMING NETWORK MANAGEMENT OPERATION AND OPERATING METHOD THEREOF

CROSS-REFERENCE TO RELATED APPLICATION(S)

This application is a bypass continuation application of International Application No. PCT/KR2022/006646, which was filed on May 10, 2022, and is based on and claims priority under 35 U.S.C. § 119 to Korean Patent Application No. 10-2021-0086905, filed on Jul. 2, 2021, in the Korean Intellectual Property Office, the disclosure of which is incorporated by reference herein its entirety.

BACKGROUND

1. Field

Certain embodiments of the disclosure relate to an electronic device for performing network management operation and an operating method thereof.

2. Description of Related Art

The Internet, which is a human centered connectivity network where humans generate and consume information, is now evolving to the Internet of things (IoT) network where distributed entities, such as things, exchange and process information. The Internet of everything (IoE) technology may be an example in which a bigdata processing technology through connection with a cloud server is combined with the IoT technology.

As technology elements, such as a sensing technology, a wired/wireless communication and network infrastructure, a service interface technology, and a security technology have been demanded for IoT implementation, a sensor network, a machine-to-machine (M2M) communication, machine type communication (MTC), and so forth have been recently researched.

Such an IoT environment may provide intelligent Internet technology (IT) services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing IT and various industrial applications.

The above information is presented as background information only to assist with an understanding of the disclosure. No determination has been made, and no assertion is made, as to whether any of the above might be applicable as prior art with regard to the disclosure.

SUMMARY

According to certain embodiments, an electronic device, comprises a communication circuit; and at least one processor operatively connected with the communication circuit, wherein the at least one processor is configured to: transmit, to a server through the communication circuit, a registration request message including information indicating that it is possible for the electronic device to perform an access point (AP) operation, receive, from the server through the communication circuit, an AP operation command message commanding to perform an AP operation and including access information of an AP in which a failure state has occurred, and perform the AP operation which is based on the access information of the AP.

According to certain embodiments, an electronic device, comprises: a communication circuit; and at least one processor operatively connected with the communication circuit, wherein the at least one processor is configured to: transmit, to an external electronic device through the communication circuit, a registration mode switch request message requesting to switch an operation mode of the external electronic device to a registration mode to register the external electronic device capable of performing an access point (AP) operation at a server, receive, from the server through the communication circuit, an AP mode authority request message requesting authority for switching to an AP mode in which the external electronic device performs the AP operation, and transmit, to the server through the communication circuit, an AP mode authority response message including information indicating whether the authority request is accepted, in response to receiving the AP mode authority request message.

According to certain embodiments, an electronic device, comprises a communication circuit; and at least one processor operatively connected with the communication circuit, wherein the at least one processor is configured to: transmit, to an access point (AP) through the communication circuit, an access request message including access information of the AP, receive, from the AP through the communication circuit, an access response message in response to the access request message, and transmit, to the AP through the communication circuit, a registration request message for registering the electronic device at a server, wherein the registration request message includes device information for identifying the electronic device and accessed AP information indicating an AP that the electronic device accesses.

According to certain embodiments, a server, comprises: a communication circuit; and at least one processor operatively connected with the communication circuit, wherein the at least one processor is configured to: detect that a failure state has occurred in an access point (AP), select at least one electronic device among electronic devices capable of performing an AP operation as a temporary AP which will perform an AP operation instead of the AP, and transmit, through the communication circuit, an AP operation command message commanding to perform an AP operation, wherein the AP operation command message includes access information of the AP to the selected at least one electronic device.

DETAILED DESCRIPTION

Figure 1:
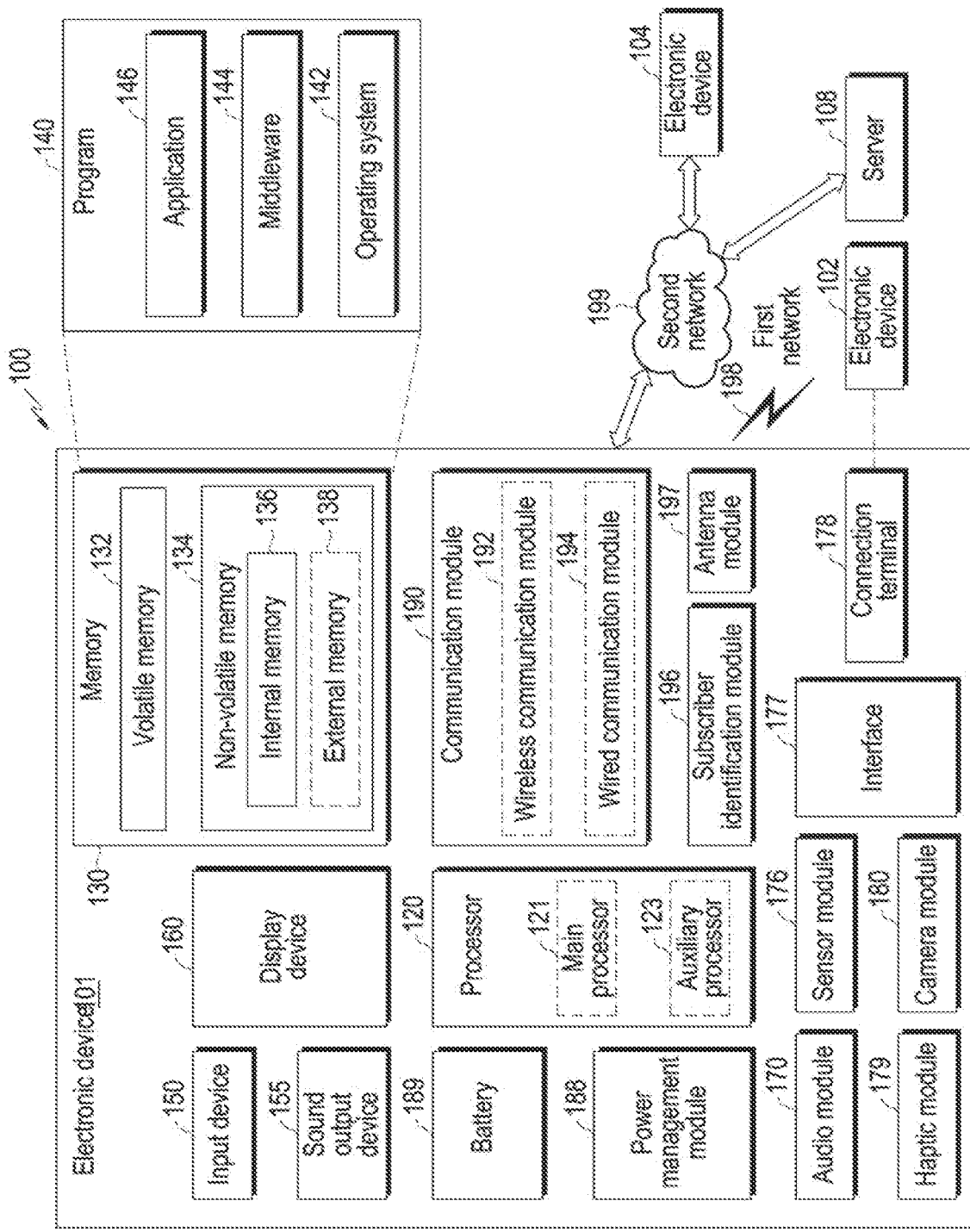
FIG. 1 is a block diagram illustrating an electronic device in a network environment according to certain embodiments.

Hereinafter, certain embodiments of the disclosure will be described in detail with reference to the accompanying drawings. In the following description of certain embodiments of the disclosure, a detailed description of relevant known functions or configurations incorporated herein will be omitted when it is determined that the description may make the subject matter of certain embodiments of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

It should be noted that the technical terms used herein are only used to describe specific embodiments, and are not intended to limit the disclosure. Alternatively, the technical terms used herein should be interpreted to have the same meaning as those commonly understood by a person skilled in the art to which the disclosure pertains, and should not be interpreted have excessively comprehensive or excessively restricted meanings unless particularly defined as other meanings. Alternatively, when the technical terms used herein are wrong technical terms that cannot correctly represent the idea of the disclosure, it should be appreciated that they are replaced by technical terms correctly understood by those skilled in the art. Alternatively, the general terms used herein should be interpreted as defined in dictionaries or interpreted in the context of the relevant part, and should not be interpreted to have excessively restricted meanings.

Alternatively, a singular expression used herein may include a plural expression unless they are definitely different in the context. As used herein, such an expression as "comprises" or "include", or the like should not be interpreted to necessarily include all elements or all operations described in the specification, and should be interpreted to be allowed to exclude some of them or further include additional elements or operations.

Alternatively, the terms including an ordinal number, such as expressions "a first" and "a second" may be used to described various elements, but the corresponding elements should not be limited by such terms. These terms are used merely to distinguish between one element and any other element. For example, a first element may be termed a second element, and similarly, a second element may be termed a first element without departing from the scope of the disclosure.

It should be understood that when an element is referred to as being "connected" or "coupled" to another element, it may be connected or coupled directly to the other element, or any other element may be interposer between them. In contrast, it should be understood that when an element is referred to as being "directly connected" or "directly coupled" to another element, there are no element interposed between them.

Hereinafter, certain embodiments of the disclosure will be described in detail with reference to the accompanying drawings. Regardless of drawing signs, the same or like elements are provided with the same reference numeral, and a repeated description thereof will be omitted. Alternatively, in describing certain embodiments of the disclosure, a detailed description of relevant known technologies will be omitted when it is determined that the description may make the subject matter of the disclosure unclear. Alternatively, it should be noted that the accompanying drawings are presented merely to help easy understanding of the technical idea of the disclosure, and should not be construed to limit the technical idea of the disclosure. The technical idea of the disclosure should be construed to cover all changes, equivalents, and alternatives, in addition to the drawings.

In an internet of things (IoT) network which is based on an IoT standard, e.g., an open connectivity foundation (OCF) standard, an IoT device may operate in a soft access point (Soft-AP) mode through a separate application (APP). The IoT device operating in the Soft-AP mode may perform an access point (AP) operation, so neighbor IoT devices may access a network through the IoT device operating in the Soft-AP mode.

The IoT device may receive information about a Wi-Fi device, e.g., an AP, to which the IoT device may connect, and may be connected to a cloud server based on the received information about the AP. In this way, while the IoT device is connected to the cloud server through the AP, if the information about the AP to which the IoT device is connected is changed or the AP to which the IoT device is connected does not operate normally, an electronic device, e.g., a user device (e.g., a smart phone), which manages the IoT device needs to reset the connection of the IoT device and to cause the IoT device to perform a registration procedure with another AP.

Certain embodiments of the disclosure may provide an electronic device for performing a network management operation and an operating method thereof.

Certain embodiments of the disclosure may provide an electronic device which guarantees a network connection through a temporary AP if a failure state occurs in an AP in a wireless communication network, and an operating method thereof.

Hereinafter, a terminal will be described in certain embodiments of the disclosure, but the terminal may be referred to as an electronic device, a mobile station, a mobile equipment (ME), a user equipment (UE), a user terminal (UT), a subscriber station (SS), a wireless device, a handheld device, and an access terminal (AT). Alternatively, in certain embodiments of the disclosure, the terminal may be a device having a communication function such as, for example, a mobile phone, a personal digital assistant (PDA), a smart phone, a wireless MODEM, and a notebook.

In a detailed description of certain embodiments of the disclosure, an internet of things (IoT) standard specified by Open Connectivity Foundation (OCF) is referred to, but the main subject of the disclosure can be somewhat modified and applied to other communication systems having a similar technical background without departing from the scope of the disclosure, and the modifications can be made on the basis of determination of those skilled in the art.

FIG. 1 is a block diagram illustrating an electronic device 101 in a network environment 100 according to certain embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "$1^{st}$" and "$2^{nd}$," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with certain embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 2:
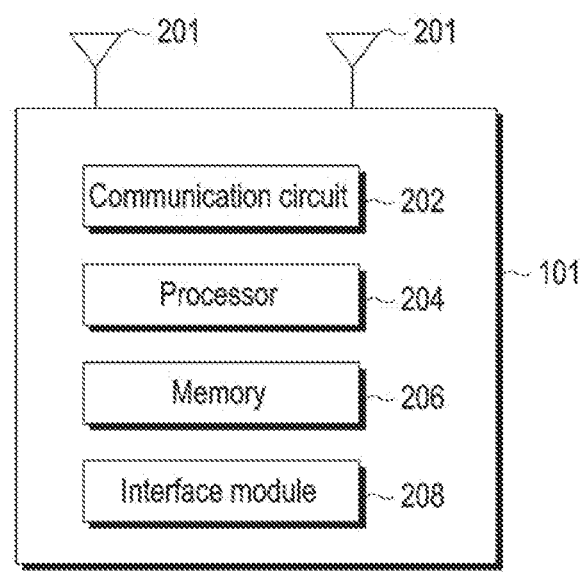
FIG. 2 is a block diagram of an electronic device according to certain embodiments.

FIG. 2 is a block diagram of an electronic device 101 according to certain embodiments.

Referring to FIG. 2, an electronic device (e.g., an electronic device 101 in FIG. 1) may be a device implementing a BLE scheme.

The electronic device 101 may include a communication circuit 202 (e.g., a communication module 190 in FIG. 1) which transmits and receives signals with an external electronic device (e.g., an electronic device 102 or 104 in FIG. 1), for example, a peer device by using one or more antennas 201. The communication circuit 202 may include a transceiver, a radio front end, filters, and oscillators and amplifiers.

The electronic device 101 may include a processor 204 (e.g., a processor 120 in FIG. 1) which may be implemented in one or more single-core processors or one or more multi-core processors, and a memory 206 (e.g., a memory 130 in FIG. 1) which stores instructions that may be executed by the processor 204 for operation of the electronic device 101. The term "processor" shall be understood to refer to both the singular and plural contexts.

The electronic device 101 may include an interface module 208 (e.g., an interface 177 in FIG. 1) which provides a wired and/or wireless interface for communicating with components outside a network. At least a portion of the one or more antennas 201, the communication circuit 202, or the interface module 208 may be implemented as, for example, at least a portion of the communication module 190 and the antenna module 198 in FIG. 1.

The electronic device 101 may include a plurality of communication circuits, one of the plurality of communication circuits may be a communication circuit which is based on a Wi-Fi scheme, and another of the plurality of communication circuits may be a communication circuit which is based on a Bluetooth scheme, e.g., a BLE scheme. According to an embodiment, the plurality of communication circuits may include a communication circuit 202, and the communication circuit 202 may be a communication circuit which is based on the Wi-Fi scheme or a communication circuit which is based on the BLE scheme.

The electronic device 101 does not separately include a communication circuit which is based on the Wi-Fi scheme and a communication circuit which is based on the BLE scheme, and may include one communication circuit capable of supporting both the Wi-Fi scheme and the BLE scheme. For example, the communication circuit 202 may be the one communication circuit capable of supporting both the Wi-Fi scheme and the BLE scheme.

An electronic device (an AP-possible device 620 in FIG. 6 or FIG. 7, a sixth electronic device 850 or a seventh electronic device 860 in FIG. 8 or FIGS. 9A and 9B, or the sixth electronic device 850, the seventh electronic device 860, or an eighth electronic device 1060 in FIGS. 10A and 10B) may comprise a communication circuit 202, and at least one processor 204 operatively connected with the communication circuit 202. The at least one processor 204 may be configured to: transmit, to a server (a cloud server 630 in FIG. 6 or FIG. 7, or a cloud server 840 in FIG. 8, FIGS. 9A and 9B, or FIGS. 10A and 10B) through the communication circuit 202, a registration request message including information indicating whether it is possible for the electronic device (the AP-possible device 620 in FIG. 6 or FIG. 7, the sixth electronic device 850 or the seventh electronic device 860 in FIG. 8 or FIGS. 9A and 9B, or the sixth electronic device 850, the seventh electronic device 860, or the eighth electronic device 1060 in FIGS. 10A and 10B) to perform an access point (AP) operation, receive, from the server (the cloud server 630 in FIG. 6 or FIG. 7, or the cloud server 840 in FIG. 8, FIGS. 9A and 9B, or FIGS. 10A and 10B) through the communication circuit 202, an AP operation command message commanding to perform an AP operation and including access information of an AP (an AP 830 in FIG. 8, FIGS. 9A and 9B, or FIGS. 10A and 10B) in which a failure state has occurred, and perform the AP operation which is based on the access information of the AP (the AP 830 in FIG. 8, FIGS. 9A and 9B, or FIGS. 10A and 10B).

The at least one processor 204 may be further configured to: receive, from the server (the cloud server 630 in FIG. 6 or FIG. 7, or the cloud server 840 in FIG. 8, FIGS. 9A and 9B, or FIGS. 10A and 10B) through the communication circuit 202, an AP operation termination message commanding to terminate the AP operation while performing the AP operation, and based on the AP operation termination message, terminate the AP operation which is based on the access information of the AP (the AP 830 in FIG. 8, FIGS. 9A and 9B, or FIGS. 10A and 10B).

Figure 6:
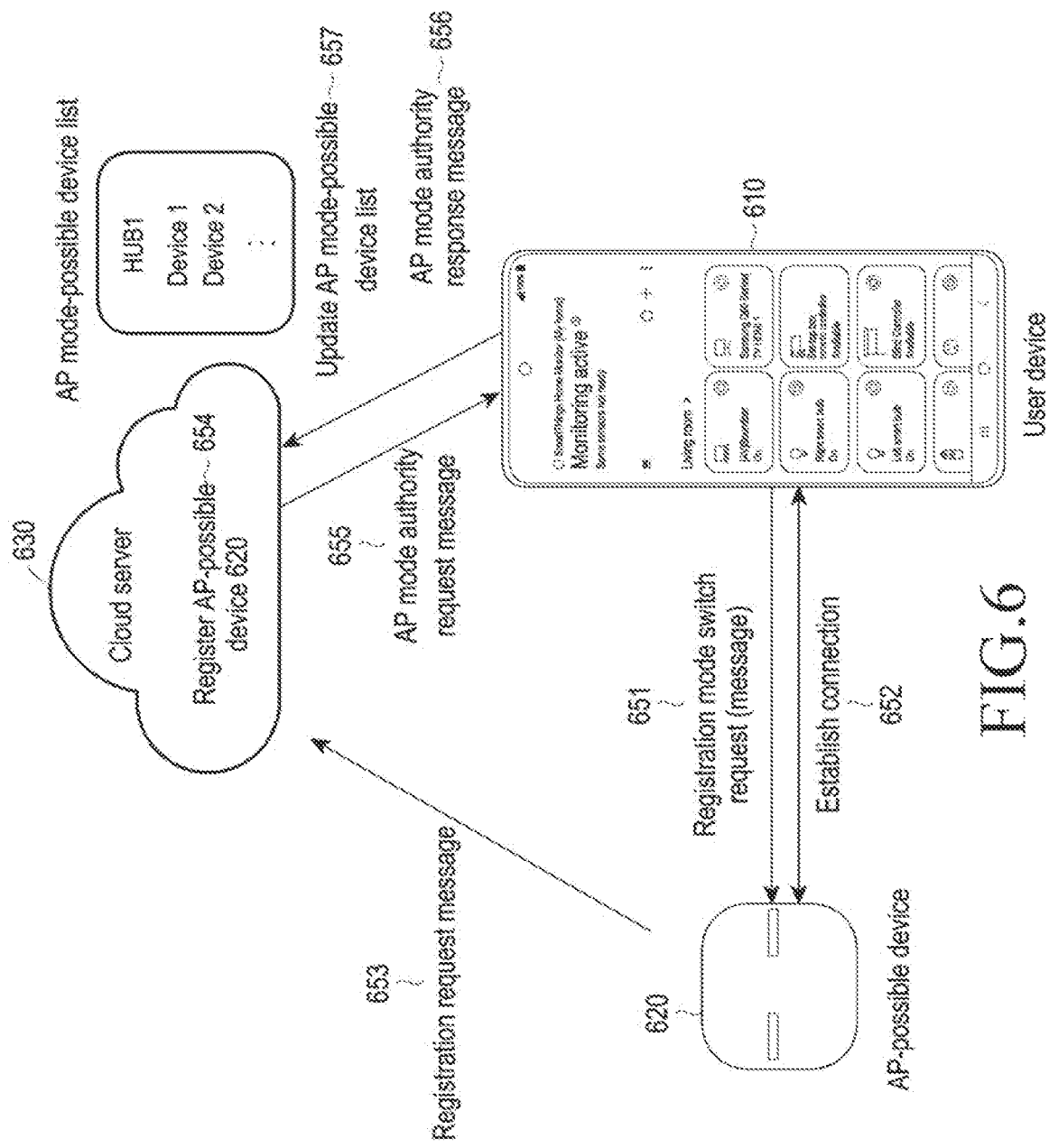
FIG. 6 is a diagram schematically illustrating a registration procedure of an AP-possible device in a wireless communication network according to certain embodiments.
Figure 7:
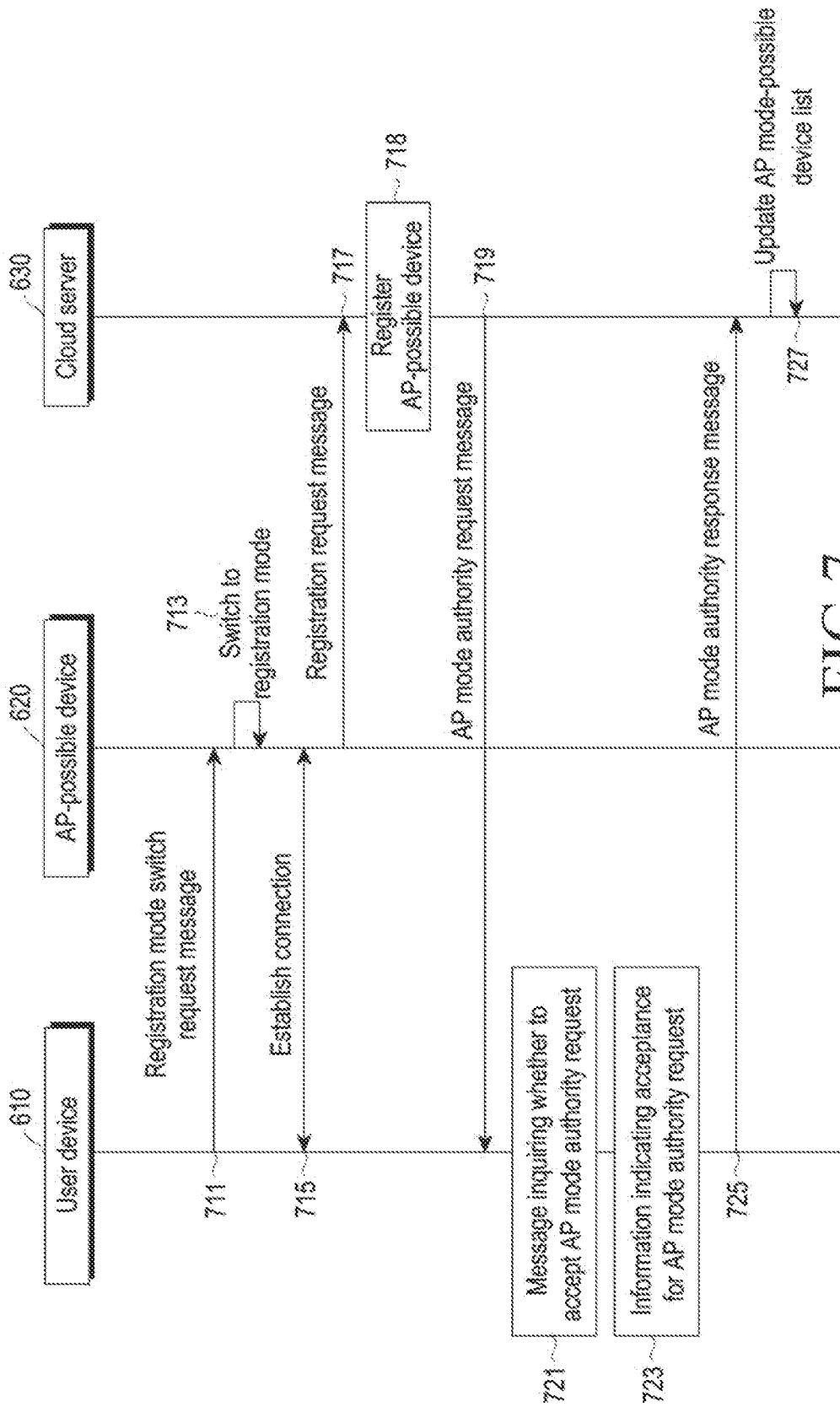
FIG. 7 is a signal flow diagram schematically illustrating a registration procedure of an AP-possible device in a wireless communication network according to certain embodiments.
Figure 8:
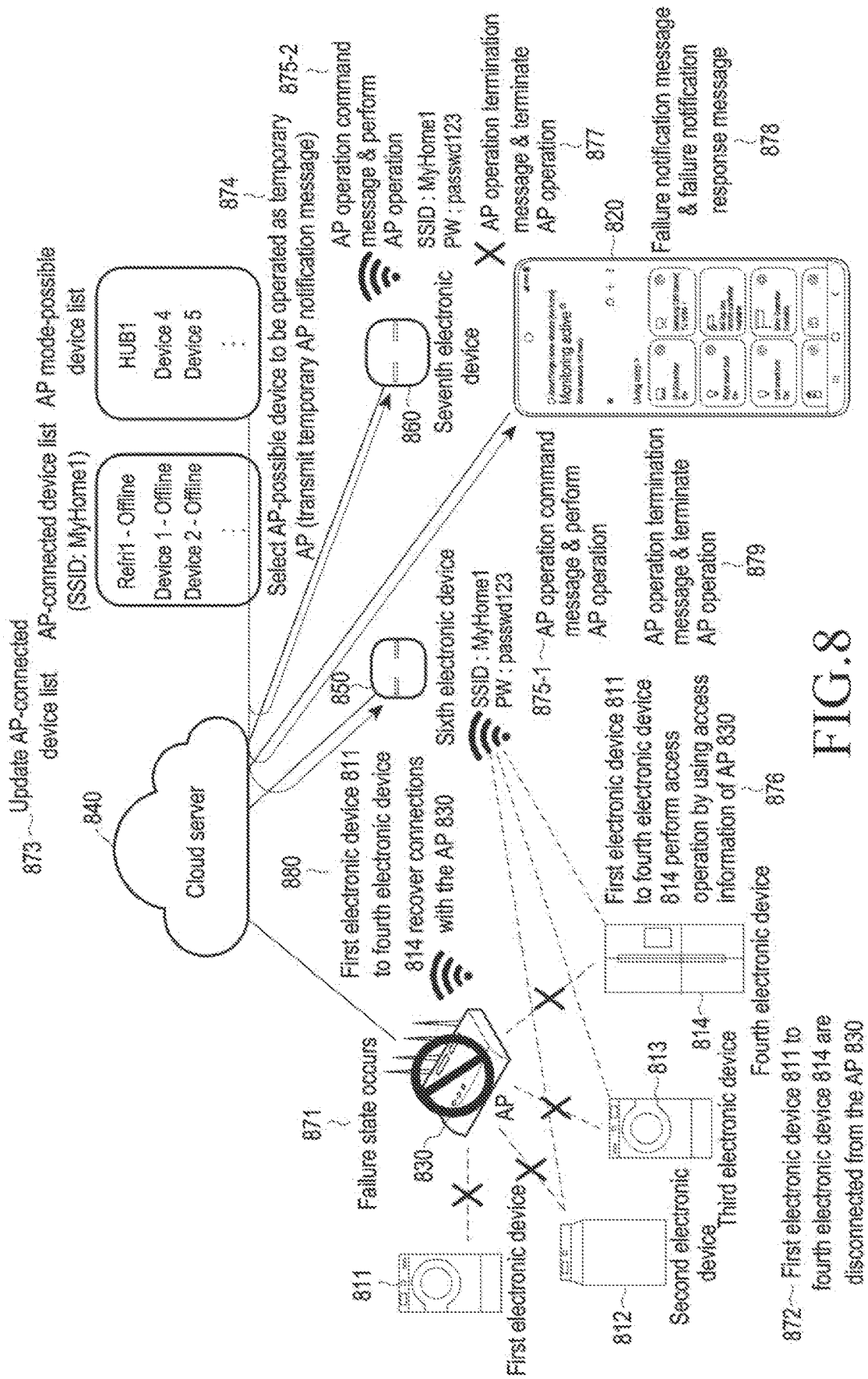
FIG. 8 is a diagram schematically illustrating an example of an AP recovery procedure in a wireless communication network according to certain embodiments.
Figure 9A:
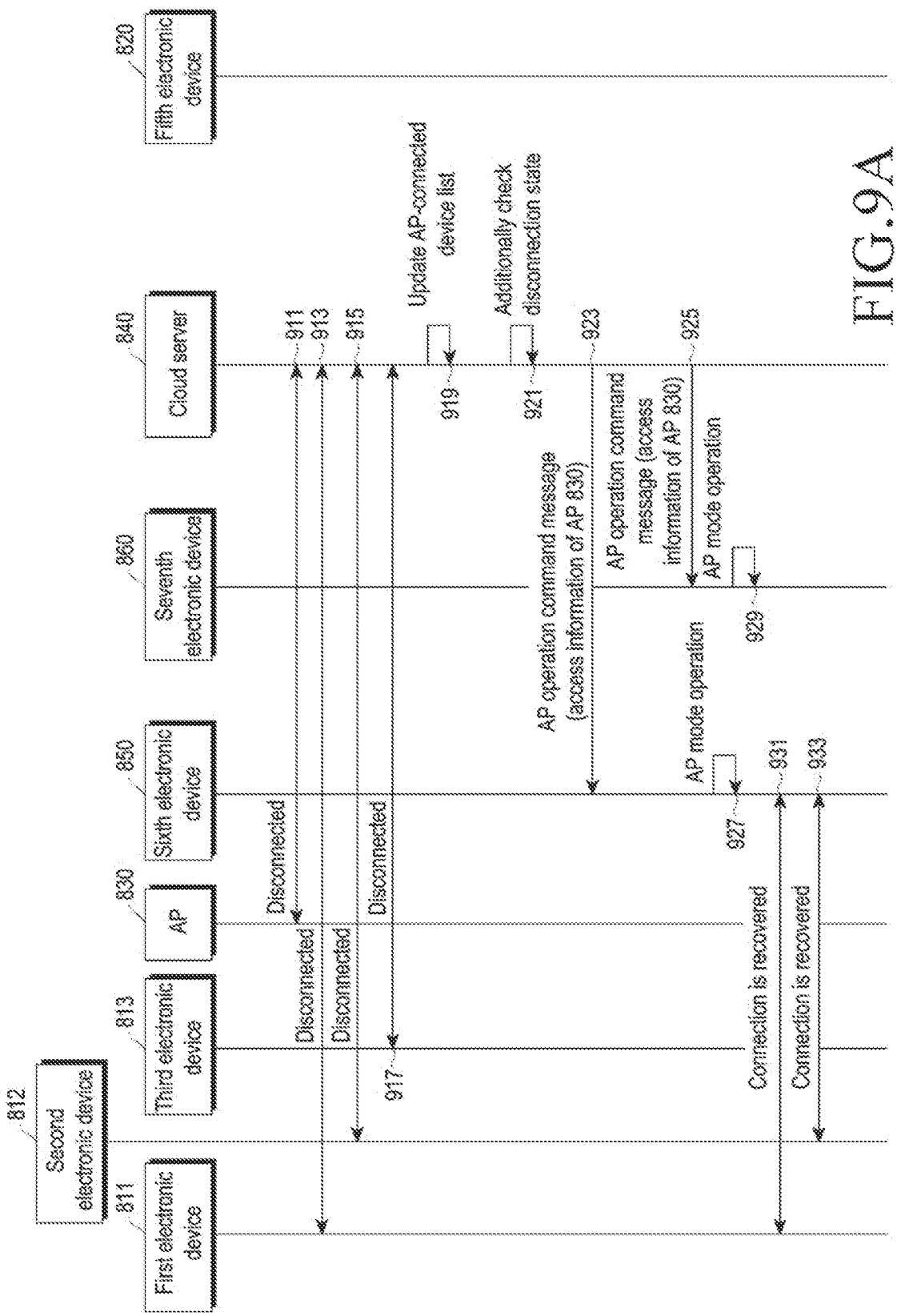
FIGS. 9A and 9B are signal flow diagrams schematically illustrating an example of an AP recovery procedure in a wireless communication network according to certain embodiments.
Figure 9B:
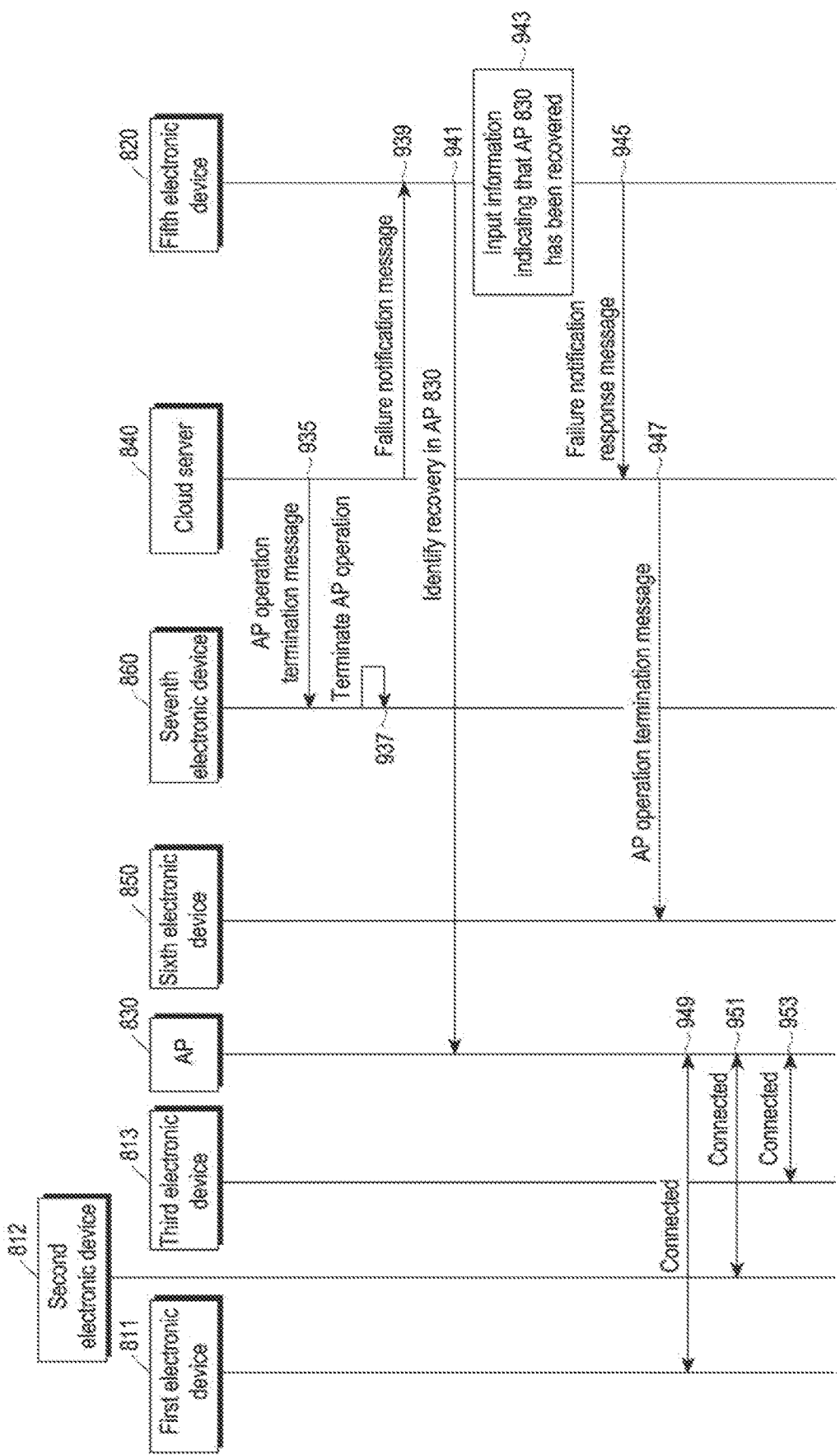
Figure 10A:
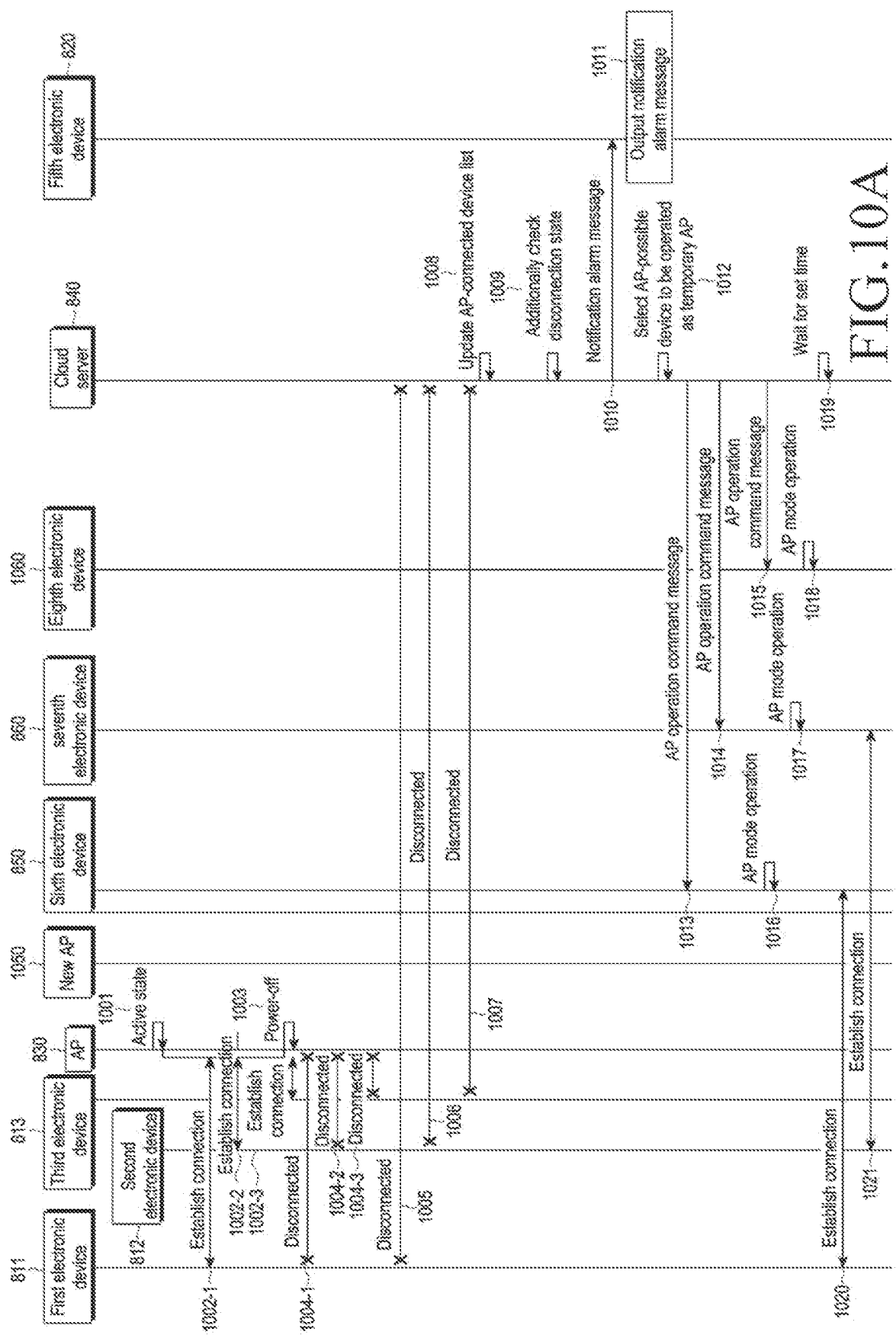
FIGS. 10A and 10B are signal flow diagrams schematically illustrating another example of an AP recovery procedure in a wireless communication network according to certain embodiments.
Figure 10B:
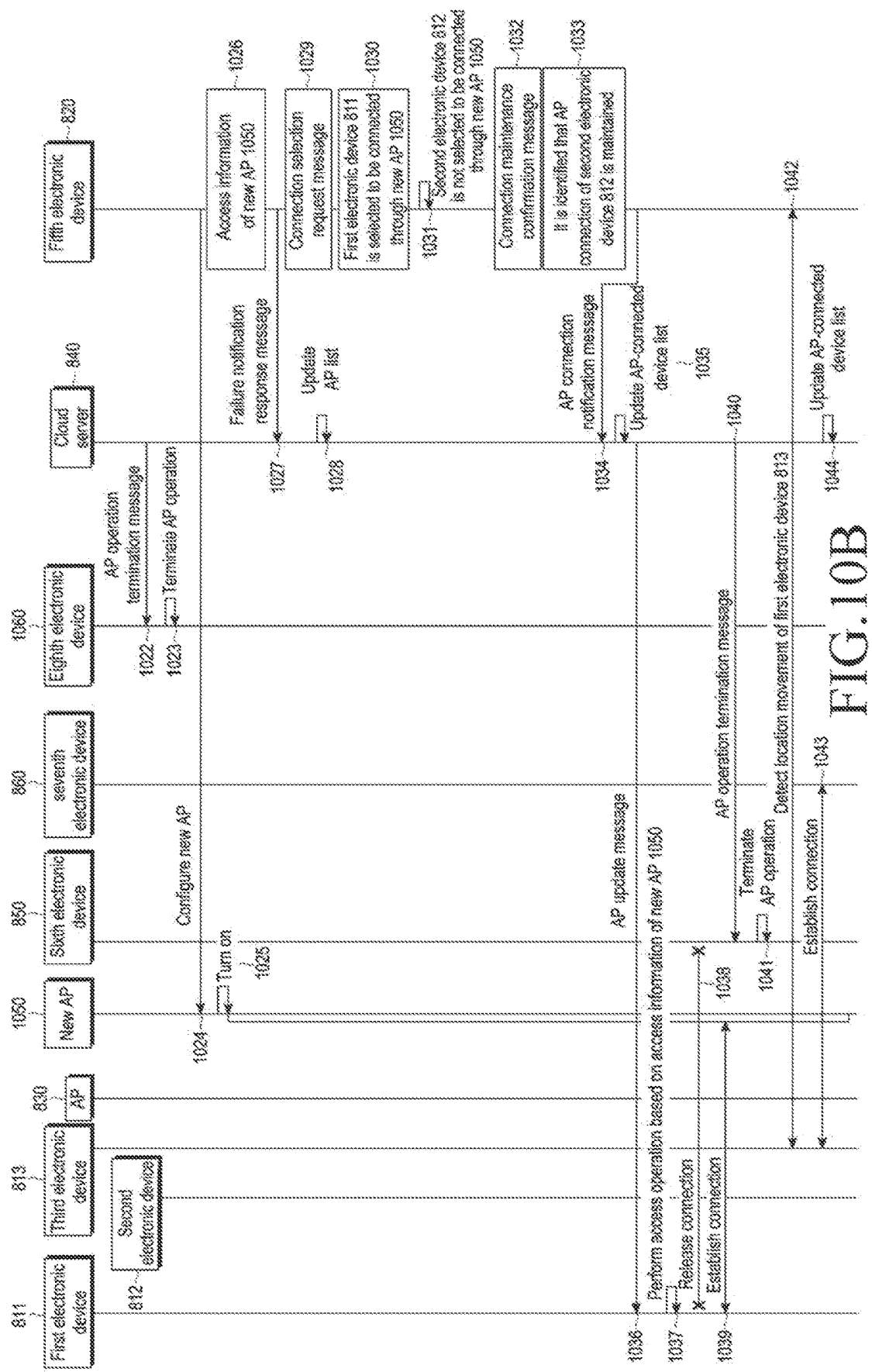

The at least one processor 204 may be further configured to: receive, from the server (the cloud server 630 in FIG. 6 or FIG. 7, or the cloud server 840 in FIG. 8, FIGS. 9A and 9B, or FIGS. 10A and 10B) through the communication circuit 202, a message including access information of another AP (a new AP 1050 in FIGS. 10A and 10B), and transmit, through the communication circuit 202, a message including the access information of the other AP (the new AP 1050 in FIGS. 10A and 10B) to at least one external electronic device (a first electronic device 811, a second electronic device 812, a third electronic device 813, or a fourth electronic device 814 in FIG. 8, the first electronic device 811, the second electronic device 812, or the third electronic device 813 in FIGS. 9A and 9B, or the first electronic device 811, the second electronic device 812, or the third electronic device 813 in FIGS. 10A and 10B) which is connected to the server (the cloud server 630 in FIG. 6 or FIG. 7, or the cloud server 840 in FIG. 8, FIGS. 9A and 9B, or FIGS. 10A and 10B) through the electronic device (the AP-possible device 620 in FIG. 6 or FIG. 7, the sixth electronic device 850 or the seventh electronic device 860 in FIG. 8 or FIGS. 9A and 9B, or the sixth electronic device 850, the seventh electronic device 860, or the eighth electronic device 1060 in FIGS. 10A and 10B).

The at least one processor 204 may be further configured to: after transmitting the message including the access information of the other AP (the new AP 1050 in FIGS. 10A and 10B), terminate the AP operation which is based on the access information of the AP (the AP 830 in FIG. 8, FIGS. 9A and 9B, or FIGS. 10A and 10B).

The at least one processor 204 may be further configured to: receive, from the server (the cloud server 630 in FIG. 6 or FIG. 7, or the cloud server 840 in FIG. 8, FIGS. 9A and 9B, or FIGS. 10A and 10B) through the communication circuit 202, an AP operation termination message commanding to terminate an AP operation, and terminate the AP operation which is based on the access information of the AP (the AP 830 in FIG. 8, FIGS. 9A and 9B, or FIGS. 10A and 10B).

The at least one processor 204 may be configured to: receive, from another external electronic device (a user device 610 in FIG. 6 or 7, or a fifth electronic device 820 in FIG. 8, FIGS. 9A and 9B, or FIGS. 10A and 10B) through the communication circuit 202, a registration mode switch request message requesting to switch an operation mode of the electronic device (the AP-possible device 620 in FIG. 6 or FIG. 7, the sixth electronic device 850 or the seventh electronic device 860 in FIG. 8 or FIGS. 9A and 9B, or the sixth electronic device 850, the seventh electronic device 860, or the eighth electronic device 1060 in FIGS. 10A and 10B) to a registration mode to register the electronic device (the AP-possible device 620 in FIG. 6 or FIG. 7, the sixth electronic device 850 or the seventh electronic device 860 in FIG. 8 or FIGS. 9A and 9B, or the sixth electronic device 850, the seventh electronic device 860, or the eighth electronic device 1060 in FIGS. 10A and 10B) at the server (the cloud server 630 in FIG. 6 or FIG. 7, or the cloud server 840 in FIG. 8, FIGS. 9A and 9B, or FIGS. 10A and 10B), switch the operation mode to the registration mode based on the received registration mode switch request message, and transmit, to the server (the cloud server 630 in FIG. 6 or FIG. 7, or the cloud server 840 in FIG. 8, FIGS. 9A and 9B, or FIGS. 10A and 10B) through the communication circuit 202, the registration request message in the registration mode.

According to certain embodiments of the disclosure, an electronic device (a fifth electronic device 320 in FIG. 3, a fifth electronic device 420 in FIG. 4 or FIG. 5, a user device 610 in FIG. 6 or FIG. 7, or a fifth electronic device 820 in FIG. 8, FIGS. 9A and 9B, or FIGS. 10A and 10B) may comprise a communication circuit 202, and at least one processor 204 operatively connected with the communication circuit 202. The at least one processor 204 may be configured to: transmit, to an external electronic device (an AP-possible device 620 in FIG. 6 or FIG. 7, a sixth electronic device 850 or a seventh electronic device 860 in FIG. 8 or FIGS. 9A and 9B, or the sixth electronic device 850, the seventh electronic device 860, or an eighth electronic device 1060 in FIGS. 10A and 10B) through the communication circuit 202, a registration mode switch request message requesting to switch an operation mode of the external electronic device (the AP-possible device 620 in FIG. 6 or FIG. 7, the sixth electronic device 850 or the seventh electronic device 860 in FIG. 8 or FIGS. 9A and 9B, or the sixth electronic device 850, the seventh electronic device 860, or the eighth electronic device 1060 in FIGS. 10A and 10B) to a registration mode to register the external electronic device (the AP-possible device 620 in FIG. 6 or FIG. 7, the sixth electronic device 850 or the seventh electronic device 860 in FIG. 8 or FIGS. 9A and 9B, or the sixth electronic device 850, the seventh electronic device 860, or the eighth electronic device 1060 in FIGS. 10A and 10B) capable of performing an access point (AP) operation at a server (a cloud server 340 in FIG. 3, a cloud server 440 in FIG. 4, a cloud server 630 in FIG. 6 or FIG. 7, or a cloud server 840 in FIG. 8, FIGS. 9A and 9B, or FIGS. 10A and 10B), receive, from the server (the cloud server 340 in FIG. 3, the cloud server 440 in FIG. 4, the cloud server 630 in FIG. 6 or FIG. 7, or the cloud server 840 in FIG. 8, FIGS. 9A and 9B, or FIGS. 10A and 10B) through the communication circuit 202, an AP mode authority request message requesting authority for switching to an AP mode in which the external electronic device (the AP-possible device 620 in FIG. 6 or FIG. 7, the sixth electronic device 850 or the seventh electronic device 860 in FIG. 8 or FIGS. 9A and 9B, or the sixth electronic device 850, the seventh electronic device 860, or the eighth electronic device 1060 in FIGS. 10A and 10B) performs the AP operation, and transmit, to the server (the cloud server 340 in FIG. 3, the cloud server 440 in FIG. 4, the cloud server 630 in FIG. 6 or FIG. 7, or the cloud server 840 in FIG. 8, FIGS. 9A and 9B, or FIGS. 10A and 10B) through the communication circuit 202, an AP mode authority response message including information indicating whether the authority request is accepted.

In case that the information indicates that the authority request is accepted, the AP mode authority response message may further include information indicating whether it is possible for the external electronic device (the AP-possible device 620 in FIG. 6 or FIG. 7, the sixth electronic device 850 or the seventh electronic device 860 in FIG. 8 or FIGS. 9A and 9B, or the sixth electronic device 850, the seventh electronic device 860, or the eighth electronic device 1060 in FIGS. 10A and 10B) to perform the AP operation.

The at least one processor 204 may be further configured to: receive, from the server (the cloud server 340 in FIG. 3, the cloud server 440 in FIG. 4, the cloud server 630 in FIG. 6 or FIG. 7, or the cloud server 840 in FIG. 8, FIGS. 9A and 9B, or FIGS. 10A and 10B) through the communication circuit 202, a failure notification message indicating that a failure state has occurred in an AP (an AP 830 in FIG. 8, FIGS. 9A and 9B, or FIGS. 10A and 10B) connected to the electronic device (the fifth electronic device 320 in FIG. 3, the fifth electronic device 420 in FIG. 4 or FIG. 5, the user device 610 in FIG. 6 or FIG. 7, or the fifth electronic device 820 in FIG. 8, FIGS. 9A and 9B, or FIGS. 10A and 10B) and checking whether the AP (the AP 830 in FIG. 8, FIGS. 9A and 9B, or FIGS. 10A and 10B) has been recovered or whether to select a new AP (a new AP 1050 in FIGS. 10A and 10B) which will replace the AP (the AP 830 in FIG. 8, FIGS. 9A and 9B, or FIGS. 10A and 10B), and transmit, to the server (the cloud server 340 in FIG. 3, the cloud server 440 in FIG. 4, the cloud server 630 in FIG. 6 or FIG. 7, or the cloud server 840 in FIG. 8, FIGS. 9A and 9B, or FIGS. 10A and 10B) through the communication circuit 202, a failure notification response message which includes information indicating that the AP (the AP 830 in FIG. 8, FIGS. 9A and 9B, or FIGS. 10A and 10B) has been recovered, or information indicating that the new AP (the new AP 1050 in FIGS. 10A and 10B) will be selected and access information of the new AP (the new AP 1050 in FIGS. 10A and 10B).

Figure 3:
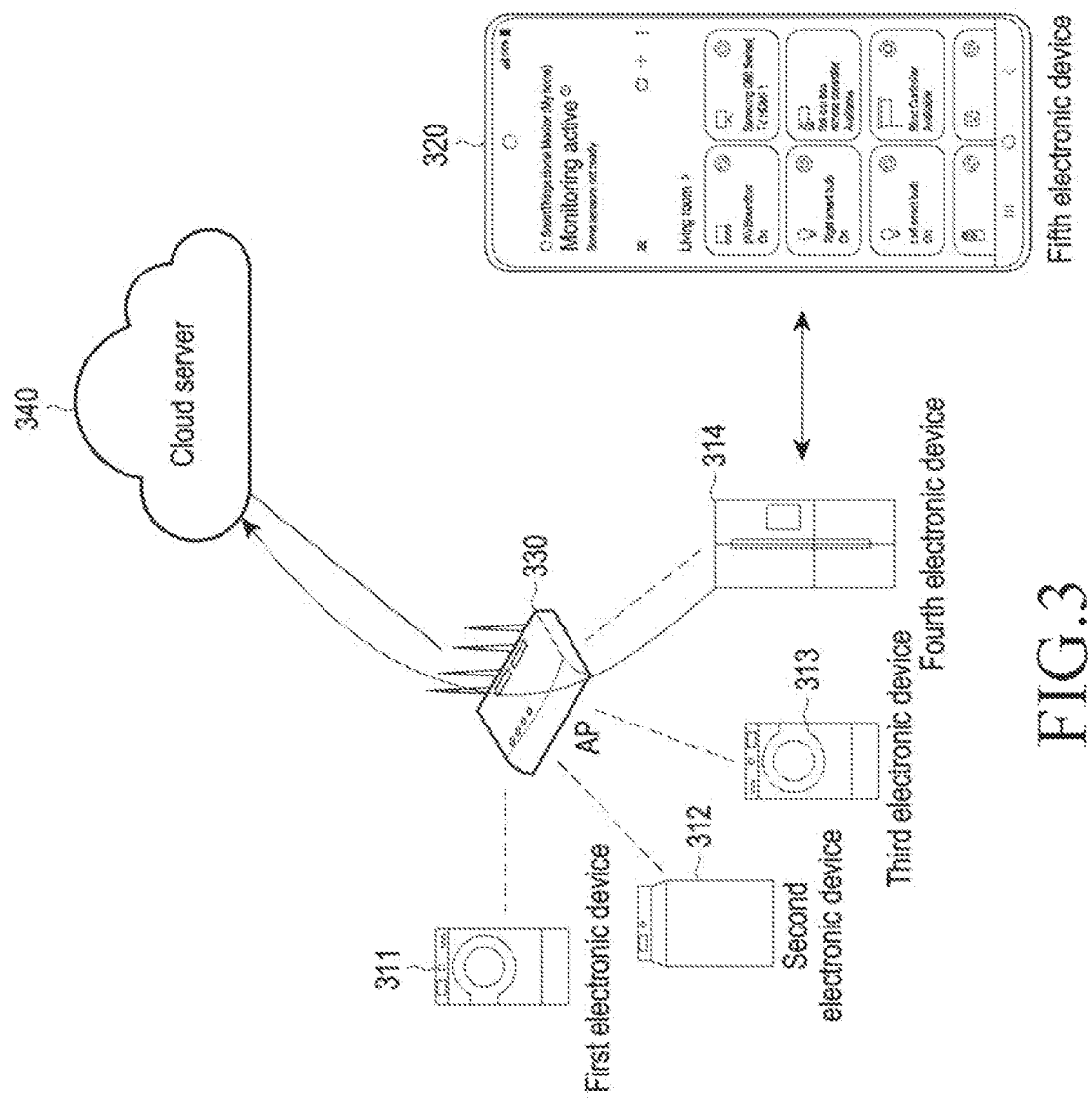
FIG. 3 is a diagram schematically illustrating an example of an architecture of a wireless communication network according to certain embodiments.
Figure 4:
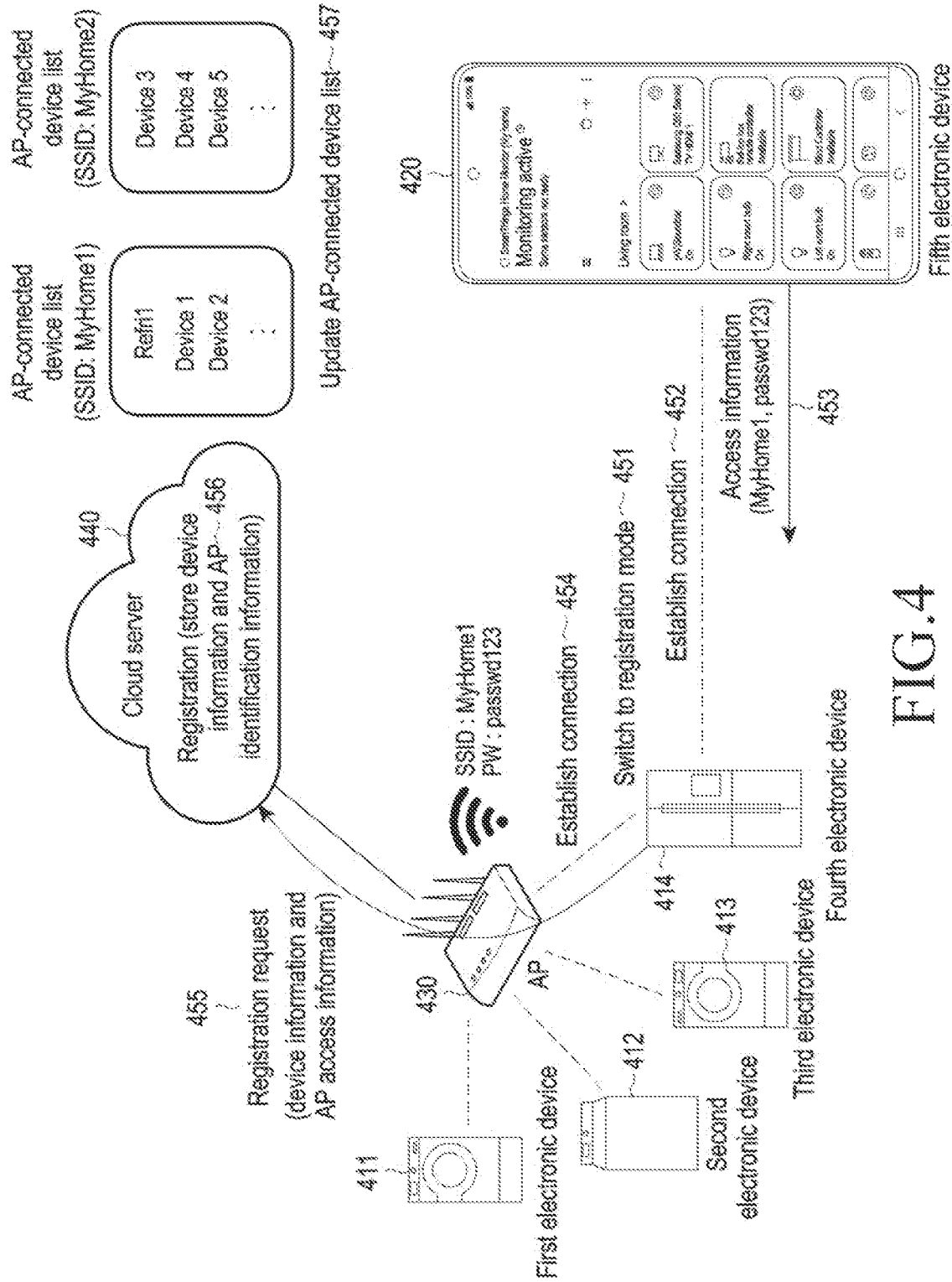
FIG. 4 is a diagram schematically illustrating a registration procedure of a direct-connected device in a wireless communication network according to certain embodiments.
Figure 5:
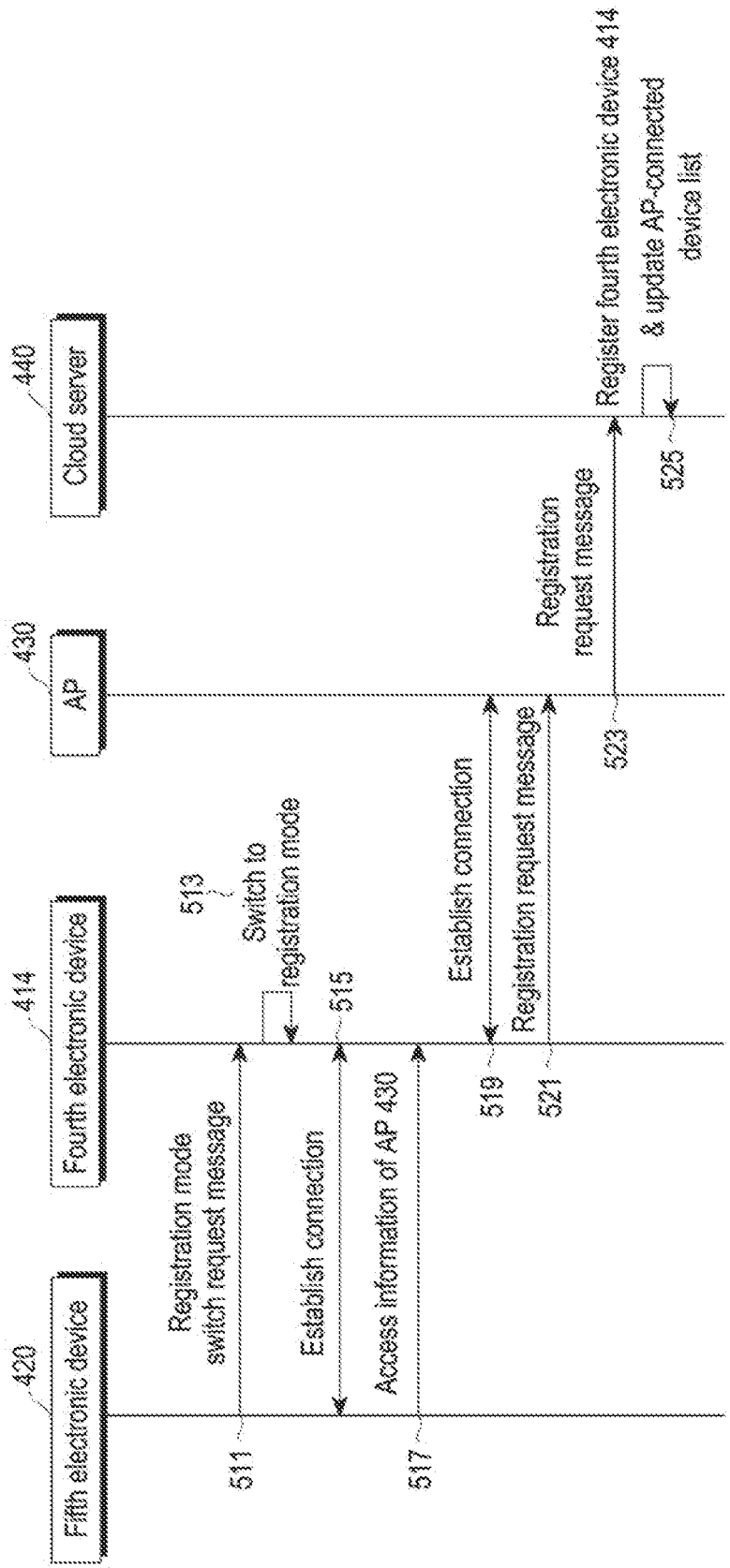
FIG. 5 is a signal flow diagram schematically illustrating a registration procedure of a direct-connected device in a wireless communication network according to certain embodiments.

The at least one processor 204 may be further configured to: transmit, to another external electronic device (a first electronic device 311, a second electronic device 312, a third electronic device 313, or a fourth electronic device 314 in FIG. 3, a first electronic device 411, a second electronic device 412, a third electronic device 413, or a fourth electronic device 414 in FIG. 4, the fourth electronic device 414 in FIG. 5, a first electronic device 811, a second electronic device 812, a third electronic device 813, or a fourth electronic device 814 in FIG. 8, or the first electronic device 811, the second electronic device 812, or the third electronic device 813 in FIGS. 9A and 9B, or FIGS. 10A and 10B) through the communication circuit 202, a registration mode switch request message requesting to switch an operation mode of the other external electronic device (the first electronic device 311, the second electronic device 312, the third electronic device 313, or the fourth electronic device 314 in FIG. 3, the first electronic device 411, the second electronic device 412, the third electronic device 413, or the fourth electronic device 414 in FIG. 4, the fourth electronic device 414 in FIG. 5, the first electronic device 811, the second electronic device 812, the third electronic device 813, or the fourth electronic device 814 in FIG. 8, or the first electronic device 811, the second electronic device 812, or the third electronic device 813 in FIGS. 9A and 9B, or FIGS. 10A and 10B) to a registration mode to register the other external electronic device (the first electronic device 311, the second electronic device 312, the third electronic device 313, or the fourth electronic device 314 in FIG. 3, the first electronic device 411, the second electronic device 412, the third electronic device 413, or the fourth electronic device 414 in FIG. 4, the fourth electronic device 414 in FIG. 5, the first electronic device 811, the second electronic device 812, the third electronic device 813, or the fourth electronic device 814 in FIG. 8, or the first electronic device 811, the second electronic device 812, or the third electronic device 813 in FIGS. 9A and 9B, or FIGS. 10A and 10B) at the server (the cloud server 340 in FIG. 3, the cloud server 440 in FIG. 4, the cloud server 630 in FIG. 6 or FIG. 7, or the cloud server 840 in FIG. 8, FIGS. 9A and 9B, or FIGS. 10A and 10B).

According to certain embodiments of the disclosure, an electronic device (a first electronic device 311, a second electronic device 312, a third electronic device 313, or a fourth electronic device 314 in FIG. 3, a first electronic device 411, a second electronic device 412, a third electronic device 413, or a fourth electronic device 414 in FIG. 4, the fourth electronic device 414 in FIG. 5, a first electronic device 811, a second electronic device 812, a third electronic device 813, or a fourth electronic device 814 in FIG. 8, or the first electronic device 811, the second electronic device 812, or the third electronic device 813 in FIGS. 9A and 9B, or FIGS. 10A and 10B) may comprise a communication circuit 202, and at least one processor 204 operatively connected with the communication circuit 202. The at least one processor 204 may be configured to: transmit, to an access point (AP) (an AP 330 in FIG. 3, an AP 430 in FIG. 4 or FIG. 5, or an AP 830 in FIG. 8, FIGS. 9A and 9B, or FIGS. 10A and 10B) through the communication circuit 202, an access request message including access information of the AP (the AP 330 in FIG. 3, the AP 430 in FIG. 4 or FIG. 5, or the AP 830 in FIG. 8, FIGS. 9A and 9B, or FIGS. 10A and 10B), receive, from the AP (the AP 330 in FIG. 3, the AP 430 in FIG. 4 or FIG. 5, or the AP 830 in FIG. 8, FIGS. 9A and 9B, or FIGS. 10A and 10B) through the communication circuit 202, an access response message which is a response message to the access request message, and transmit, to the AP (the AP 330 in FIG. 3, the AP 430 in FIG. 4 or FIG. 5, or the AP 830 in FIG. 8, FIGS. 9A and 9B, or FIGS. 10A and 10B) through the communication circuit 202, a registration request message for registering the electronic device (the first electronic device 311, the second electronic device 312, the third electronic device 313, or the fourth electronic device 314 in FIG. 3, the first electronic device 411, the second electronic device 412, the third electronic device 413, or the fourth electronic device 414 in FIG. 4, the fourth electronic device 414 in FIG. 5, the first electronic device 811, the second electronic device 812, the third electronic device 813, or the fourth electronic device 814 in FIG. 8, or the first electronic device 811, the second electronic device 812, or the third electronic device 813 in FIGS. 9A and 9B, or FIGS. 10A and 10B) at a server (a cloud server 340 in FIG. 3, a cloud server 440 in FIG. 4 or FIG. 5, a cloud server 630 in FIG. 6 or FIG. 7, or a cloud server 840 in FIG. 8, FIGS. 9A and 9B, or FIGS. 10A and 10B) which includes device information for identifying the electronic device (the first electronic device 311, the second electronic device 312, the third electronic device 313, or the fourth electronic device 314 in FIG. 3, the first electronic device 411, the second electronic device 412, the third electronic device 413, or the fourth electronic device 414 in FIG. 4, the fourth electronic device 414 in FIG. 5, the first electronic device 811, the second electronic device 812, the third electronic device 813, or the fourth electronic device 814 in FIG. 8, or the first electronic device 811, the second electronic device 812, or the third electronic device 813 in FIGS. 9A and 9B, or FIGS. 10A and 10B) and accessed AP information indicating an AP (the AP 330 in FIG. 3, the AP 430 in FIG. 4 or FIG. 5, or the AP 830 in FIG. 8, FIGS. 9A and 9B, or FIGS. 10A and 10B) which the electronic device (the first electronic device 311, the second electronic device 312, the third electronic device 313, or the fourth electronic device 314 in FIG. 3, the first electronic device 411, the second electronic device 412, the third electronic device 413, or the fourth electronic device 414 in FIG. 4, the fourth electronic device 414 in FIG. 5, the first electronic device 811, the second electronic device 812, the third electronic device 813, or the fourth electronic device 814 in FIG. 8, or the first electronic device 811, the second electronic device 812, or the third electronic device 813 in FIGS. 9A and 9B, or FIGS. 10A and 10B) accesses.

The at least one processor 204 may be configured to: receive, from an external electronic device (a fifth electronic device 320 in FIG. 3, a fifth electronic device 420 in FIG. 4 or FIG. 5, a user device 610 in FIG. 6 or FIG. 7, or a fifth electronic device 820 in FIG. 8, FIGS. 9A and 9B, or FIGS. 10A and 10B) through the communication circuit 202, a registration mode switch request message requesting to switch an operation mode of the electronic device (the first electronic device 311, the second electronic device 312, the third electronic device 313, or the fourth electronic device 314 in FIG. 3, the first electronic device 411, the second electronic device 412, the third electronic device 413, or the fourth electronic device 414 in FIG. 4, the fourth electronic device 414 in FIG. 5, the first electronic device 811, the second electronic device 812, the third electronic device 813, or the fourth electronic device 814 in FIG. 8, or the first electronic device 811, the second electronic device 812, or the third electronic device 813 in FIGS. 9A and 9B, or FIGS. 10A and 10B) to a registration mode to register the electronic device (the first electronic device 311, the second electronic device 312, the third electronic device 313, or the fourth electronic device 314 in FIG. 3, the first electronic device 411, the second electronic device 412, the third electronic device 413, or the fourth electronic device 414 in FIG. 4, the fourth electronic device 414 in FIG. 5, the first electronic device 811, the second electronic device 812, the third electronic device 813, or the fourth electronic device 814 in FIG. 8, or the first electronic device 811, the second electronic device 812, or the third electronic device 813 in FIGS. 9A and 9B, or FIGS. 10A and 10B) at the server (the cloud server 340 in FIG. 3, the cloud server 440 in FIG. 4 or FIG. 5, the cloud server 630 in FIG. 6 or FIG. 7, or the cloud server 840 in FIG. 8, FIGS. 9A and 9B, or FIGS. 10A and 10B), switch the operation mode to the registration mode, and transmit, to the AP (the AP 330 in FIG. 3, the AP 430 in FIG. 4 or FIG. 5, or the AP 830 in FIG. 8, FIGS. 9A and 9B, or FIGS. 10A and 10B) through the communication circuit 202, the registration request message in the registration mode.

According to certain embodiments of the disclosure, a server (a cloud server 340 in FIG. 3, a cloud server 440 in FIG. 4 or FIG. 5, a cloud server 630 in FIG. 6 or FIG. 7, or a cloud server 840 in FIG. 8, FIGS. 9A and 9B, or FIGS. 10A and 10B) may comprise a communication circuit 202, and at least one processor 204 operatively connected with the communication circuit 202. The at least one processor 204 may be configured to: detect that a failure state has occurred in an access point (AP) (an AP 830 in FIG. 8, FIGS. 9A and 9B, or FIGS. 10A and 10B), select at least one electronic device (an AP-possible device 620 in FIG. 6 or FIG. 7, a sixth electronic device 850 or a seventh electronic device 860 in FIG. 8 or FIGS. 9A and 9B, or the sixth electronic device 850, the seventh electronic device 860, or an eighth electronic device 1060 in FIGS. 10A and 10B) among electronic devices (the AP-possible device 620 in FIG. 6 or FIG. 7, the sixth electronic device 850 or the seventh electronic device 860 in FIG. 8 or FIGS. 9A and 9B, or the sixth electronic device 850, the seventh electronic device 860, or the eighth electronic device 1060 in FIGS. 10A and 10B) capable of performing an AP operation as a temporary AP which will perform an AP operation instead of the AP (the AP 830 in FIG. 8, FIGS. 9A and 9B, or FIGS. 10A and 10B), and transmit, through the communication circuit 202, an AP operation command message commanding to perform an AP operation and including access information of the AP (the AP 830 in FIG. 8, FIGS. 9A and 9B, or FIGS. 10A and 10B) to the at least one electronic device (the AP-possible device 620 in FIG. 6 or FIG. 7, the sixth electronic device 850 or the seventh electronic device 860 in FIG. 8 or FIGS. 9A and 9B, or the sixth electronic device 850, the seventh electronic device 860, or the eighth electronic device 1060 in FIGS. 10A and 10B) which is selected as the temporary AP.

The at least one processor 204 may be further configured to: receive, from an external electronic device (a user device 610 in FIG. 6 or 7, or a fifth electronic device 820 in FIG. 8, FIGS. 9A and 9B, or FIGS. 10A and 10B) through the communication circuit 202, a message including access information of a new AP (a new AP 1050 in FIGS. 10A and 10B) which will replace the AP (the AP 830 in FIG. 8, FIGS. 9A and 9B, or FIGS. 10A and 10B) and commanding to switch the AP (the AP 830 in FIG. 8, FIGS. 9A and 9B, or FIGS. 10A and 10B) to the new AP (the new AP 1050 FIGS. 10A and 10B), and transmit, to the at least one electronic device (the AP-possible device 620 in FIG. 6 or FIG. 7, the sixth electronic device 850 or the seventh electronic device 860 in FIG. 8 or FIGS. 9A and 9B, or the sixth electronic device 850, the seventh electronic device 860, or the eighth electronic device 1060 in FIGS. 10A and 10B) through the communication circuit 202, a message including the access information of the new AP (the new AP 1050 FIGS. 10A and 10B).

The at least one processor 204 may be further configured to: transmit, to the at least one electronic device (the AP-possible device 620 in FIG. 6 or FIG. 7, the sixth electronic device 850 or the seventh electronic device 860 in FIG. 8 or FIGS. 9A and 9B, or the sixth electronic device 850, the seventh electronic device 860, or the eighth electronic device 1060 in FIGS. 10A and 10B) through the communication circuit 202, an AP operation termination message commanding to terminate the AP operation.

The at least one processor 204 may be further configured to: transmit, to an external electronic device (the user device 610 in FIG. 6 or 7, or the fifth electronic device 820 in FIG. 8, FIGS. 9A and 9B, or FIGS. 10A and 10B) through the communication circuit 202, a failure notification message indicating that a failure state has occurred in the AP (the AP 830 in FIG. 8, FIGS. 9A and 9B, or FIGS. 10A and 10B) which has been connected to the external electronic device (the user device 610 in FIG. 6 or 7, or the fifth electronic device 820 in FIG. 8, FIGS. 9A and 9B, or FIGS. 10A and 10B) and checking whether the AP (the AP 830 in FIG. 8, FIGS. 9A and 9B, or FIGS. 10A and 10B) has been recovered or whether to select a new AP (the new AP 1050 FIGS. 10A and 10B) which will replace the AP (the AP 830 in FIG. 8, FIGS. 9A and 9B, or FIGS. 10A and 10B), and receive, from the external electronic device (the user device 610 in FIG. 6 or 7, or the fifth electronic device 820 in FIG. 8, FIGS. 9A and 9B, or FIGS. 10A and 10B) through the communication circuit 202, a failure notification response message including information indicating that the AP (the AP 830 in FIG. 8, FIGS. 9A and 9B, or FIGS. 10A and 10B) has been recovered, or information indicating that the new AP (the new AP 1050 FIGS. 10A and 10B) will be selected and access information of the new AP (the new AP 1050 FIGS. 10A and 10B).

The at least one processor 204 may be configured to: detect that the failure state has occurred in the AP (the AP 830 in FIG. 8, FIGS. 9A and 9B, or FIGS. 10A and 10B) upon detecting that all connections of other external electronic devices (a first electronic device 311, a second electronic device 312, a third electronic device 313, or a fourth electronic device 314 in FIG. 3, a first electronic device 411, a second electronic device 412, a third electronic device 413, or a fourth electronic device 414 in FIG. 4, the fourth electronic device 414 in FIG. 5, a first electronic device 811, a second electronic device 812, a third electronic device 813, or a fourth electronic device 814 in FIG. 8, or the first electronic device 811, the second electronic device 812, or the third electronic device 813 in FIGS. 9A and 9B, or FIGS. 10A and 10B) which have been connected to the AP (the AP 830 in FIG. 8, FIGS. 9A and 9B, or FIGS. 10A and 10B) are released.

The at least one processor 204 may be configured to: select the at least one of the electronic devices (the AP-possible device 620 in FIG. 6 or FIG. 7, the sixth electronic device 850 or the seventh electronic device 860 in FIG. 8 or FIGS. 9A and 9B, or the sixth electronic device 850, the seventh electronic device 860, or the eighth electronic device 1060 in FIGS. 10A and 10B) capable of performing the AP operation as the temporary AP based on location information of the other external electronic devices (the first electronic device 311, the second electronic device 312, the third electronic device 313, or the fourth electronic device 314 in FIG. 3, the first electronic device 411, the second electronic device 412, the third electronic device 413, or the fourth electronic device 414 in FIG. 4, the fourth electronic device 414 in FIG. 5, the first electronic device 811, the second electronic device 812, the third electronic device 813, or the fourth electronic device 814 in FIG. 8, or the first electronic device 811, the second electronic device 812, or the third electronic device 813 in FIGS. 9A and 9B, or FIGS. 10A and 10B) which have been connected to the AP (the AP 830 in FIG. 8, FIGS. 9A and 9B, or FIGS. 10A and 10B).

The at least one processor 204 may be configured to: select the at least one of the electronic devices (the AP-possible device 620 in FIG. 6 or FIG. 7, the sixth electronic device 850 or the seventh electronic device 860 in FIG. 8 or FIGS. 9A and 9B, or the sixth electronic device 850, the seventh electronic device 860, or the eighth electronic device 1060 in FIGS. 10A and 10B) capable of performing the AP operation as the temporary AP based on a set order.

The set order may be received from the external electronic device (the user device 610 in FIG. 6 or 7, or the fifth electronic device 820 in FIG. 8, FIGS. 9A and 9B, or FIGS. 10A and 10B).

In a wireless communication network, for example, an IoT network which is based on an OCF standard, an IoT device may operate in a soft access point (Soft-AP) mode through a separate application (APP). For example, in a Soft-AP mode, a device that was not specifically made to be a router, is equipped with software to function as a wireless access point or a virtual router. The IoT device may be an electronic device which implements an IoT scheme.

The IoT device may operate in the soft-AP mode to perform a communication connection operation with neighbor electronic devices, and to transmit/receive data to and from the neighbor electronic devices. For example, if the IoT device operates in the Soft-AP mode, the IoT device may transmit a beacon message in a broadcast scheme. Upon receiving the beacon message broadcasted by the IoT device, the neighbor electronic devices may establish communication connections with the IoT device. For example, a neighbor electronic device may perform a communication connection operation with the IoT device to transmit/receive data to and from the IoT device.

An IoT device capable of operating in a Soft-AP mode may be referred to as a "direct-connected device". If it is no longer possible for the direct-connected device to be connected to a Wi-Fi device, e.g., an AP, which has been connected to the direct-connected device, the direct-connected device may release a connection which has been established with the AP and operate in the Soft-AP mode to establish a new connection with another AP. In an embodiment, a case that it is no longer possible for the direct-connected device to be connected to the AP may include the following cases.

(1) a case that access information such as a basic service set identifier (SSID) and a password of the AP to which the direct-connected device has been connected is changed;

(2) a case that the AP to which the direct-connected device has been connected is in a power-off state;

(3) a case that the AP to which the direct-connected device has been connected does not operate normally, for example, a case that the AP does not operate normally due to a problem of a radio frequency (RF) component such as an antenna of the AP to which the direct-connected device has been connected;

(4) a case that a distance between the AP to which the direct-connected device has been connected and the direct-connected device is changed, or an obstacle additionally appears between the AP to which the direct-connected device has been connected and the direct-connected device, for example, a case that a mobile hotspot moves, or an obstacle which interferes with propagation between the AP to which the direct-connected device has been connected and the direct-connected device appears.

Hereinafter, for convenience of a description, a state in which it is impossible for a direct-connected device to be connected to an AP will be referred to as a "failure state of an AP." The failure state of the AP may include an "access information change state of an AP" as a state in which access information of the AP is changed, so it is impossible for the direct-connected device to be connected to the AP and, an "abnormal state of an AP" as a state in which the AP does not operate normally, so it is impossible for the direct-connected device to be connected to the AP.

A case that the access information such as an SSID and a password of the AP to which the direct-connected device has been connected is changed may be the access information change state of the AP. In an embodiment, a case that the AP to which the direct-connected device has been connected is in a power-off state, a case that the AP to which the direct-connected device has been connected does not operate normally, for example, a case that the AP does not operate normally due to a problem in an RF component such as an antenna of the AP to which the direct-connected device has been connected, and a case that a distance between the AP to which the direct-connected device has been connected and the direct-connected device is changed, or an obstacle additionally appears between the AP to which the direct-connected device has been connected and the direct-connected device, for example, a case that a mobile hotspot moves, or an obstacle which interferes with propagation between the AP to which the direct-connected device has been connected and the direct-connected device appears may be an abnormal state of the AP.

In an embodiment, if it is no longer possible for the direct-connected device to be connected to the AP, for example, if the direct-connected device detects the failure state of the AP, the direct-connected device may need to establish a new connection with a new AP. So, an electronic device which manages the direct-connected device needs to reset a connection of the direct-connected device, and cause the direct-connected device to perform a registration procedure with another AP.

In order for the direct-connected device to establish a new connection with the new AP, an operation mode of the direct-connected device may be switched to the soft-AP mode in order to obtain access information, e.g., an SSID and a password of the new AP. As such, a reason why the direct-connected device changes the operation mode of the direct-connected device to the soft-AP mode is to receive the access information of the new AP. For example, the direct-connected device may switch its operation mode to the Soft-AP mode, receive the access information of the new AP from a user device (e.g., a smart phone) which is communicatively connected to the direct-connection device, and establish the new connection with the new AP based on the received access information of the new AP.

FIG. 3 is a diagram schematically illustrating an example of an architecture of a wireless communication network according to certain embodiments. The AP 330 may provide an access to Internet and a cloud server 340 to IoT devices 311-314 and a user device 320. However, for various reasons, the AP 330 may have a failure state. To maintain a high probability of a stable connection to the Internet and the cloud server 340, when a network recognizes the AP 330 is in a failure state, one of the IoT devices 311-314 or the user device 320 may operate as a temporary AP, as well be described in greater detail below. Although ordinal representations are used in FIG. 3, it should be noted that the ordinal representations are used to distinguish corresponding objects (e.g., electronic devices) and not to limit the order of the corresponding objects.

Referring to FIG. 3, a wireless communication network, e.g., an IoT network may include a plurality of electronic devices 311, 312, 313, 314, and 320, an AP 330, and a cloud server 340. The IoT network may be a network which implements an IoT scheme.

In an embodiment, each of the first electronic device 311, the second electronic device 312, the third electronic device 313, and the fourth electronic device 314 may be an IoT device. For example, the first electronic device 311 may be a washing machine, the second electronic device 312 may be a dryer, the third electronic device 313 may be another dryer, and the fourth electronic device 314 may be a refrigerator. Electronic devices 311-314 may implement the IoT scheme. The first electronic device 311, the second electronic device 312, the third electronic device 313, and the fourth electronic device 314 shall be collectively referred to as IoT devices.

Electronic device 320 may be a user device (e.g., a smart phone). The IoT devices 311-314, may be communicatively connected to the user device 320, and may be controlled and/or managed by the user device 320. Each of the IoT devices 311-314 may be any one of the following three types of electronic devices.

(1) Direct-Connected Device

A direct-connected device may be an electronic device directly connected to the Internet by using a short-range wireless communication scheme, for example, a Wi-Fi scheme or a local area network (LAN) scheme.

(2) Indirect-Connected Device

An indirect-connected device may be an electronic device connected to the Internet through a separate electronic device such as, for example, a hub or an edge node. In an embodiment, the indirect-connected device may be an electronic device which is connected to the Internet through another electronic device, not being directly connected to the Internet.

(3) Cloud-Connected Device

A cloud-connected device may be an electronic device which is connected to a second cloud server different from a first cloud server to which a direct-connected device and an indirect-connected device are connected, and which is managed and/or controlled through a communication between the first cloud server and the second first cloud server. For example, the cloud-connected device may be registered with the second cloud server, and the first cloud server may manage and/or control electronic devices which are registered with the second cloud server through a communication between the second cloud server and the first cloud server.

In an embodiment, a direct-connected device may be mainly connected to the Internet in which a cloud server exists through a Wi-Fi connection which is based on a Wi-Fi scheme. In an embodiment, a direct connected-device which does not include an output module such as a display module and an input module may operate in a Soft-AP mode. The direct-connected device which operates in the Soft-AP mode may establish a connection with an electronic device, e.g., a user device (e.g., a smart phone). The direct-connected device may receive, from the user device, information about an AP which the direct-connected device will access. Upon receiving the information about the AP, the direct-connected device may terminate a Soft-AP mode operation and access a the AP based on the information received through the user device. Upon accessing the AP, the direct-connected device may access a cloud server through the AP and maintain a connection with the cloud server.

While the direct-connected device is connected to the cloud server through the AP, if an access information change state of the AP, or a failure state of the AP occurs, the direct-connected device may need to delete registration-related information for the currently connected AP and perform a registration procedure with a new AP. The information change state of the AP may include a case that the access information, e.g., an SSID and a password, of the AP change. The failure state of the AP may include an abnormal state of the AP.

The registration-related information may include the information, e.g., the SSID and the password, about the AP to which the direct-connected device is connected, and/or information about the cloud server to which the direct-connected device is connected.

If it is no longer for the direct-connected device to be connected to the AP due to the failure state of the AP to which the direct-connected device has been connected, the direct-connected device may perform the registration procedure with the new AP. In this case, information not directly related to an AP access operation such as device information and automation function related-information of the direct-connected device may be deleted. The device information of the direct-connected device may be information used when the direct-connected device performs a registration procedure with the cloud server, and may be identification information for identifying the direct-connected device.

The device information of the direct-connected device may include a name and location information of the direct-connected device. The automation function related-information of the direct-connected device may be information related to an automation function which may be performed in an IoT network. For example, if the direct-connected device is a speaker device, the information related to the automation function may be information which is set so that the speaker device outputs a security warning message when another electronic device, e.g., a sensor device operates. Information related to an automation function may information related to an interaction between an electronic device and at least one external electronic device, and may be information related to the at least one external electronic device performing a set operation based on an occurred event if the event occurs in the electronic device.

Certain embodiments of the disclosure may provide an apparatus and method for performing a network management operation which guarantees (or at least assures with a high degree of probability) a stable connection by allowing any one of electronic devices capable of operating as an AP among electronic devices existing in a wireless communication network, e.g., an IoT network, to operate as a temporary AP which will perform an operation of an AP in which a failure state occurs instead of the failure state of the AP is detected in the IoT network.

Certain embodiments of the disclosure may provide an apparatus and method for maintaining a connection between direct-connected devices through electronic devices which may operate as APs in an IoT network.

In an IoT network, an AP may configure a security configuration to restrict direct-connected devices which access the AP. The security configuration may be information for identifying the AP, and may be access information. The access information of the AP may include, e.g., an SSID and a password. Although the SSID and the password will be described as an example of the access information of the AP, various information such as channel information which may be required for security or access between the AP and a direct-connected device as well as the SSID and the password may be included in the access information of the AP. If the direct-connected device performs an access procedure for accessing the AP, the direct-connected device may transmit, to the AP, access information, e.g., an SSID and a password.

The AP may receive the SSID and the password from the direct-connected device, and check whether the received SSID and password are identical to the SSID and the password of the AP stored by the AP. As a result of the check, if the SSID and the password received from the direct-connected device are identical to the SSID and the password stored by the AP, the AP may perform an access procedure with the direct-connected device. The direct-connected device may be connected to the AP if performance of the access procedure with the AP is completed.

A secure access procedure between an AP and a direct-connected device in an IoT network will be described as follows.

The AP may configure access information, e.g., an SSID and a password, which are information for identifying the AP, and accept access to the AP only from a direct-connected device which transmits the access information. In an embodiment, upon accessing the AP, the direct-connected device may transmit the access information, e.g., the SSID and the password, of the AP. The AP may check whether the SSID and password transmitted by the direct-connected device are identical to the SSID and password set in the AP. If the SSID and password transmitted by the direct-connected device are identical to the SSID and password set in the AP, the AP may identify that the direct-connected device is a direct-connected device included in the IoT network including the AP. In an embodiment, if there are other APs in addition to the AP to which the direct-connected device is connected in the IoT network, and another AP using the same access information as the AP exists among the other APs, the direct-connected device may access the other AP using the same access information as the connected AP based on the access information of the connected AP.

For a direct-connected device connected to a cloud server through an AP, if a failure state of the AP occurs, a connection between the direct-connected device and the AP may be released. If the connection between the direct-connected device and the AP is released due to the occurrence of the failure state of the AP, and there is an another AP for which the same access information, e.g., the same SSID and password, as access information of the AP in which the failure state occurs are configured around a direct-connected device, the direct-connected device may recognize the other AP as the AP in which the failure state has occurred and then recovered. So, the direct-connected device may maintain a connection with the cloud server by accessing the other AP and establishing a connection with the other AP. An embodiment of the disclosure proposes an apparatus and method for performing an IoT network management operation which guarantees or ensured a high probability of a seamless connection in an IoT network based on access information of an AP.

A cloud server may estimate an operation state of each of Aps to which direct-connected devices are connected based on various information. The various information may include a connection state of each of the direct-connected devices registered with the cloud server, location information of each of the direct-connected devices, account information of each of the direct-connected devices, an average connection state of each of the direct-connected devices, and information about an AP to which each of the direct-connected devices is connected.

A connection state of a direct-connected device may be a state indicating whether a communication between the direct-connected device and the cloud server is possible. For example, the cloud server may transmit, to the direct-connected device, a signal, e.g., a ping, for checking whether it is possible for the direct-connected device to communicate with the cloud server at a set period, e.g., every 30 seconds, and may determine that the direct-connected device is connected to the cloud server if a response to the ping is received from the direct-connected device. In an embodiment, the ping has been described as an example of the signal for checking whether it is possible for the direct-connected device to communicate with the cloud server, but any signal may be used as long as it is possible to check whether it is possible for the direct-connected device to communicate with the cloud server as well as the ping.

If the response to the ping is not received from the direct-connected device, the cloud server may determine that the direct-connected device is not connected to the cloud server, for example, that a connection between the cloud server and the direct-connected device is released.

Location information of the direct-connected device may be, for example, coordinate information of the direct-connected device. The location information of the direct-connected device may be logical location information. For example, the logical location information of the direct-connected device may be a description of a place where the direct-connected device is located. The description of the place where the direct-connected device is located may be the location information, such as a house/floor/small room, in a form related to an account, e.g., a user account which is related to the direct-connected device.

Account information of the direct-connected device may be information indicating an account used for registration of the direct-connected device. The direct-connected device may be registered with the cloud server by using an account, e.g., a user account of a user device.

An average connection state of the direct-connected device may indicate a ratio of a state in which it is possible for the direct-connected device to communicate with the cloud server to a state in which it is impossible for the direct-connected device to communicate with the cloud server for a set period, e.g., one hour. The connection state of the direct-connected device may indicate a connection state between the direct-connected device and the cloud server at a specific time point, whereas the average connection state of the direct-connected device may indicate a connection state between the direct-connected device and the cloud server for the set period.

In an embodiment, an operation state of an AP may include three states as follows.

(1) Normal Operation State

A normal operation state may be a state in which direct-connected devices connected to the AP are operating normally, and may be a state in which no additional action is required for the AP.

(2) Unstable Operation State

A unstable operation state may indicate a state in which connections to the AP of the direct-connected devices connected to the AP are released relatively frequently, or data transmission/reception through the AP is unstable.

(3) Abnormal Operation State

An abnormal operation state may be a state in which the direct-connected devices connected to the AP may not be connected to the AP.

A cloud server may detect whether a failure state occurs for each of APs included in an IoT network, based on a result of estimating an operation state of each of the APs. For example, if it is estimated that the failure state has occurred in a first AP among the APs included in the IoT network, the cloud server may control an electronic device, e.g., a first electronic device, capable of operating as an AP among the electronic devices included in the IoT network to operate in an AP mode having the same access information as the first AP. The cloud server may transmit, to the first electronic device, an AP operation command message which commands the first electronic device to perform an AP operation, for example, which commands the first electronic device o operate in the AP mode. In an embodiment, the AP operation command message may include the access information of the first AP.

Upon receiving the AP operation command message, the first electronic device may operate in the AP mode using the access information of the first AP included in the AP operation command message. This allows direct-connected devices connected to the first AP to maintain connections with the cloud server through the first electronic device instead of the first AP.

In an embodiment, the cloud server may notify a user device that the failure state has occurred in the first AP in the IoT network. The cloud server may transmit a message requesting information (e.g., access information) of an AP (e.g., a new AP) that will be newly connected in the future.

Upon receiving the notification that the failure state has occurred in the first AP, and receiving the message requesting the access information of the AP to be newly connected, the user device may output a message which notifies that the failure state has occurred in the first AP in the IoT network and requests the access information of the AP to be newly connected, for example, through a user interface (UI), through a user interface (UI).

After outputting the message which notifies that the failure state has occurred in the first AP in the IoT network and requests the access information of the AP to be newly connected through the UI, the user device may receive the access information of the new AP through the UI. Upon receiving the access information of the new AP through the UI, the user device may transmit the access information of the new AP to the cloud server 340.

Upon receiving the access information of the new AP, the cloud server 340 may transmit, the access information of the new AP to the first electronic device (which is operating as a temporary AP operating in the AP mode).

Upon receiving, from the cloud server, the access information of the new AP, the first electronic device may transmit the access information of the new AP to direct-connected devices which are connected to the cloud server through the first electronic device. Upon transmitting the access information of the new AP to the direct-connected devices, the first electronic device may terminate the AP operation. In another embodiment, the first electronic device may perform the AP operation even after transmitting the access information of the new AP. In this case, the cloud server may transmit a separate command to terminate the AP operation of the first electronic device. The separate command may be, for example, an AP operation termination message commanding to terminate the AP operation. Upon receiving the AP operation termination message from the cloud server, the first electronic device may terminate the AP operation.

Upon receiving, from the first electronic device, the access information of the new AP, the direct-connected devices may access the new AP by using the access information of the new AP. The direct-connected devices which access the new AP may release the connections with the temporary AP, i.e., the first electronic device.

According to an embodiment of the disclosure, electronic devices capable of operating as APs among electronic devices included in an IoT network may be classified into the following three types.

(1) First Type-Electronic Device

A first type-electronic device may be an electronic device which may simultaneously use a first wireless communication network, e.g., a wireless local area network (WLAN) and a second wireless communication network, e.g., a cellular network, and may operate as a host AP.

The first type-electronic device may include, for example, a smart phone, or an upcycling device capable of using a cellular network. If the first type-electronic device exists near an AP in which a failure state occurs in an IoT network, the first type-electronic device may receive, from a cloud server, a message, e.g., an AP operation command message, which commands the first type-electronic device to operate in an AP mode. The AP operation command message received from the cloud server includes access information of an AP in which a failure state has occurred, so the first type-electronic device may perform an AP operation by using the access information of the AP included in the AP operation command message. Hereinafter, an AP in which a failure state has occurred may be also referred to as a "failed AP".

The first type-electronic device may operate as a temporary AP instead of the failed AP, and may provide access to direct-connected devices which have been connected to the failed AP, so the direct-connected devices may maintain connections with the cloud server through the first type-electronic device.

(2) Second Type-Electronic Device

A second type-electronic device may be an electronic device including a WLAN/LAN dual interface. The second type-electronic device may be, for example, an electronic device which may be connected to the Internet through a LAN, and operate in a Soft-AP mode such as a laptop personal computer (PC) and a hub providing an AP function.

If the second type-electronic device exists near an AP in which a failure state occurs in an IoT network, the second type-electronic device may receive, from a cloud server, an AP operation command message which commands to operate in an AP mode. The AP operation command message received from the cloud server includes access information of a failed AP, so the second type-electronic device may operate in an AP mode, for example, perform an AP operation by using the access information of the AP included in the AP operation command message.

So, the second type-electronic device may operate as a temporary AP instead of the failed AP, so the direct-connected devices which have been connected to the failed AP may maintain connections with the cloud server through the second type-electronic device.

(3) Third Type—Electronic Device

In addition to the first type-electronic device and the second type-electronic device, a third type-electronic device may be an electronic device capable of connecting to the Internet through a network interface other than a WLAN. The third type-electronic device may be, for example, an electronic device which may be connected to a cloud server through an electronic device connected by a cable, or an electronic device which may be connected to the cloud server through various networks such as ZB, ZW, or Thread among upcycling electronic devices.

If the third type-electronic device exists near an AP in which a failure state occurs in an IoT network, the third type-electronic device may receive, from a cloud server, an AP operation command message which commands to operate in an AP mode. The AP operation command message received from the cloud server includes access information of a failed AP, so the third type-electronic device may operate in an AP mode by using the access information of the AP included in the AP operation command message.

The third type-electronic device may operate as a temporary AP instead of the failed AP, so the direct-connected devices which have been connected to the failed AP may maintain connections with the cloud server through the third type-electronic device.

An electronic device capable of operating as an AP among electronic devices included in an IoT network may operate as a temporary AP instead of a failed AP, so direct-connected devices which have been connected to the failed AP may not delete registration-related information or release connections with a cloud server. Accordingly, the IoT network may be stably managed.

An embodiment of the disclosure may provide various procedures and functions for stable IoT network management.

An embodiment of the disclosure may provide an access AP registration procedure in an IoT network.

An access AP registration procedure may be a procedure in which each electronic device included in an IoT network registers, with a cloud server, information about an AP to which each electronic device is connected, e.g., access information of the AP. Upon performing a registration procedure with the cloud server, each electronic device included in the IoT network may transmit, to the cloud server, the access information, e.g., an SSID and a password, of the AP to which each electronic device is connected. In an embodiment, the cloud server may receive, from each electronic device, the access information of the AP to which each electronic device is connected, and may register the access information of the AP which each electronic device accesses.

Access information of an AP to which an electronic device accesses is important information directly related to security, so the access information may be encrypted based on a set encryption scheme. A cloud server may encrypt, based on an encryption scheme, access information of an AP to which each electronic device is connected which is received from each electronic device included in an IoT network, and store and register the encrypted access information of the AP.

An embodiment of the disclosure proposes an AP-possible device registration procedure in an IoT network.

An AP-possible device registration procedure is a procedure in which each electronic device capable of operating as an AP among electronic devices included in an IoT network registers, at a cloud server, information indicating that each device is an electronic device capable of operating as the AP. Among the electronic devices included in the IoT network, each electronic device capable of operating as the AP may transmit, to the cloud server, the information indicating that each electronic device is the electronic device capable of operating as the AP upon performing a registration procedure with the cloud server, and the cloud server may receive, from each electronic device, the information indicating that each electronic device is the electronic device capable of operating as the AP. In an embodiment, the cloud server may register each electronic device from which the information indicating that each electronic device is the electronic device capable of operating as the AP as an AP-possible device which may operate as an AP.

In an embodiment, if a failure state occurs in one of APs included in the IoT network, the cloud server may select one of AP-possible devices registered with the cloud server as a temporary AP which will operate as an AP instead of the AP in which the failure state occurs.

An embodiment of the disclosure proposes an AP switching application in an IoT network.

In an embodiment, upon receiving, from a cloud server, an AP operation command message commanding to operate as an AP instead of a failed AP, AP-possible devices which are electronic devices capable of operating as APs among electronic devices included in an IoT network may operate as temporary APs by using access information of the failed AP which is included in the AP operation command message. An AP-possible device may execute an AP switching application supporting such a temporary AP operation, which can be implemented in a variety of forms. The AP switching application may perform an AP operation of the AP-possible device by using the access information of the failed AP, and if necessary, the authority and configuration of the AP switching application may be preset.

An embodiment of the disclosure proposes a procedure for detecting occurrence of a failure state in an IoT network.

If an electronic device is connected to an AP in an IoT network, information about the AP connected to the electronic device, for example, access information of the AP to which the electronic device is connected, may be registered at a cloud server through an access AP registration procedure. Access information of an AP to which each electronic device is connected may be encrypted based on a set encryption scheme, and the encrypted access information of the AP may be registered at the cloud server.

The cloud server may store information about electronic devices connected to each of APs included in the IoT network based on access information of an accessed AP which is received from each of electronic devices included in the IoT network. In an embodiment, the cloud server may store the information about the electronic devices connected to each of the APs included in the IoT network through an access AP registration procedure.

The cloud server may store the information about the electronic devices connected to each of the APs included in the IoT network in a form of a list. Hereinafter, for convenience of a description, the list including the information about the electronic devices connected to each of the APs included in the IoT network will be referred to as an "AP-connected device list". The cloud server may detect that a failure state has occurred in a specific AP if all of direct-connected electronic devices connected to the specific AP are disconnected from the cloud server, for example, based on the AP-connected device list. The failure state has been described above, a description of the failure state will be omitted. In an embodiment, the cloud server may start a recovery procedure for the AP which is detected that the failure state has occurred. Hereinafter, for convenience of a description, a recovery procedure for an AP in which a failure state has occurred will be referred to as an "AP recovery procedure".

An embodiment of the disclosure proposes an AP recovery procedure in an IoT network.

In an embodiment, upon detecting that a failure state has occurred in a specific AP among APs included in the IoT network, a cloud server may perform an AP recovery procedure.

(1) The cloud server may detect that a failure state occurs in one, e.g., a first AP, of APs included in the IoT network. Upon detecting that the failure state occurs in the first AP, the cloud server may transmit, a user device, a message which notifies that the failure state has occurred in the first AP in the IoT network and requests access information for an AP to be newly connected.

(2) After transmitting, to the user device, the message which notifies that the failure state has occurred in the first AP and requests the access information for the new AP, the cloud server may check whether a message including the access information for the new AP is received from the user device within a set time. If the message including the access information for the new AP is not received from the user device within the set time, the cloud server may select an AP-possible device to operate as a temporary AP instead of the AP based on information about AP-possible devices stored in the cloud server.

After transmitting, to the user device, the message which notifies that the failure state has occurred in the first AP and requests the access information for the new AP, the cloud server may update the information about the AP-possible devices. The user device may also be an AP-possible device in the IoT network. In a case of the user device, even if the user device is the AP-possible device, the user device may not want to operate as an AP. Accordingly, the cloud server may update the information about the AP-possible devices at a time point at which the temporary AP is selected, and select the AP-possible device which will operate as the temporary AP based on the updated information about the AP-possible devices.

When an event triggering temporary AP selection occurs, for example, when it is detected that a failure state occurs in a specific AP, the cloud server may transmit, to the user device, a message which inquires whether the user device may operate as an AP-possible device. Upon receiving the message which inquires whether the user device may operate as the AP-possible device, the user device may output a message indicating whether it is allowed that the user device operates as the AP-possible device, for example, through the UI.

A user device may receive information about whether to allow the user device to operate as the AP-possible device through the UI, and transmit, to the cloud server, a message indicating the information about whether to allow the user device to operate as the AP-possible device corresponding to the inputted information. The cloud server may update the information about the AP-possible devices based on the message received from the user device including the information about whether to allow the user device to operate as the AP-possible device. For example, if the information included in the message received from the user device indicates that it is not allowed for the user device to operate as the AP-possible device, the cloud server may update the information about the AP-possible devices in a form of excluding the user device from the AP-possible devices. In an embodiment, an operation of updating the information about the AP-possible devices in the cloud server may be optionally performed according to a situation of the IoT network.

(3) The cloud server may select an AP-possible device which will operate as a temporary AP instead of the first AP based on the information about AP-possible devices which is stored (or updated) in the cloud server. The cloud server may select the AP-possible device which will operate as the temporary AP from among the AP-possible devices based on location information of direct-connected devices which have been connected to the first AP.

The direct-connected devices which have been connected to the first AP are disconnected from the cloud server, so the cloud server may select an AP-possible device which is located at a location closest to an area in which the largest number of disconnected direct-connected devices exist as a temporary AP. For example, if the IoT network is implemented as a home network, a home network environment may include a plurality of rooms. In this case, the cloud server may select, as a temporary AP, a first AP-possible device which is an AP-possible device which exists at a location closest to a room in which the largest number of direct-connected devices which have been connected to the first AP in which the failure state has occurred are located among the plurality of rooms.

The cloud server may transmit, to the first AP-possible device, an AP operation command message which commands to operate as an AP, and includes access information of the first AP. Upon receiving the AP operation command message from the cloud server, the first AP-possible device may operate in an AP mode by using the access information of the first AP included in the received AP operation command message. So, the direct-connected devices which have been connected to the first AP may be connected to the cloud server through the first AP-possible device.

Even if the first AP-possible device operates as the temporary AP in this way, all of the direct-connected devices which have been connected to the first AP may not be connected to the cloud server. In this case, the cloud server may detect that there are direct-connected devices which are not connected to the cloud server through the first AP-possible device among the direct-connected devices which have been connected to the first AP, and may additionally select a temporary AP so that the direct-connected devices which are not connected to the cloud server through the first AP-possible device among the direct-connected devices which have been connected to the first AP may be connected to the cloud server. In an embodiment, the cloud server may additionally select a second AP-possible device from among AP-possible devices except for the first AP-possible device as the temporary AP, thereby the operation as described above may be performed, and the second AP-possible device is an AP-possible device which exists at a location closest to a room in which the second largest number of direct-connected devices which have been connected to the first AP exist. In an embodiment, the cloud server may perform a temporary AP selection operation which is based on location information until all of the direct-connected devices which have been connected to the first AP are connected to the cloud server.

In an embodiment, the cloud server may select an AP-possible device which will operate as a temporary AP from among the AP-possible devices based on a set order without selecting the AP-possible device which will operate as the temporary AP from among the AP-possible devices based on the location information of the direct-connected devices which have been connected to the first AP.

For example, if the IoT network is implemented as the home network, the home network environment may include a plurality of AP-possible devices. In this case, the cloud server may select, as the temporary AP, the first AP-possible device based on a set order. In an embodiment, the set order may be an order in which the plurality of AP-possible devices are registered with the cloud server. In an embodiment, the set order may be an order which is based on a priority determined by the cloud server. For example, the priority may be based on performance and/or power state of the AP-capable devices. In an embodiment, the set order may be an order set by a user device. In an embodiment, the set order may be an order which is set so that an AP-possible device, which is the user device, has the highest priority among the AP-possible devices.

In an embodiment, the cloud server may cause two or more AP-possible devices or all of AP-possible devices to operate as temporary APs without sequentially selecting an AP-possible device which will operate as a temporary AP among the AP-possible devices. In this case, a plurality of AP-possible devices may operate as temporary APs in parallel, the direct-connected devices which have been connected to the first AP may be connected to the cloud server more quickly.

(4) In an embodiment, upon detecting that all of the direct-connected devices which have been connected to the first AP are connected to the cloud server, the cloud server may transmit, to the user device, a message indicating that all of the direct-connected devices which have been connected to the first AP are connected to the cloud server and including access information for an AP to which all of the direct-connected devices which have been connected to the first AP are connected. Upon receiving, from the cloud server, the message indicating that all of the direct-connected devices which have been connected to the first AP are connected to the cloud server and including the access information for the AP to which all of the direct-connected devices which have been connected to the first AP are connected, the user device may output, through the UI, information indicating that all of the direct-connected devices which have been connected to the first AP are connected to the cloud server and the access information for the AP to which the direct-connected devices which have been connected to the first AP are connected.

In an embodiment, upon detecting that some of the direct-connected devices which have been connected to the first AP are not connected to the cloud server even though all AP-possible devices registered with the cloud server operate as temporary APs, the cloud server may transmit, to the user device, a message indicating that some of the direct-connected devices have been connected to the first AP are not connected to the cloud server, and including the access information for the AP to which the direct-connected devices connected to the cloud server are connected among the direct-connected devices which have been connected to the first AP. Upon receiving the message indicating that some of the direct-connected devices have been connected to the first AP are not connected to the cloud server 340, and including the access information for the AP to which the direct-connected devices connected to the cloud server are connected among the direct-connected devices which have been connected to the first AP, the user device may output, through the UI, information indicating that some of the direct-connected devices have been connected to the first AP are not connected to the cloud server, and the access information for the AP to which the direct-connected devices connected to the cloud server are connected among the direct-connected devices which have been connected to the first AP.

(5) In an embodiment, the AP-possible device selected as the temporary AP may scan APs which the temporary AP may access around the temporary AP, and generate an AP list based on the scan result. The AP-possible device selected as the temporary AP may transmit the generated AP list to the cloud server.

In an embodiment, the cloud server may transmit, to the AP-possible device selected as the temporary AP, a message which inquires whether the AP-possible device may connect electronic devices which have been connected to the first AP to the cloud server by another short-range communication scheme other than a basically set short-range communication scheme, e.g., a Wi-Fi scheme. Upon receiving, from the cloud server, the message which inquires whether the AP-possible device may connect the electronic devices which have been connected to the first AP to the cloud server by the other short-range communication scheme other than the Wi-Fi scheme, the AP-possible device may transmit, to the cloud server, information indicating whether the AP-possible device may connect the electronic devices which have been connected to the first AP to the cloud server by the other short-range communication scheme other than the Wi-Fi scheme.

In an embodiment, if the AP-possible device is capable of connecting the electronic devices which have been connected to the first AP to the cloud server by the other short-range communication scheme other than the Wi-Fi scheme, the cloud server may control the AP-possible device to connect the electronic devices which have been connected to the first AP to the cloud server based on the other short-range communication scheme other than the Wi-Fi scheme.

(6) In an embodiment, the cloud server may receive, from the user device, a message including information about an AP to be newly connected, e.g., a second AP (e.g., access information of the second AP) instead of the first AP. For example, the access information of the second AP may include an SSID and a password of the second AP. Upon receiving the message including the access information of the second AP from the user device, the cloud server may transmit a message including the access information of the second AP to at least one AP-possible device, e.g., the first AP-possible device, which operates as a temporary AP.

In an embodiment, upon receiving the access information of the second AP from the cloud server, the first AP-possible device may transmit access information of an AP to be newly connected, e.g., the second AP to the direct-connected devices which are connected to the cloud server through the first AP-possible device. In an embodiment, after transmitting the access information of the second AP to the direct-connected devices which are connected to the cloud server, the first AP-possible device may terminate the AP operation. In an embodiment, the first AP-possible device may perform the AP operation even after transmitting the access information of the second AP to the direct-connected devices which are connected to the cloud server through the first AP-possible device. In this case, the cloud server may transmit a separate message, e.g., an AP operation termination message to terminate the AP operation of the first AP-possible device. Upon receiving the AP operation termination message from the cloud server, the first AP-possible device may terminate the AP operation.

In an embodiment, upon receiving, from the first AP-possible device, the access information of the AP, e.g., the second AP, to be newly connected, the direct-connected devices which are connected to the cloud server through the first AP-possible device may access the second AP by using the access information of the second AP to be connected to the cloud server. The direct-connected devices which access the second AP may release the connections with the temporary AP, i.e., the first AP-possible device.

FIG. 4 is a diagram schematically illustrating a registration procedure of a direct-connected device in a wireless communication network according to certain embodiments.

Referring to FIG. 4, a wireless communication network, e.g., an IoT network may include a plurality of electronic devices, e.g., a first electronic device 411, a second electronic device 412, a third electronic device 413, a fourth electronic device 414, and a fifth electronic device 420, an AP 430, and a cloud server 440. Although ordinal representations are used in FIG. 4, it should be noted that the ordinal representations are used to distinguish corresponding objects (e.g., electronic devices) and not to limit the order of the corresponding objects.

In an embodiment, each of the electronic devices 411-414 may be an IoT device. An electronic device 420 may be a user device (e.g., a smart phone). Electronic devices 411-414 may be communicatively connected to the electronic device 420, and may be controlled and/or managed by the electronic device 420. Electronic devices 411-414 may be IoT devices which are registered by using the same account, e.g., the same user account. Electronic devices 411-414 may be direct-connected devices, and a registration procedure for the electronic device 414 will be described as an example of a registration procedure of a direct-connected device.

In operation 451, the user device, e.g., the fifth electronic device 420 may detect that it is requested to register the fourth electronic device 414 at the cloud server 440 through a UI, and transmit a registration mode switch request message for requesting to switch an operation mode of the fourth electronic device 414 to a registration mode in order to register the fourth electronic device 414 at the cloud server 440. For example, the fifth electronic device 420 may transmit the registration mode switch request message based on a short-range communication scheme (e.g., a Bluetooth, BLE, near field communication (NFC), WiFi, or radio frequency identification (RFID) scheme). The registration mode switch request message transmitted from the fifth electronic device 420 to the fourth electronic device 414 may be transmitted based on a unicast scheme or on a broadcast scheme.

An operation in which the fourth electronic device 414 switches an operation mode of the fourth electronic device 414 to a registration mode may performed based on providing a user with a guide through the fifth electronic device 420 or the fourth electronic device 414. For example, the electronic device 420 or the fourth electronic device 414 may provide guide information for guiding the user to switch the operation mode of the fourth electronic device 414 to the registration mode through a speaker or a display. In this case, the user may perform a designated input (e.g., a button input) to the fourth electronic device 414 with reference to the guide information, and the fourth electronic device 414 may switch the operation mode of the fourth electronic device 414 to the registration mode based on the designated input.

The registration mode may be a mode for registering an electronic device, e.g., a direct-connected device at a cloud server 440, and for example, a Soft-AP mode may be the registration mode. Upon receiving the registration mode switch request message from the fifth electronic device 420, the fourth electronic device 414 may switch the operation mode of the fourth electronic device 414 to the registration mode, e.g., the Soft-AP mode.

In operation 452, the fourth electronic device 414 may establish a connection with the fifth electronic device 420 in the Soft-AP mode. If the connection between the fourth electronic device 414 and the fifth electronic device 420 is established, the electronic device 414 may be managed and/or controlled through an application of the electronic device 420.

In operation 453, the fourth electronic device 414 may receive, from the fifth electronic device 420, a message including access information of an AP, e.g., the AP 430, to which the fourth electronic device 414 may be connected. In an embodiment, the access information of the AP may be information used for accessing the AP, may be identification information for identifying the AP, and may include, for example, an SSID and a password. For example, the SSID and the password included in the access information of the AP 430 may be MyHome 1 and passwd123, respectively.

In operation 454, the fourth electronic device 414 may access the AP 430 by using the access information of the AP 430 included in the message received from the fifth electronic device 420. In an embodiment, the fourth electronic device 414 may transmit, to the AP 430, an access request message including the access information of the AP 430 received from the fifth electronic device 420. If the access information of the AP 430 included in the access request message received from the fourth electronic device 414 is identical to the access information of the AP 430, the AP 430 may include access request acceptance information indicating that the access request is accepted into an access response message as a response message to the access request message to transmit the access response message to the fourth electronic device 414. In an embodiment, the SSID and the password, e.g., MyHome 1 and passwd123 which are identical to the SSID and the password of the AP 430 are included in the access request message received from the fourth electronic device 414, so the AP 430 may determine to accept the access request to the AP 430, and transmit, to the fourth electronic device 414, the access response message including the access request acceptance information indicating that the access request is accepted. The AP 430 may reject the access request of the fourth electronic device 414, and in this case, the access response message may include access request rejection information. Upon receiving the access response message from the AP 430, the fourth electronic device 414 may access the AP 430 and establish a connection with the AP 430 because the access request acceptance information is included in the access response message.

In operation 455, the fourth electronic device 414 may transmit a registration request message for registering the fourth electronic device 414 to the cloud server 440 through the AP 430. In an embodiment, the registration request message may include registration information, and the registration information may include device information, e.g., a name of the fourth electronic device 414 and location information of the fourth electronic device 414, which is used for identifying an electronic device, e.g., the fourth electronic device 414 which intends to be registered. In an embodiment, the registration request message may further include AP access information, and the AP access information may be information indicating an AP which the electronic device which intends to be registered, e.g., the fourth electronic device 414 accesses, and may include access information (e.g., an SSID and a password) of the AP, e.g., the AP 430 which the fourth electronic device 414 accesses.

In operation 456, the cloud server 440 may register the fourth electronic device 414 based on the registration request message received from the fourth electronic device 414. In an embodiment, the cloud server 440 may store the registration information, e.g., the device information and the AP identification information included in the registration request message received from the fourth electronic device 414. For example, if the name of the fourth electronic device 414 is "Refri1", the cloud server 440 may register the fourth electronic device 414 in a form of [Refri1—MyHome 1, passwd123].

In operation 457, the cloud server 440 may include the detected AP access information of the fourth electronic device 414 in an AP-connected device list stored in the cloud server 440 to update the AP-connected device list. In an embodiment, the AP-connected device list may be generated for each of the APs included in the IoT network. For example, if two APs are included in the IoT network, an AP-connected device list including information of at least one electronic device, e.g., at least one direct-connected device, which accesses each of the two APs may be generated for each of the two APs. For example, an AP-connected device list in a case that SSIDs of the two APs are MyHome 1 and MyHome 2, direct-connected devices having device information of Refri1, Device 1, Device 2, . . . access an AP corresponding to the SSID MyHome 1, and direct-connected devices having device information of Device 3, Device 4, Device 5, . . . access an AP corresponding to the SSID MyHome 2 is shown in FIG. 4.

FIG. 5 is a signal flow diagram schematically illustrating a registration procedure of a direct-connected device in a wireless communication network according to certain embodiments.

Referring to FIG. 5, a signal flow diagram of a registration procedure of a direct-connected device illustrated in FIG. 5 may be a signal flow diagram corresponding to a registration procedure of a direct-connected device described in FIG. 4, so it will be assumed that a structure of a wireless communication network is identical to a structure of a wireless communication network described in FIG. 4. Although ordinal representations are used in FIG. 5, it should be noted that the ordinal representations are used to distinguish corresponding objects (e.g., electronic devices) and not to limit the order of the corresponding objects.

In an embodiment, in operation 511, a user device, e.g., a fifth electronic device 420 may detect that it is requested to register a fourth electronic device 414 which is an IoT device at a cloud server 440. For example, the fifth electronic device 420 may detect that it is requested to register the fourth electronic device 414 at the cloud server 440 through a UI. In order to register the fourth electronic device 414 at the cloud server 440, the fifth electronic device 420 may transmit a registration mode switch request message for requesting to switch an operation mode of the fourth electronic device 414 to a registration mode. Upon receiving the registration mode switch request message from the fifth electronic device 420, the fourth electronic device 414 may switch the operation mode of the fourth electronic device 414 to the registration mode, e.g., a Soft-AP mode in operation 513.

In operation 515, the fourth electronic device 414 may establish a connection with the fifth electronic device 420 in the Soft-AP mode. For example, the fourth electronic device 414 which operates in the Soft-AP mode may broadcast a beacon message. Upon receiving the beacon message, the fifth electronic device 420 may access the fourth electronic device 414 based on the received beacon message, thereby a connection between the fourth electronic device 414 and the fourth electronic device 420 may be established. When the connection between the fourth electronic device 414 and the fourth electronic device 420 is established, the fourth electronic device 414 may be managed and/or controlled through an application of the fifth electronic device 420.

In operation 517, the fifth electronic device 420 may input access information of an AP, e.g., an AP 430, to which the fourth electronic device 414 may be connected through the UI. The fifth electronic device 420 may transmit, to the fourth electronic device 414, a message including the inputted access information of the AP 430. For example, the fifth electronic device 420 may transmit, to the fourth electronic device 414, the message including the access information of the AP 430 through a communication circuit (e.g., a communication circuit 202 in FIG. 2), and an SSID and a password included in the access information of the AP 430 may be MyHome 1 and passwd123, respectively.

In operation 519, the fourth electronic device 414 may establish a connection with the AP 430. In an embodiment, the fourth electronic device 414 may access the AP 430 by using the access information of the AP 430 received from the fifth electronic device 420. In an embodiment, the fourth electronic device 414 may transmit, to the AP 430, an access request message including the access information of the AP 430 received from the fifth electronic device 420. The AP 430 may receive the access request message from the fourth electronic device 414. If the access information of the AP included in the access request message received from the fourth electronic device 414 is identical to the access information of the AP 430, the AP 430 may include access request acceptance information indicating that the access request is accepted into an access response message which is a response message to the access request message to transmit the access response message to the fourth electronic device 414. In an embodiment, because the access request message received from the fourth electronic device 414 includes the same SSID and password, e.g., MyHome 1 and passwd123, as the SSID and password of the AP 430, the AP 430 may determine to accept the access request to the AP 430 of the fourth electronic device 414 and transmit, to the fourth electronic device 414, the access response message including the access request acceptance information indicating that the access request is accepted. Upon receiving the access response message from the AP 430, the fourth electronic device 414 may access the AP 430 and establish a connection with the AP 430.

In operation 521, the fourth electronic device 414 may transmit, to the AP 430, a registration request message for registering the fourth electronic device 414 at the cloud server 440. In an embodiment, the registration request message may include registration information, and the registration information may include device information, e.g., a name of the fourth electronic device 414 and location information of the fourth electronic device 414, which is used for identifying an electronic device, e.g., the fourth electronic device 414, which intends to be registered. In an embodiment, the registration request message may further include AP access information. For example, the AP access information may be information for identifying an AP which the electronic device (e.g., the fourth electronic device 414) which intends to be registered accesses, and may include access information (e.g., an SSID and a password) of the AP (e.g., the AP 430) which the fourth electronic device 414 accesses. In operation 523, the AP 430 may transmit, to the cloud server 440, a registration request message including the registration information included in the registration request message received from the fourth electronic device 414 in operation 521.

Upon receiving the registration request message from the AP 430, the cloud server 440 may register the fourth electronic device 414 based on the received registration request message in operation 525. In an embodiment, the cloud server 440 may store the registration information, e.g., the device information and AP identification information, which is included in the registration request message received from the AP 430. For example, if the name of the fourth electronic device 414 is "Refri1", the cloud server 440 may register the fourth electronic device 414 in a form of [Refri1—MyHome 1, passwd123].

In operation 525, the cloud server 440 may include the detected AP access information of the fourth electronic device 414 into an AP-connected device list stored in the cloud server 440 to update the AP-connected device list. In an embodiment, the AP-connected device list may be generated for each of APs included in the IoT network. An operation (e.g., an operation 457) of updating the AP-connected device list has been described in FIG. 4, so a description of the operation of updating the AP-connected device list will be omitted.

FIG. 6 is a diagram schematically illustrating a registration procedure of an AP-possible device in a wireless communication network according to certain embodiments.

Referring to FIG. 6, a wireless communication network, e.g., an IoT network may include a plurality of direct-connected devices (e.g., electronic devices 411-414 in FIG. 4), a user device 610, at least one AP-possible device 620, at least one AP (e.g., an AP 430 in FIG. 4), and a cloud server 630. Although ordinal representations are used in FIG. 6, it should be noted that the ordinal representations are used to distinguish corresponding objects (e.g., electronic devices) and not to limit the order of the corresponding objects.

Each of the plurality of direct-connected devices may be an IoT device. In one embodiment, the user device 610 may be a smart phone. In an embodiment, the plurality of direct-connected devices may be communicatively connected to the user device 610, and may be controlled and/or managed by the user device 610. In an embodiment, the plurality of direct-connected devices may be an IoT device which is registered by using the same account, e.g., the same user account. In an embodiment, the AP-possible device 620 may be an electronic device capable of operating as an AP. Electronic devices capable of being AP-possible devices have been described in FIG. 3, so a description of the electronic devices capable of being the AP-possible devices will be omitted.

In an embodiment, in operation 651, the user device 610 may detect that a request for registering the AP-possible device 620 at the cloud server 630 is inputted through a UI. In an embodiment, the user device 610 may transmit, to the AP-possible device 620, a registration mode switch request message for requesting to switch an operation mode of the AP-possible device 620 to a registration mode in order to register the AP-possible device 620 at the cloud server 630. In an embodiment, a registration mode may be a mode for registering an AP-possible device at a cloud server, and for example, an on-boarding mode may be the registration mode. Upon receiving the registration mode switch request message from the user device 610, the AP-possible device 620 may switch the operation mode of the AP-possible device 620 to the registration mode, e.g., the on-boarding mode. In an embodiment, the AP-possible device 620 may operate in a Soft-AP mode upon switching to the on-boarding mode. In another embodiment, the AP-possible device 620 may perform an operation of activating a BLE function, activating a quick response (QR) scan function, or connecting to a server through a wired LAN upon switching to the on-boarding mode.

In operation 652, the AP-possible device 620 may establish a connection with the user device 610 in the on-boarding mode. As the connection between the AP-possible device 620 and the user device 610 is established, the AP-possible device 620 may be managed and/or controlled through an application of the user device 610.

In operation 653, the AP-possible device 620 may transmit a registration request message for registering the AP-possible device 620 to the cloud server 630. In an embodiment, the registration request message may include registration information. For example, the registration information may include device information (e.g., a name of the AP-possible device 620 and location information of the AP-possible device 620) used for identifying an electronic device (e.g., the AP-possible device 620) which intends to be registered. In an embodiment, the registration request message may include AP mode information, e.g., a parameter AP_mode, which is information indicating whether it is possible for the electronic device (e.g., the AP-possible device 620) which intends to be registered to perform an AP operation. For example, if the AP_mode is set to true, it may indicate that it is possible for the AP-possible device 620 to perform the AP operation, and if the AP_mode is set to false, it may indicate that it is impossible for the AP-possible device 620 to perform the AP operation. In FIG. 6, it has been assumed that the AP-possible device 620 is the electronic device capable of performing the AP operation, so the AP_mode may be set to true.

In operation 654, the cloud server 630 may register the AP-possible device 620 based on the registration request message received from the AP-possible device 620. In an embodiment, the cloud server 630 may store the registration information, e.g., the device information and the AP mode information (e.g., the AP_mode) included in the registration request message received from the AP-possible device 620. For example, if the name of the AP-possible device 620 is "HUB1", the cloud server 630 may register the AP-possible device 620 in a form of [HUB1—AP-possible device].

In operation 655, the cloud server 630 may transmit, to the user device 610, an AP mode authority request message for requesting authority required for AP mode switching for the AP-possible device 620. In an embodiment, the AP mode may be a mode for performing the AP operation.

Upon receiving, from the cloud server 630, the AP mode authority request message for requesting the authority required for the AP mode switching for the AP-possible device 620, the user device 610 may output, through the UI, a message for inquiring whether to accept the authority request required for the AP mode switching for the AP-possible device 620 in operation 656. In an embodiment, the message inquiring whether to accept the authority request required for the AP mode switching for the AP-possible device 620 may be outputted in a pop-up form.

The user device 610 may detect that information indicating that the authority request required for the AP mode switching for the AP-possible device 620 is accepted is inputted through the UI, and in operation 656, may transmit, to the cloud server 630, an AP mode authority response message as a response message to the AP mode authority request message. In an embodiment, the AP mode authority response message may include information indicating whether the authority request required for the AP ode switching through the AP mode authority request message is accepted. In FIG. 6, the user device 610 inputs the information indicating that the authority request required for the AP mode switching for the AP-possible device 620 is accepted, so the AP mode authority response message may include the information indicating that the authority request required for the AP mode switching is accepted. In an embodiment, the AP mode authority response message may further include information, e.g., AP_mode, indicating whether it is possible to perform an AP operation (e.g., AP operation capabilities), and it has been assumed that the AP-possible device 620 is the electronic device which is capable of performing the AP operation in FIG. 6, so the AP_mode may be set to true. In an embodiment, if the user device 610 does not want to perform the AP operation for the AP-possible device 620, the AP mode authority response message may include the AP_mode which is set to false.

Upon receiving the AP mode authority response message from the user device 610, the cloud server 630 may identify that the AP-possible device 620 is capable of performing the AP operation and the authority request for the AP mode switching is accepted in operation 657. The cloud server 630 may include the device information of the AP-possible device 620 into an AP mode-possible device list stored in the cloud server 630 to update the AP mode-possible device list. In an embodiment, the AP mode-possible device list may include information about AP-possible devices capable of performing the AP operation, for example, capable of operating in the AP mode. For example, an AP mode-possible device list in a case that in the IoT network, electronic devices capable of operating as an AP include the AP-possible device 620 whose name is "HUB1", another AP-possible device whose name is "Device 1", and still another AP-possible device whose name is "Device 2" is shown in FIG. 6.

FIG. 7 is a signal flow diagram schematically illustrating a registration procedure of an AP-possible device in a wireless communication network according to certain embodiments.

Referring to FIG. 7, a signal flow diagram of a registration procedure of an AP-possible device shown in FIG. 7 may be a signal flow diagram corresponding to a registration procedure of an AP-possible device described in FIG. 6, so it will be assumed that a structure of a wireless communication network is identical to a structure of a wireless communication network described in FIG. 6.

In operation 711, a user device 610 may transmit a registration mode switch request message to an AP-possible device 620. For example, the user device 610 may detect that a request for registering the AP-possible device 620 at the cloud server 630 is inputted through a UI, and transmit a registration mode switch request message to the AP-possible device 620. The user device 610 may transmit the registration mode switch request message for requesting to switch an operation mode of the AP-possible device 620 to a registration mode in order to register the AP-possible device 620 at the cloud server 630. For example, the user device 610 may transmit the registration mode switch request message to the AP-possible device 620 based on a short-range communication scheme (e.g., a Bluetooth, BLE, Wifi, NFC, or RFID scheme). Upon receiving the registration mode switch request message, the AP-possible device 620 may switch the operation mode of the AP-possible device 620 to the registration mode, e.g., an on-boarding mode in operation 713.

An operation of switching to the on-boarding mode in the AP-possible device 620 through operations 711 and 713 may be performed based on providing a user with guide through the user device 610. For example, the user device 610 may provide guide information for guiding the user to switch the operation mode of the AP-possible device 620 to the on-boarding mode through a speaker or a display. In this case, the user may provide a designated input (e.g., a button input) to the AP-possible device 620 with reference to the guide information, and the AP-possible device 620 may switch the operation mode of the AP-possible device 620 to the on-boarding mode based on the designated input.

In operation 715, the AP-possible device 620 may establish a connection with the user device 610 in the on-boarding mode. For example, a UI for selecting the AP-possible device 620 operating in the on-boarding mode may be provided in the user device 610, and the connection between the AP-possible device 620 and the user device 610 may be established automatically or based on information inputted through the UI, e.g., information inputted according to selection of a user. As the connection between the AP-possible device 620 and the user device 610 is established, the AP-possible device 620 may be managed and/or controlled through an application of the user device 610.

In operation 717, the AP-possible device 620 may transmit a registration request message for registering the AP-possible device 620 to the cloud server 630. The registration request message may include registration information, and the registration information may include device information (e.g., a name of the AP-possible device 620 and location information of the AP-possible device 620) used for identifying an electronic device (e.g., the AP-possible device 620) which intends to be registered. In an embodiment, the registration request message may include AP mode information, e.g., a parameter AP_mode, which is information indicating whether it is possible for the electronic device (e.g., the AP-possible device 620) which intents to be registered to perform an AP operation. In FIG. 7, it will be assumed that the AP-possible device 620 is an electronic device capable of performing the AP operation, so the AP_mode may be set to true.

In operation 718, the cloud server 630 may register the AP-possible device 620 based on the registration request message received from the AP-possible device 620. In an embodiment, the cloud server 630 may store the registration information, e.g., the device information and the AP mode information, e.g., the AP_mode included in the registration request message received from the AP-possible device 620. For example, if the name of the AP-possible device 620 is "HUB1", the cloud server 630 may register the AP-possible device 620 in a form of [HUB1—AP-possible device].

In operation 719, the cloud server 630 may transmit, to the user device 610, an AP mode authority request message for requesting authority required for AP mode switching (e.g., a mode in which an AP operation is performed) for the AP-possible device 620.

Upon receiving, from the cloud server 630, the AP mode authority request message for requesting the authority required for the AP mode switching for the AP-possible device 620, the user device 610 may output, through the UI, a message for inquiring whether to accept the authority request required for the AP mode switching for the AP-possible device 620 in operation 721. In an embodiment, the message inquiring whether to accept the authority request required for the AP mode switching for the AP-possible device 620 may be outputted in a pop-up form.

In operation 723, the user device 610 may detect that information indicating that the authority request required for the AP mode switching for the AP-possible device 620 is accepted is inputted through the UI. In operation 725, the user device 610 may transmit, to the cloud server 630, an AP mode authority response message as a response message to the AP mode authority request message. In an embodiment, the AP mode authority response message may include information indicating whether the authority request required for the AP mode switching through the AP mode authority request message is accepted. In FIG. 7, the user device 610 inputs the information indicating that the authority request required for the AP mode switching for the AP-possible device 620 is accepted, so the AP mode authority response message may include the information indicating that the authority request required for the AP mode switching is accepted. In an embodiment, the AP mode authority response message may further include information, e.g., AP_mode, indicating whether it is possible to perform an AP operation, and it has been assumed that the AP-possible device 620 is the electronic device which is capable of performing the AP operation in FIG. 7, so the AP_mode may be set to true. In an embodiment, if the user device 610 does not want to perform the AP operation for the AP-possible device 620, the AP mode authority response message may include the AP_mode which is set to false.

Upon receiving the AP mode authority response message from the user device 610, the cloud server 630 may identify that the AP-possible device 620 is capable of performing the AP operation and the authority request for the AP mode switching is accepted in operation 727. The cloud server 630 may include the device information of the AP-possible device 620 into an AP mode-possible device list stored in the cloud server 630 to update the AP mode-possible device list.

FIG. 8 is a diagram schematically illustrating an example of an AP recovery procedure in a wireless communication network according to certain embodiments.

Referring to FIG. 8, a wireless communication network, e.g., an IoT network may include a plurality of electronic devices, e.g., a first electronic device 811, a second electronic device 812, a third electronic device 813, a fourth electronic device 814, a fifth electronic device 820, a sixth electronic device 850, and a seventh electronic device 860, an AP 830, and a cloud server 840. Although ordinal representations are used in FIG. 8, it should be noted that the ordinal representations are used to distinguish corresponding objects (e.g., electronic devices) and not to limit the order of the corresponding objects.

Each of electronic devices 811-814 may be an IoT device and may be a direct-connected device. Electronic device 820 may be a user device (e.g., a smart phone). Electronic devices 860 and 870 may be AP-possible devices. Electronic devices 811-814 may be communicatively connected to the electronic device 820, and may be controlled and/or managed by the electronic device 820. The electronic devices 850 and 860 may be communicatively connected and controlled/managed by the electronic device 820.

Electronic devices 811-814 may access the AP 830, and may be registered and connected to the cloud server 840 through the AP 830. Electronic devices 811-814 may be direct-connected devices which perform a registration procedure of a direct-connected device as described in FIGS. 4 and 5, so a description of the registration procedure will be omitted.

Electronic devices 850, 860 are registered and connected to the cloud server 840. Electronic devices 850 and 860 may be a direct-connected device which performs a registration procedure of an AP-possible device as described in FIGS. 6 and 7, so a description of the registration procedure will be omitted.

In operation 871, a failure state may occur in the AP 830. A scheme of detecting that a failure state occurs in an AP has been described in FIG. 3, a description of the scheme of detecting that the failure state occurs in the AP will be omitted.

As the failure state occurs in the AP 830, in operation 872, the electronic devices 811-814 which have been connected to the AP 830 may be disconnected from the AP 830. So, the electronic devices 811-814 may not be connected to the cloud server 840 through the AP 830, so the first electronic device 811, the second electronic device 812, the third electronic device 813, and the fourth electronic device 814 may be disconnected from the cloud server 840.

In operation 873, the cloud server 840 may update an AP-connected device list based on identifying that the failure state of the AP 830 has occurred. The cloud server 840 may detect that connections with direct-connected devices, e.g., the electronic devices 811-814, which have been connected to the cloud server 840 through the AP 830, have been released. The connections among the cloud server 840 and the electronic devices 811-814, which have been connected to the cloud server 840 through the AP 830, have been released, so the cloud server 840 may identify that the failure state has occurred in the AP 830. In an embodiment, a scheme of detecting that a failure state occurs in an AP described in FIG. 3 may be used.

The cloud server 840 may update an AP-connected device list. If an SSID of the AP 830 is "MyHome1", and names of the electronic devices 811-814 are "Device1", "Device2", "Device3", and "Refri1", respectively, the AP-connected device list may be updated to indicate that all of the direct-connected devices connected to the AP 830 have been disconnected as shown in FIG. 8.

In operation 874, the cloud server 840 detects that the failure state has occurred in the AP 830, the cloud server 840 may select an AP possible-device which will operate as a temporary AP instead of the AP 830. The scheme of selecting an AP possible-device which will operate as a temporary AP instead of an AP in which a failure state occurs among a plurality of AP possible-devices described in FIG. 3 may be used during operation 874.

In FIG. 8, it will be assumed that electronic devices 850 and 860 are selected as AP-possible devices which will operate as temporary APs. In operation 874, the cloud server 840 may transmit, to the fifth electronic device 820, a temporary AP notification message which notifies that specific AP possible-devices, e.g., the sixth electronic device 850 and the seventh electronic device 860, have been selected as the temporary APs. An operation of transmitting the temporary AP notification message to the fifth electronic device 820 in the cloud server 840 may be optionally performed.

In operation 875-1, the cloud server 840 may transmit, to the electronic device 850 selected as the temporary AP, an AP operation command message for requesting to perform an AP operation instead of the AP 830. The AP operation command message may be a message for commanding to perform the AP operation, and may include access information of an AP, e.g., the AP 830. An SSID and a password included in the access information of the AP 830 may be MyHome1 and passwd123, respectively. In operation 875-1, the sixth electronic device 850 may perform the AP operation based the access information of the AP 830 included in the AP operation command message received from the cloud server 840. Performing the AP operation may be expressed as that an AP mode is on.

In operation 875-2, the cloud server 840 may transmit, to the seventh electronic device 860 selected as the temporary AP, an AP operation command message for requesting to perform an AP operation instead of the AP 830. In an embodiment, the AP operation command message may be a message for commanding to perform the AP operation, and may include the access information of the AP, e.g., the AP 830. In operation 875-2, the seventh electronic device 860 may perform the AP operation based on the access information of the AP 830 included in the AP operation command message.

In operation 876, electronic devices 811-814 may perform an access operation based on the access information of the AP, e.g., the AP 830. As a result of performing the access operation, the electronic devices 812-814 access the sixth electronic device 850 to be connected to the cloud server 840 through the sixth electronic device 850. In contrast, the first electronic device 811 may not be connected to another AP possible-device while still being disconnected from the AP 830.

In operation 877, although the seventh electronic device 860 performs the AP operation based on the access information of the AP 830, no direct-connected device may access the seventh electronic device 860. If no direct-connected device is connected to the cloud server 840 through the seventh electronic device 860 for a set time, the cloud server 840 may transmit, to the seventh electronic device 860, an AP operation termination message for commanding to terminate the AP operation, or may request the fifth electronic device 820 to transmit the AP operation termination message to the seventh electronic device 860. Upon receiving the AP operation termination message from the cloud server 840, the seventh electronic device 860 may terminate the AP operation.

In operation 878, the cloud server 840 may transmit, to the fifth electronic device 820, a failure notification message for notifying that the failure state has occurred in the AP 830, and checking whether the AP 830 in which the failure has occurred has been recovered or whether to select a new AP which will replace the AP 830 in which the failure state has occurred. Upon receiving the failure notification message from the cloud server 840, the fifth electronic device 820 may output the failure notification message through, for example, a UI. After outputting the failure notification message, the fifth electronic device 820 may receive information indicating that the AP 830 in which the failure state has occurred has been recovered through the UI, or receive information indicating that a new AP will be selected instead of the AP 830 in which the failure state has occurred.

Upon inputting the information indicating that the new AP will be selected, the fifth electronic device 820 may receive access information of a new AP. Upon receiving via input through the UI, the information indicating that the new AP will be selected and the access information of the new AP, the fifth electronic device 820 may transmit a failure notification response message to the cloud server 840. The failure notification response message may include the information indicating that the new AP will be selected and the access information of the new AP. Upon inputting, through the UI, the information indicating that the AP 830 in which the failure state has occurred has been recovered, the fifth electronic device 820 may transmit, to the cloud server 840, a failure notification response message including the information indicating that the AP 830 has been recovered.

Upon receiving the failure notification response message from the fifth electronic device 820, the cloud server 840 may identify that the AP 830 has been recovered if the failure notification response message includes the information indicating that the AP 830 has recovered. If the AP 830 has been recovered, the cloud server 840 may transmit, to the sixth electronic device 850 which operates as the temporary AP instead of the AP 830, the AP operation termination message for commanding to terminate the AP operation. Upon receiving the AP operation termination message from the cloud server 840, the sixth electronic device 850 may terminate the AP operation. Terminating the AP operation may be expressed as that the AP mode is off.

The AP 830 has been recovered, so the electronic devices 811-814 may access the AP 830 to establish connections with the AP 830, thereby being connected to the cloud server 840 through the established connections in operation 880.

The electronic devices 811-814 may recover connections with the AP 830 which is an original AP.

In operation 878, upon receiving the failure notification response message from the fifth electronic device 820, the cloud server 840 may identify that the AP 830 will be changed to another AP if the failure notification response message includes the access information of the new AP which will replace the AP 830 in which the failure state has occurred. As connections among the electronic devices 811-814, and the new AP are established, the cloud server 840 may transmit, to the sixth electronic device 850 operating as the temporary AP instead of the AP 830, an AP operation termination message commanding to terminate an AP operation in operation 879 because an AP recovery procedure from the AP 830 to the new AP has been completed. Upon receiving the AP operation termination message from the cloud server 840, the sixth electronic device 850 may terminate the AP operation.

FIGS. 9A and 9B are signal flow diagrams schematically illustrating an example of an AP recovery procedure in a wireless communication network according to certain embodiments.

Referring to FIGS. 9A and 9B, signal flow diagrams of an example of an AP recovery procedure shown in FIGS. 9A and 9B may be signal flow diagrams corresponding to an example of an AP recovery procedure described in FIG. 8, so it will be assumed that a structure of a wireless communication network is identical to a structure of a wireless communication network described in FIG. 8. Although ordinal representations are used in FIGS. 9A and 9B, it should be noted that the ordinal representations are used to distinguish corresponding objects (e.g., electronic devices) and not to limit the order of the corresponding objects. A case that electronic devices 811-814 are connected to an AP 830, and then a failure state occurs in the AP 830 has been described in FIG. 8. However, a case that the electronic devices 811-813 are connected to the AP 830, and then the failure state occurs in the AP 830 will be described in FIGS. 9A and 9B. Further, a case has been described in FIG. 8 that the electronic devices 812-814 are connected to a cloud server 840 through a sixth electronic device 850. The electronic device 850 performs an AP operation instead of the AP 830 in which the failure state has occurred. However, a case will be described in FIGS. 9A and 9B that the electronic devices 811 and 812 are connected to the cloud server 840 through the sixth electronic device 850 performing the AP operation instead of the AP 830 in which the failure state has occurred.

Referring to FIGS. 9A and 9B, in operation 911, as the failure state occurs in the AP 830, the AP 830 is disconnected from the cloud server 840, and the cloud server 840 may detect that the failure state occurs in the AP 830. The scheme of detecting that a failure state occurs in an AP described in FIG. 3 may be used during operation 911.

As the failure state has occurred in the AP 830, in operations 913, 915, and 917, the electronic devices 811-813 may be disconnected from the AP 830. Therefore, the electronic devices 811-813 may not be connected to the cloud server 840 through the AP 830, so the electronic devices 811-813 may be disconnected from the cloud server 840.

In operation 919, the cloud server 840 may identify that the failure state has occurred in the AP 830. The scheme of detecting that a failure state occurs in an AP described in FIG. 3 may be used during operation 919. All of the first electronic device 811, the second electronic device 812, and the third electronic device 813 have been disconnected as the failure state has occurred in the AP 830, so the cloud server 840 may update an AP-connected device list managed in the cloud server 840 in operation 919. The AP-connected device list may be updated to indicate that all of the direct-connected devices which have been connected to the AP 830 have been disconnected.

In operation 921, connections among the cloud server 840 and all of direct-connected devices, e.g., the electronic devices 811-813, have been released, so the cloud server 840 may transmit signals, e.g., pings, for checking whether electronic devices 811-813 may communicate with the cloud server 840 in order to additionally check a disconnection state. If responses to the pings are not received within a set time, the cloud server 840 may identify that the electronic devices 811-813 have been disconnected from the cloud server 840. In an embodiment, operation 921 may be optionally performed.

As the failure state has occurred in the AP 830, the cloud server 840 may select an AP possible-device which will operate as a temporary AP instead of the AP 830. The scheme of selecting an AP possible-device which will operate as a temporary AP instead of a failed AP described in FIG. 3 may be used.

In FIGS. 9A and 9B, it will be assumed that the sixth electronic device 850 and electronic device 860 are selected as AP-possible devices which will operate temporary APs. The cloud server 840 may transmit, to the fifth electronic device 820, a temporary AP notification message which notifies that specific AP possible-devices, e.g., the sixth electronic device 850 and the seventh electronic device 860 are selected as the temporary APs. In an embodiment, an operation of transmitting the temporary AP notification message to the fifth electronic device 820 in the cloud server 840 may be optionally performed.

In operation 923, the cloud server 840 may transmit, to the sixth electronic device 850 selected as the temporary AP, an AP operation command message for requesting to perform an AP operation instead of the AP 830 in which the failure state has occurred. The AP operation command message may be a message for commanding to perform the AP operation, and may include access information of an AP, e.g., the AP 830, in which the failure state has occurred.

In operation 925, the cloud server 840 may transmit, to the seventh electronic device 860 selected as the temporary AP, an AP operation command message for requesting to perform an AP operation instead of the AP 830 in which the failure state has occurred. In an embodiment, the AP operation command message may include access information of an AP, e.g., the AP 830, in which the failure state has occurred.

In operation 927, the sixth electronic device 850 may perform the AP operation based on the access information of the AP 830 included in the AP operation command message received from the cloud server 840. In an embodiment, the sixth electronic device 850 may operate in an AP mode based on the access information of the AP 830.

In operation 929, the seventh electronic device 860 may perform the AP operation based on the access information of the AP 830 included in the AP operation command message received from the cloud server 840. In an embodiment, the seventh electronic device 860 may operate in an AP mode based on the access information of the AP 830.

The electronic devices 811-813 may perform an access operation based on the access information of the AP, e.g., the AP 830. As a result of performing the access operation, in operation 931, the first electronic device 811 may access the sixth electronic device 850 to be connected to the cloud server 840 through the sixth electronic device 850. In operation 933, the second electronic device 812 may access the sixth electronic device 850 to be connected to the cloud server 840 through the sixth electronic device 850. In contrast, the third electronic device 813 may not to connected to another AP-possible device while still being disconnected from the AP 830. Connections of the first electronic device 811 and the second electronic device 812 may be recovered through operations 931 and 933.

Some of operations 923 to 933 may be changed in order or may be performed substantially simultaneously.

Although the seventh electronic device 860 performs the AP operation based on the access information of the AP 830, no direct-connected device may access the seventh electronic device 860. If no direct-connected device is connected to the cloud server 840 through the seventh electronic device 860 for set time, the cloud server 840 may transmit, to the electronic device 860, an AP operation termination message for commanding to terminate the AP operation in operation 935. Upon receiving the AP operation termination message from the cloud server 840, the seventh electronic device 860 may terminate the AP operation in operation 937.

In operation 939, the cloud server 840 may transmit, to the fifth electronic device 820, a failure notification message for notifying that the failure state has occurred in the AP 830, and checking whether the AP 830 in which the failure state has occurred has been recovered or whether to select new AP which will replace the AP 830 in which the failure state has occurred. Upon receiving the failure notification message from the cloud server 840, the fifth electronic device 820 may output the failure notification message through, e.g., a UI. After outputting the failure notification message, the fifth electronic device 820 may input, through, e.g., the UI, information indicating that the AP 830 in which the failure state has occurred has been recovered, or may input access information of the new AP which will replace the AP 830 in which the failure state has occurred. A case of inputting the information indicating that the AP 830 in which the failure state has occurred has been recovered through the UI will be described in FIGS. 9A and 9B.

The fifth electronic device 820 may identify that the AP 830 has been recovered in operation 941, and may input the information indicating that the AP 830 in which the failure state has occurred has been recovered through the UI in operation 943. Upon inputting the information indicating that the AP 830 in which the failure state has occurred has been recovered through the UI, the fifth electronic device 820 may transmit, to the cloud server 840, a failure notification response message including the information indicating that the AP 830 has been recovered in operation 945.

Upon receiving the failure notification response message from the fifth electronic device 820, the cloud server 840 may identify that the AP 830 has been recovered because the information indicating that the AP 830 has been recovered is included in the failure notification response message. The AP 830 has been recovered, so the cloud server 840 may transmit, to the sixth electronic device 850 which operates as the temporary AP instead of the AP 830, an AP operation termination message for commanding to terminate the AP operation in operation 947. Upon receiving the AP operation termination message from the cloud server 840, the sixth electronic device 850 may terminate the AP operation.

In an embodiment, the AP 830 has been recovered, so the first electronic device 811 may access the AP 830 to establish a connection with the AP 830, thereby being connected to the cloud server 840 through the established connection in operation 949. In operation 951, the second electronic device 812 may access the AP 830 to establish a connection with the AP 830, thereby being connected to the cloud server 840 through the established connection. In operation 953, the third electronic device 813 may access the AP 830 to establish a connection with the AP 830, thereby being connected to the cloud server 840 through the established connection. The electronic device 811-813 may recover connections with the AP 830 which is an original AP.

The cloud server 840 may perform an operation (e.g., operation 939) of transmitting, to the fifth electronic device 820, a message which informs that the failure state has occurred in the AP 830 before performing an operation (e.g., operations 923 and 925) of transmitting the AP operation command messages to the sixth electronic device 850 and the seventh electronic device 880. For example, a user may identify, through the UI provided by the fifth electronic device 820, that the failure state has occurred in the AP 830 and the sixth electronic device 850 and the seventh electronic device 880 perform the AP operation.

FIGS. 10A and 10B are signal flow diagrams schematically illustrating another example of an AP recovery procedure in a wireless communication network according to certain embodiments.

Referring to FIGS. 10A and 10B, signal flow diagrams of another example of an AP recovery procedure shown in FIGS. 10A and 10B may be signal flow diagrams corresponding to an example of an AP recovery procedure described in FIG. 8, so it will be assumed that a structure of a wireless communication network is identical to a structure of a wireless communication network described in FIG. 8. Although ordinal representations are used in FIGS. 10A and 10B, it should be noted that the ordinal representations are used to distinguish corresponding objects (e.g., electronic devices) and not to limit the order of the corresponding objects. A case that electronic devices 811-814 are connected to an AP 830 and then a failure state occurs in an AP 830 has been described in FIG. 8. However, a case that the electronic device 811-813 are connected to the AP 830 and then the failure state occurs in the AP 830 will be described in FIGS. 10A and 10B. Further, a case has been described in FIG. 8 that the electronic devices 812, 813, and the electronic device 814 are connected to a cloud server 840 through a electronic device 850 which performs an AP operation instead of the AP 830 in which the failure state occurs.

However, a case will be described in FIGS. 10A and 10B that the electronic devices 811-812 are connected to the cloud server 840 through the electronic device 850 and a electronic device 860 which perform the AP operation instead of the AP 830 in which the failure state occurs.

Referring to FIGS. 10A and 10B, the AP 830 may be in an active state in operation 1001, and the first electronic device 811 may access the AP 830 to establish a connection with the AP 830 in operation 1002-1. In operation 1002-2, the second electronic device 812 may access the AP 830 to establish a connection with the AP 830. In operation 1002-3, the third electronic device 813 may access the AP 830 to establish a connection with the AP 830. While the electronic devices 811-813 are connected to the AP 830, the AP 830 may be powered off in operation 1003, so a failure state may occur in the AP 830.

As the failure state occurs in the AP 830, the first electronic device 811 may be disconnected from the AP 830 in operation 1004-1. In operation 1004-2, the second electronic device 812 may be disconnected from the AP 830. In operation 1004-3, the third electronic device 813 may be disconnected from the AP 830. As the electronic devices 811-813 have been disconnected from the AP 830, the cloud server 840 may detect the electronic devices 811-813 have been disconnected from the AP 830 in operations 1005, 1006, and 1007.

In operation 1008, as connections among the cloud server 840 and the electronic devices 811-813 connected to the cloud server 840 through the AP 830 have been released, the cloud server 840 may identify that the failure state has occurred in the AP 830.

A scheme of detecting that a failure state occurs in an AP has been described in reference to FIG. 3 may during operation 1008. All of the electronic devices 811-813 have been disconnected as the failure state has occurred in the AP 830, the cloud server 840 may update an AP-connected device list managed by the cloud server 840 in operation 1008. In an embodiment, the AP-connected device list may be updated so that the AP-connected device list indicates that all direct-connected devices which have been connected to the AP 830 have been disconnected.

In operation 1009, the connections among the cloud server 840 and all of the direct-connected devices, e.g., the electronic devices 811-813, have been released, so the cloud server 840 may transmit a signal, e.g., a ping, for checking whether it is possible for the electronic devices 811-813 to communicate with the cloud server 840 in order to additionally check a disconnection state. If no response to the ping is received within a set time, the cloud server 840 may identify that the electronic devices 811-813 have been disconnected from the cloud server 840. In an embodiment, operation 1009 may be optionally performed.

In operation 1010, the cloud server 840 may transmit, to the fifth electronic device 820 which is a user device, a failure alarm message informing that the failure state has occurred in the AP 830. Upon receiving the failure alarm message from the cloud server 840, the fifth electronic device 820 may output the failure alarm message informing that the failure state has occurred in the AP 830, for example, through a UI in operation 1011.

The failure state has occurred in the AP 830, so the cloud server 840 may select an AP possible-device which will operate as a temporary AP instead of the AP 830 in operation 1012. The cloud server 840 may select the AP possible-device which will operate as the temporary AP from an AP mode-possible device list, and it will be assumed that the cloud server 840 selects the AP possible-device which will operate as the temporary AP based on location information of the electronic devices 811-813 which have been disconnected, and the sixth electronic device 850, the seventh electronic device 860, and an eighth electronic device 1060 among AP-possible devices which correspond to the AP-connected device list are selected based on the location information of the first electronic device 811, the second electronic device 812, and the third electronic device 813.

The scheme of selecting an AP-possible device which will operate as a temporary AP instead of an AP in which a failure state occurs among a plurality of AP-possible devices, for example, a scheme of selecting the AP-possible device which will operate as the temporary AP based on location information described in FIG. 3, may be used during operation 1012.

The cloud server 840 may transmit an AP operation command message for requesting to perform an AP operation instead of the AP 830 in which the failure state has occurred to the selected AP-possible devices, e.g., the sixth electronic device 850, the seventh electronic device 860, and the eighth electronic device 1060 in operations 1013, 1014, and 1015, respectively. In an embodiment, the AP operation command message may be a message commanding to perform the AP operation, and may include access information (e.g., an SSID and a password) of the AP, e.g., the AP 830, in which the failure state has occurred.

In operation 1016, the sixth electronic device 850 may perform the AP operation based on the access information of the AP 830 included in the AP operation command message received from the cloud server 840. In an embodiment, the sixth electronic device 850 may operate in the AP mode based on the access information of the AP 830.

In operation 1017, the seventh electronic device 860 may perform the AP operation based on the access information of the AP 830 included in the AP operation command message received from the cloud server 840. In an embodiment, the seventh electronic device 860 may operate in the AP mode based on the access information of the AP 830.

In operation 1018, the eighth electronic device 1060 may perform the AP operation based on the access information of the AP 830 included in the AP operation command message received from the cloud server 840. The eighth electronic device 1060 may operate in the AP mode based on the access information of the AP 830.

After transmitting the AP operation command message to the electronic devices 850, 860, 1060, the cloud server 840 may wait set time while expecting that the electronic devices 811-813 will be connected through the AP-possible devices, e.g., electronic devices 850, 860, and 1060 in operation 1019.

The electronic device 811-813 may perform an access operation based on access information of an AP, for example, the AP 830. As a result of performing the access operation, in operation 1020, the first electronic device 811 may access the sixth electronic device 850 to be connected to the cloud server 840 through the sixth electronic device 850. In operation 1021, the second electronic device 812 may access the seventh electronic device 860 to be connected to the cloud server 840 through the seventh electronic device 860. In contrast, the third electronic device 813 may not be connected to another AP-possible device while still being disconnected from the AP 830.

Although the eighth electronic device 1060 performs the AP operation based on the access information of the AP 830, no direct-connected device may access the eighth electronic device 1060. If no direct-connected device is connected to the cloud server 840 through the eighth electronic device 1060 during the set time, the cloud server 840 may transmit, to the eighth electronic device 1060, an AP operation termination message commanding to terminate the AP operation in operation 1022. Upon receiving the AP operation termination message from the cloud server 840, the eighth electronic device 1060 may terminate the AP operation in operation 1023.

The cloud server 840 may transmit, to the fifth electronic device 820, a failure notification message for checking whether the AP 830 in which the failure state has occurred has been recovered or whether to select a new AP which will replace the AP 830 in which the failure state has occurred. Upon receiving the failure notification message from the cloud server 840, the fifth electronic device 820 may output the failure notification message, e.g., through a UI. In operation 1024, the fifth electronic device 820 configures a new AP 1050 which is the new AP which will replace the AP 830 upon detecting that the failure state occurred in the AP 830, and in operation 1025, the new AP 1050 may be turned on.

Upon outputting the failure notification message, the fifth electronic device 820 may input access information for the new AP which will replace the AP 830 in which the failure state has occurred, for example, through a UI in operation 1026. For example, a case that access information (e.g., an SSID and a password) of the new AP 1050 which is the new AP which will replace the AP 830 in which the failure state has occurred is inputted through the UI will be described in FIGS. 10A and 10B. In operation 1027, the fifth electronic device 820 may transmit, to the cloud server 840, a failure notification response message including information indicating that the new AP 1050 will be selected instead of the AP 830.

Upon receiving the failure notification response message from the fifth electronic device 820, the cloud server 840 may identify that the new AP 1050 will operate instead of the AP 830 because the information indicating that the new AP 1050 will be selected instead of the AP 830 is included in the failure notification response message. In operation 1028, the cloud server 840 may update an AP list by including the access information of the new AP 1050 into the AP list. In an embodiment, the AP list may include information, e.g., access information, about APs connected to the cloud server 840.

In operation 1029, the fifth electronic device 820 may output, for example, through the UI, a connection selection request message for requesting to select a direct-connected device which will be connected through the new AP 1050 among direct-connected devices, e.g., the electronic devices 811-812, whose connections have been recovered through the temporary AP among the direct-connected devices, e.g., the first electronic device 811, the second electronic device 812, and the third electronic devices 813, which have been connected to the AP 830.

In operation 1030, the fifth electronic device 820 may receive, for example, through the UI, information indicating that the first electronic device 811 is selected to be connected through the new AP 1050 among the direct-connected devices which have been connected to the AP 830.

In operation 1031, the fifth electronic device 820 may identify that the second electronic device 812 is not selected to be connected through the new AP 1050 in operation 1031. In operation 1032, the fifth electronic device 820 may output, for example, through the UI, a connection maintenance confirmation message for checking whether to maintain an AP connection of a unselected direct-connected device, e.g., the second electronic device 812, for example, whether to cause the second electronic device 812 to be connected through the AP 830.

In operation 1033, the fifth electronic device 820 may input, for example, through the UI, information indicating that the AP connection of the unselected direct-connected device, e.g., the second electronic device 812, will be maintained.

In operation 1034, the fifth electronic device 820 may transmit, to the cloud server 840, an AP connection notification message including information indicating whether to maintain an AP connection for each of the direct-connected devices, e.g., the electronic devices 811-812.

Upon receiving the AP connection notification message from the fifth electronic device 820, the cloud server 840 may update an AP-connected device list in operation 1035. In an embodiment, the cloud server 840 may update the AP-connected device list by changing access information of an AP accessed by the first electronic device 811 to the access information of the new AP 1050 in the AP-connected device list.

In operation 1036, the cloud server 840 may transmit an AP update message to the first electronic device 811 because the first electronic device 811 needs to access the new AP 1050. For example, the cloud server 840 may transmit the AP update message to the first electronic device 811 through the sixth electronic device 850 to which the first electronic device 811 is connected. In an embodiment, the AP update message may be a message commanding to update, for example, change, an accessed AP. The AP update message may include access information of an AP to be updated, e.g., an SSID and a password of the AP to be updated. The AP update message transmitted in operation 1036 may include the access information of the new AP 1050, e.g., an SSID and a password of the new AP 1050.

Upon receiving the AP update message from the cloud server 840, the first electronic device 811 may perform an access operation based on the access information of the AP to be updated, e.g., the access information of the new AP 1050 included in the AP update message in operation 1037. The first electronic device 811 performs the access operation based on the access information of the new AP 1050, thereby a connection between the sixth electronic device 850 and the first electronic device 811 may be released in operation 1038. In an embodiment, the first electronic device 811 performs the access operation based on the access information of the new AP 1050, thereby a connection between the first electronic device 811 and the new AP 1050 may be established in operation 1039.

In operation 1040, the cloud server 840 may detect that a direct-connected device connected to the sixth electronic device 850 does not exist, and transmit, to the sixth electronic device 850, an AP operation termination message for commanding to terminate the AP operation in operation 1040. Upon receiving the AP operation termination message from the cloud server 840, the sixth electronic device 850 may terminate the AP operation in operation 1041.

The cloud server 840 may request to move a location of the third electronic device 813 if it is identified that third electronic device 813 is not connected to the electronic devices 850 860, and 1060 which operate as the temporary APS, or to the new AP 1050. For example, the cloud server 840 may transmit, to the fifth electronic device 820, a message requesting a connection state and location movement of the third electronic device 813. Upon receiving, from the cloud server 840, the message requesting the connection state and the location movement of the third electronic device 813, the fifth electronic device 820 may output, for example, through the UI, the message requesting the connection state and the location movement. In an embodiment, a user of the fifth electronic device 820 moves the third electronic device 813 to another location (e.g., a location within a set distance from the seventh electronic device 860) based on the message requesting the connection state and the location movement outputted through the UI.

In operation 1042, the fifth electronic device 820 may detect that the third electronic device 813 is moved to the location within the set distance from the seventh electronic device 860. In an embodiment, the fifth electronic device 820 may detect that the user moves the third electronic device 813 to the vicinity of the seventh electronic device 860 based on a request of the location change for the third electronic device 813 provided to the user. In another embodiment, if the third electronic device 813 is an electronic device for which mobility is provided, the third electronic device 813 may move around the seventh electronic device 860, and the fifth electronic device 820 may detect that the third electronic device 813 is moved through a short-range communication scheme.

In operation 1043, the third electronic device 813 may access the seventh electronic device 860 operating based on the access information of the AP 830 to establish a connection with the seventh electronic device 860. Because the third electronic device 813 performs an access operation based on the access information of the AP 830, the third electronic device 813 may access the seventh electronic device 860 to establish a connection with the seventh electronic device 860 performing the AP operation based on the access information of the AP 830.

In operation 1044, the cloud server 840 may detect that the third electronic device 813 is connected to the cloud server 840 through the seventh electronic device 860 and update the AP-connected device list.

If the failure state of the AP 830 has occurred, the cloud server 840 may cause one of the direct-connected devices (e.g., the electronic device 811-813) connected to the AP 830 to operate as the temporary AP. For example, if it is possible for at least one of the direct-connected devices connected to the AP 830 to be connected to the cloud server 840 through a LAN scheme or a cellular communication scheme other than a Wi-Fi communication, the cloud server 840 may transmit a command to cause the least one direct-connected device to operate as the temporary AP.

Figure 11:
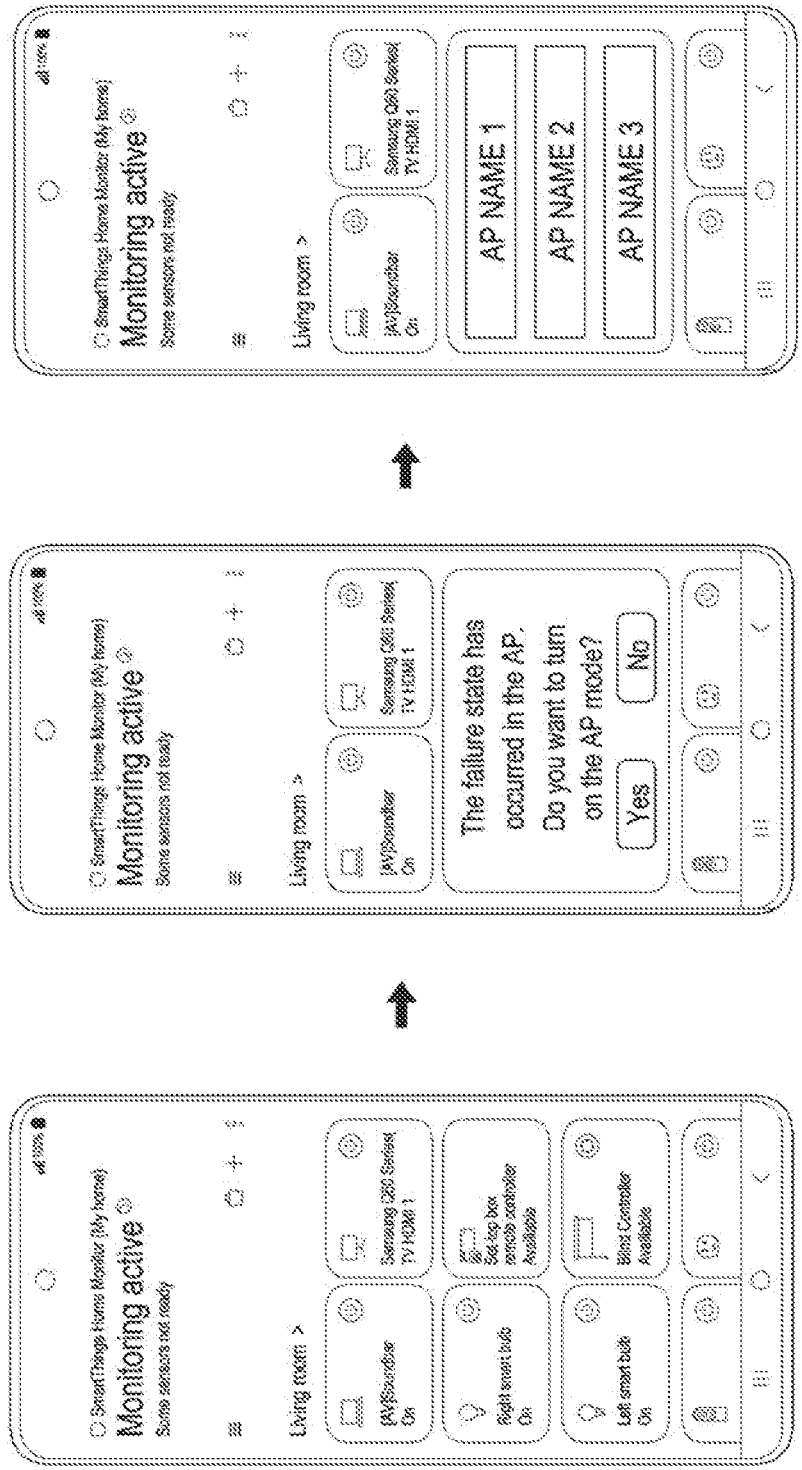
FIG. 11 is a diagram schematically illustrating an example of a UI of a user device in a wireless communication network according to certain embodiments.

FIG. 11 is a diagram schematically illustrating an example of a UI of a user device in a wireless communication network according to certain embodiments.

Referring to FIG. 11, an electronic device, e.g., a user device may output, through a UI, various messages upon performing a registration procedure of a direct-connected device in a wireless communication network as described in FIG. 4 or 5, a registration procedure of an AP-possible device in a wireless communication network as described in FIG. 6 or 7, and an AP recovery procedure in a wireless communication network as described in FIGS. 8, 9A and 9B, or 10A and 10B.

As shown in FIG. 11, the user device (e.g., a fifth electronic device 320 in FIG. 3 or a fifth electronic device 820 in FIGS. 10A and 10B) may receive, from a cloud server (e.g., a cloud server 340 in FIG. 3 or a cloud server 840 in FIGS. 10A and 10B), a failure notification message which notifies that a failure state has occurred in an AP (e.g., an AP 330 in FIG. 3 or an AP 830 in FIGS. 10A and 10B) which is connected to the user device and which checks whether the AP in which the failure state has occurred has been recovered or whether to select a new AP which will replace the AP in which the failure state has occurred while outputting various information through a display module (e.g., a display module 160 in FIG. 1).

Upon receiving the failure notification message from the cloud server, the user device may output, for example, through a UI, a failure notification message (e.g., "The failure state has occurred in the AP."). Upon detecting that the failure state has occurred in the AP, the user device may configure a new AP which will replace the AP. In an embodiment, if the user device implements an AP mode turn-on button for turning on an AP mode, the user device may detect that an AP mode turn-on button signal is inputted through the UI. Upon detecting that the AP mode turn button signal is inputted, the user device may output information about APs, e.g., access information of the APs, stored in the user device through the UI. As illustrated in FIG. 11, if information about a total of three APs is stored in the user device, the information about the three APs may be output. An example of an output screen of the UI in a case that names of the three APs are AP NAME 1, AP NAME 2, and AP NAME 3 is illustrated in FIG. 11.

Figure 12:
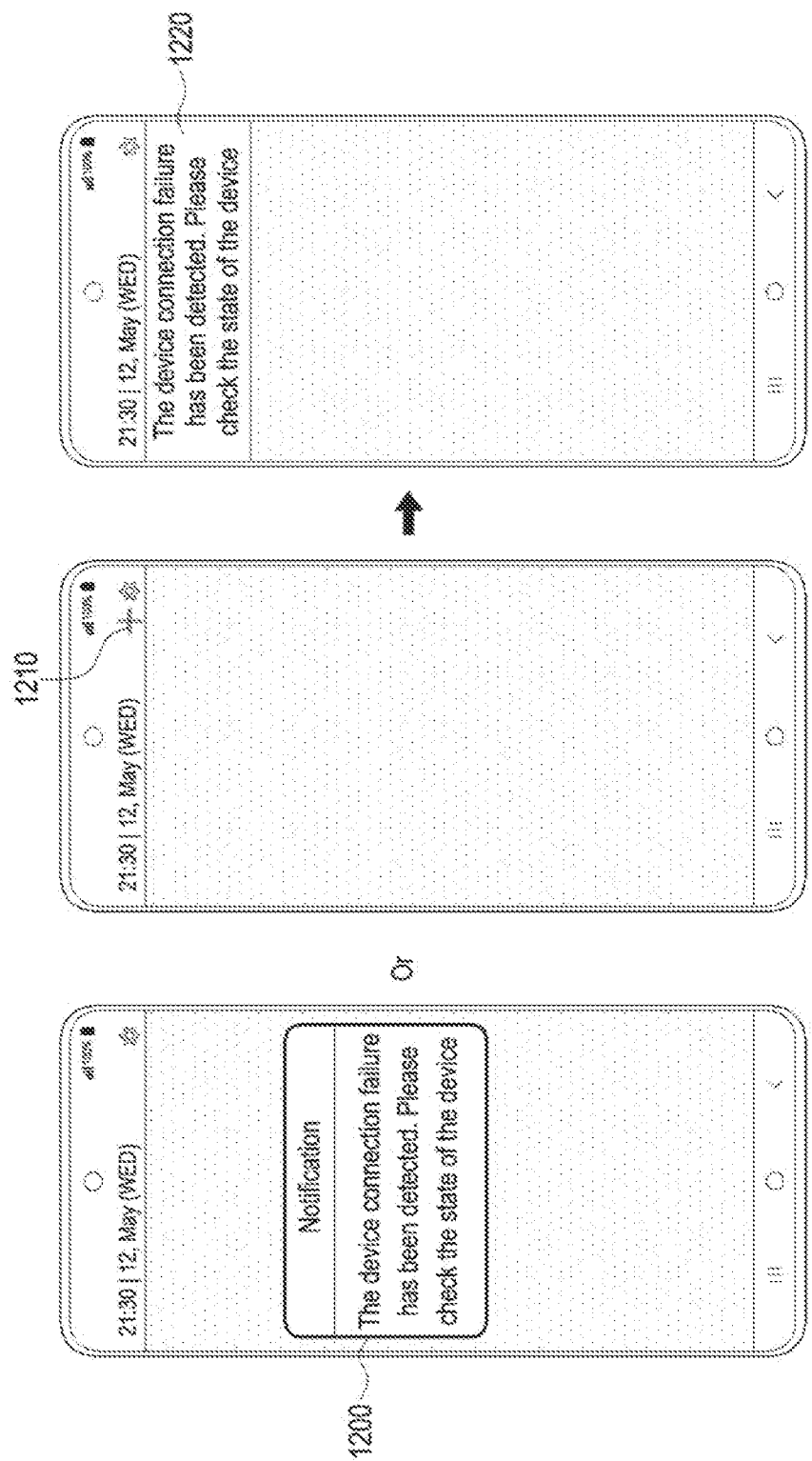
FIG. 12 is a diagram schematically illustrating another example of a UI of a user device in a wireless communication network according to certain embodiments.

FIG. 12 is a diagram schematically illustrating another example of a UI of a user device in a wireless communication network according to certain embodiments.

Referring to FIG. 12, an electronic device, e.g., a user device may output, through a UI, various messages upon performing a registration procedure of a direct-connected device in a wireless communication network as described in FIG. 4 or 5, a registration procedure of an AP-possible device in a wireless communication network as described in FIG. 6 or 7, and an AP recovery procedure in a wireless communication network as described in FIGS. 8, 9A and 9B, or 10A and 10B.

As shown in FIG. 12, the user device (e.g., a fifth electronic device 320 in FIG. 3 or a fifth electronic device 820 in FIGS. 10A and 10B) may receive, from a cloud server (e.g., a cloud server 340 in FIG. 3 or a cloud server 840 in FIGS. 10A and 10B), a failure notification message which notifies that a failure state has occurred in an AP (e.g., an AP 330 in FIG. 3 or an AP 830 in FIGS. 10A and 10B) which is connected to the user device and which checks whether the AP in which the failure state has occurred has been recovered or whether to select a new AP which will replace the AP in which the failure state has occurred while outputting various information through a display module (e.g., a display module 160 in FIG. 1).

Upon receiving the failure notification message from the cloud server, the user device may output, through the UI, a failure notification message 1200. For example, the user device may output the failure notification message 1200 such as "The device connection failure has been detected. Please check the state of the device" through the UI.

Upon receiving the failure notification message from the cloud server, the user device may output, through the UI, an icon 1210 indicating a failure state. Upon detecting that the icon 1210 indicating the failure state is selected through the UI, the user device may output a failure notification message 1220 such as "The device connection failure has been detected. Please check the state of the device" through the UI.

An example of an output screen in a case that a failure notification message is outputted or an icon indicating a failure state is outputted is illustrated in FIG. 12.

Figure 13:
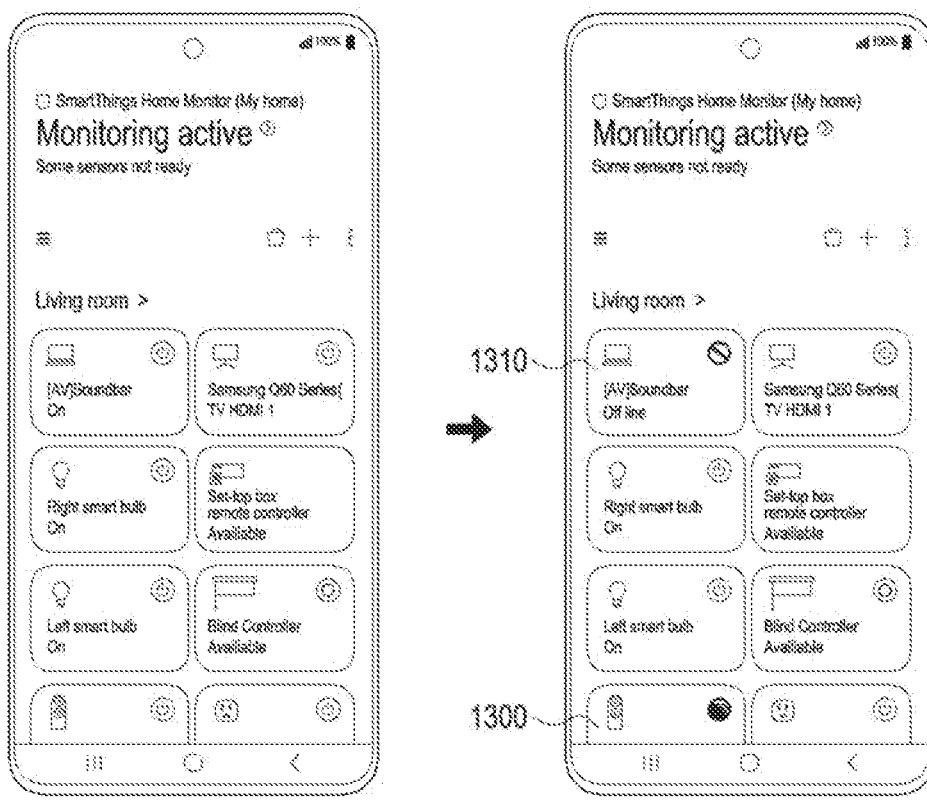
FIG. 13 is a diagram schematically illustrating still another example of a UI of a user device in a wireless communication network according to certain embodiments.

FIG. 13 is a diagram schematically illustrating still another example of a UI of a user device in a wireless communication network according to certain embodiments.

Referring to FIG. 13, an electronic device, e.g., a user device may output, through a UI, various messages upon performing a registration procedure of a direct-connected device in a wireless communication network as described in FIG. 4 or 5, a registration procedure of an AP-possible device in a wireless communication network as described in FIG. 6 or 7, and an AP recovery procedure in a wireless communication network as described in FIGS. 8, 9A and 9B, or 10A and 10B.

As shown in FIG. 13, the user device (e.g., a fifth electronic device 320 in FIG. 3 or a fifth electronic device 820 in FIGS. 10A and 10B) may receive, from a cloud server (e.g., a cloud server 340 in FIG. 3 or a cloud server 840 in FIGS. 10A and 10B), a failure notification message which notifies that a failure state has occurred in an AP (e.g., an AP 330 in FIG. 3 or an AP 830 in FIGS. 10A and 10B) which is connected to the user device and which checks whether the AP in which the failure state has occurred has been recovered or whether to select a new AP which will replace the AP in which the failure state has occurred while outputting various information through a display module (e.g., a display module 160 in FIG. 1).

Upon receiving the failure notification message from the cloud server, the user device may indicate a failure state of a corresponding AP, for example, through the UI. In an embodiment, if a failure state occurs in an AP connected to a specific device, e.g., an air conditioner, a screen 1300 indicating the failure state of the AP may be outputted through the UI of the user device. The screen 1300 indicating the failure state of the AP connected to the specific device may be different from a screen 1310 indicating an offline state in which the specific device is not connected to the AP.

Figure 14:
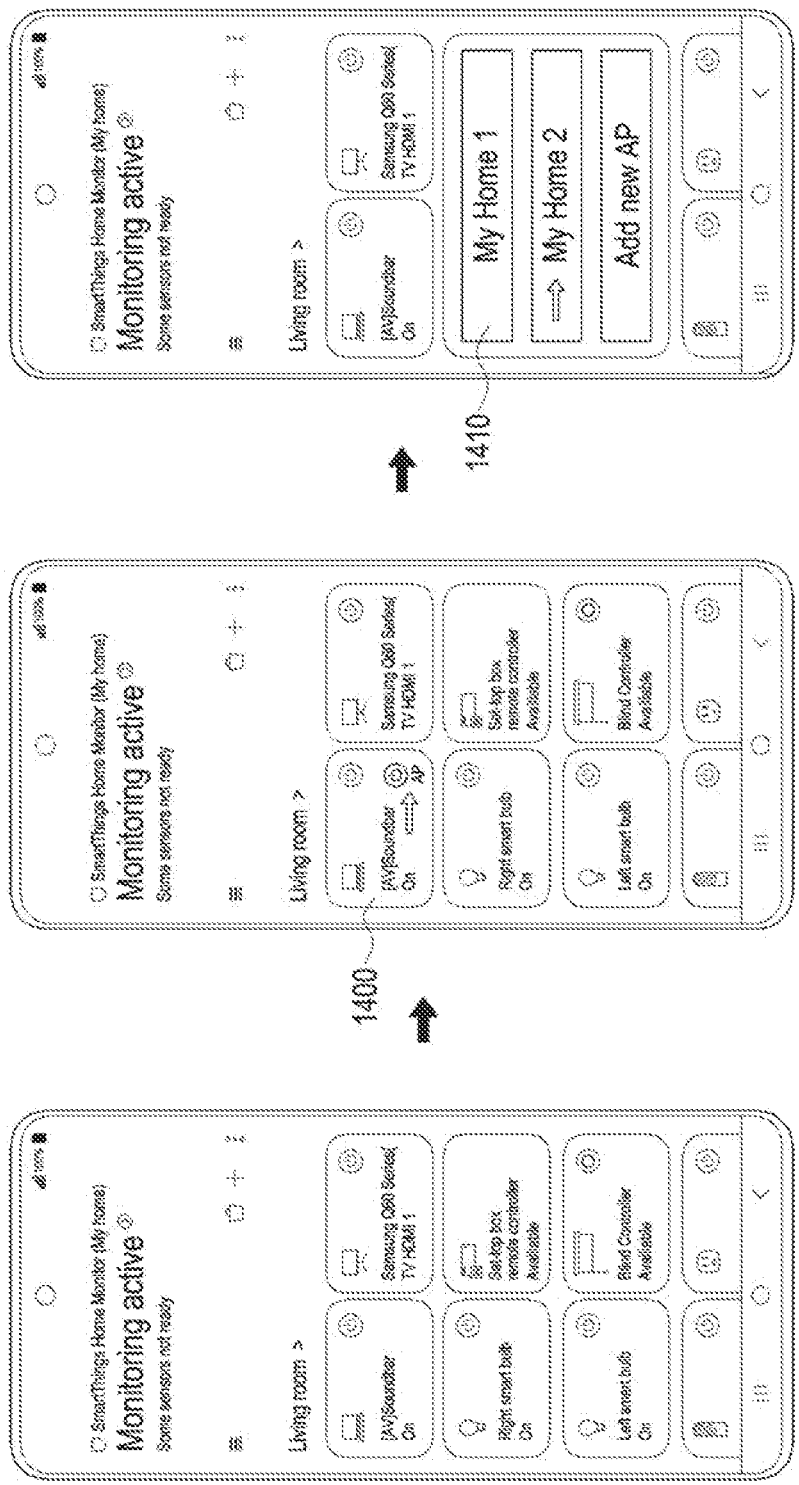
FIG. 14 is a diagram schematically illustrating still another example of a UI of a user device in a wireless communication network according to certain embodiments.

FIG. 14 is a diagram schematically illustrating still another example of a UI of a user device in a wireless communication network according to certain embodiments.

Referring to FIG. 14, an electronic device, e.g., a user device may output, through a UI, various messages upon performing a registration procedure of a direct-connected device in a wireless communication network as described in FIG. 4 or 5, a registration procedure of an AP-possible device in a wireless communication network as described in FIG. 6 or 7, and an AP recovery procedure in a wireless communication network as described in FIGS. 8, 9A and 9B, or 10A and 10B. As shown in FIG. 14, the user device (e.g., a fifth electronic device 320 in FIG. 3 or a fifth electronic device 820 in FIGS. 10A and 10B) may receive, from a cloud server (e.g., a cloud server 340 in FIG. 3 or a cloud server 840 in FIGS. 10A and 10B), a AP mode-possible device list while outputting various information through a display module (e.g., a display module 160 in FIG. 1). Upon receiving the AP mode-possible device list from the cloud server, the user device may detect information about AP mode-possible devices. The user device may indicate that a specific device is an AP mode-possible device through the UI based on the detected information about the AP mode-possible devices. In an embodiment, if the specific device (e.g., a soundbar) is the AP mode-possible device, the user device may display a screen 1400 indicating that the sound bar is the AP mode-possible device through the UI. If the user device implements an AP mode turn-on button for turning on an AP mode, the user device may detect that an AP mode turn-on button signal is inputted through the UI. Upon detecting that the AP mode turn button signal is inputted, the user device may display a screen indicating information about APs, e.g., access information of the APs, stored in the user device. As illustrated in FIG. 14, if information about a total of two APs is stored in the user device, a UI for indicating the information about the two APs and configuring a new AP may be output. An example of an output screen 1410 of a UI including buttons (e.g., MY Home 1 and MY Home 2) indicating the information about the two APs, and a button (e.g., Add new AP) for configuring a new AP is illustrated in FIG. 14.

According to certain embodiments of the disclosure, a method performed by an electronic device (an AP-possible device 620 in FIG. 6 or FIG. 7, a sixth electronic device 850 or a seventh electronic device 860 in FIG. 8 or FIGS. 9A and 9B, or the sixth electronic device 850, the seventh electronic device 860, or an eighth electronic device 1060 in FIGS. 10A and 10B) may comprise transmitting, to a server (a cloud server 630 in FIG. 6 or FIG. 7, or a cloud server 840 in FIG. 8, FIGS. 9A and 9B, or FIGS. 10A and 10B), a registration request message including information indicating whether it is possible for the electronic device (the AP-possible device 620 in FIG. 6 or FIG. 7, the sixth electronic device 850 or the seventh electronic device 860 in FIG. 8 or FIGS. 9A and 9B, or the sixth electronic device 850, the seventh electronic device 860, or the eighth electronic device 1060 in FIGS. 10A and 10B) to perform an access point (AP) operation, receiving, from the server (the cloud server 630 in FIG. 6 or FIG. 7, or the cloud server 840 in FIG. 8, FIGS. 9A and 9B, or FIGS. 10A and 10B), an AP operation command message commanding to perform an AP operation and including access information of an AP (an AP 830 in FIG. 8, FIGS. 9A and 9B, or FIGS. 10A and 10B) in which a failure state has occurred, and performing the AP operation which is based on the access information of the AP (the AP 830 in FIG. 8, FIGS. 9A and 9B, or FIGS. 10A and 10B).

According to certain embodiments of the disclosure, the method may further comprise receiving, from the server (the cloud server 630 in FIG. 6 or FIG. 7, or the cloud server 840 in FIG. 8, FIGS. 9A and 9B, or FIGS. 10A and 10B), an AP operation termination message commanding to terminate the AP operation while performing the AP operation, and based on the AP operation termination message, terminating the AP operation which is based on the access information of the AP (the AP 830 in FIG. 8, FIGS. 9A and 9B, or FIGS. 10A and 10B).

According to certain embodiments of the disclosure, the method may further comprise receiving, from the server (the cloud server 630 in FIG. 6 or FIG. 7, or the cloud server 840 in FIG. 8, FIGS. 9A and 9B, or FIGS. 10A and 10B), a message including access information of another AP (a new AP 1050 in FIGS. 10A and 10B), and transmitting a message including the access information of the other AP (the new AP 1050 in FIGS. 10A and 10B) to at least one external electronic device (a first electronic device 811, a second electronic device 812, a third electronic device 813, or a fourth electronic device 814 in FIG. 8, the first electronic device 811, the second electronic device 812, or the third electronic device 813 in FIGS. 9A and 9B, or the first electronic device 811, the second electronic device 812, or the third electronic device 813 in FIGS. 10A and 10B) which is connected to the server (the cloud server 630 in FIG. 6 or FIG. 7, or the cloud server 840 in FIG. 8, FIGS. 9A and 9B, or FIGS. 10A and 10B) through the electronic device (the AP-possible device 620 in FIG. 6 or FIG. 7, the sixth electronic device 850 or the seventh electronic device 860 in FIG. 8 or FIGS. 9A and 9B, or the sixth electronic device 850, the seventh electronic device 860, or the eighth electronic device 1060 in FIGS. 10A and 10B).

According to certain embodiments of the disclosure, the method may further comprise, after transmitting the message including the access information of the other AP (the new AP 1050 in FIGS. 10A and 10B), terminating the AP operation which is based on the access information of the AP (the AP 830 in FIG. 8, FIGS. 9A and 9B, or FIGS. 10A and 10B).

According to certain embodiments of the disclosure, the method may further comprise receiving, from the server (the cloud server 630 in FIG. 6 or FIG. 7, or the cloud server 840 in FIG. 8, FIGS. 9A and 9B, or FIGS. 10A and 10B), an AP operation termination message commanding to terminate an AP operation, and terminating the AP operation which is based on the access information of the AP (the AP 830 in FIG. 8, FIGS. 9A and 9B, or FIGS. 10A and 10B).

According to certain embodiments of the disclosure, transmitting the registration request message to the server (the cloud server 630 in FIG. 6 or FIG. 7, or the cloud server 840 in FIG. 8, FIGS. 9A and 9B, or FIGS. 10A and 10B) may comprise receiving, from another external electronic device (a user device 610 in FIG. 6 or 7, or a fifth electronic device 820 in FIG. 8, FIGS. 9A and 9B, or FIGS. 10A and 10B), a registration mode switch request message requesting to switch an operation mode of the electronic device (the AP-possible device 620 in FIG. 6 or FIG. 7, the sixth electronic device 850 or the seventh electronic device 860 in FIG. 8 or FIGS. 9A and 9B, or the sixth electronic device 850, the seventh electronic device 860, or the eighth electronic device 1060 in FIGS. 10A and 10B) to a registration mode to register the electronic device (the AP-possible device 620 in FIG. 6 or FIG. 7, the sixth electronic device 850 or the seventh electronic device 860 in FIG. 8 or FIGS. 9A and 9B, or the sixth electronic device 850, the seventh electronic device 860, or the eighth electronic device 1060 in FIGS. 10A and 10B) at the server (the cloud server 630 in FIG. 6 or FIG. 7, or the cloud server 840 in FIG. 8, FIGS. 9A and 9B, or FIGS. 10A and 10B), switching the operation mode to the registration mode based on the received registration mode switch request message, and transmitting, to the server (the cloud server 630 in FIG. 6 or FIG. 7, or the cloud server 840 in FIG. 8, FIGS. 9A and 9B, or FIGS. 10A and 10B), the registration request message in the registration mode.

According to certain embodiments of the disclosure, a method performed by an electronic device (a electronic device 320 in FIG. 3, a fifth electronic device 420 in FIG. 4 or FIG. 5, a user device 610 in FIG. 6 or FIG. 7, or a fifth electronic device 820 in FIG. 8, FIGS. 9A and 9B, or FIGS. 10A and 10B) may comprise transmitting, to an external electronic device (an AP-possible device 620 in FIG. 6 or FIG. 7, a sixth electronic device 850 or a seventh electronic device 860 in FIG. 8 or FIGS. 9A and 9B, or the sixth electronic device 850, the seventh electronic device 860, or an eighth electronic device 1060 in FIGS. 10A and 10B), a registration mode switch request message requesting to switch an operation mode of the external electronic device (the AP-possible device 620 in FIG. 6 or FIG. 7, the sixth electronic device 850 or the seventh electronic device 860 in FIG. 8 or FIGS. 9A and 9B, or the sixth electronic device 850, the seventh electronic device 860, or the eighth electronic device 1060 in FIGS. 10A and 10B) to a registration mode to register the external electronic device (the AP-possible device 620 in FIG. 6 or FIG. 7, the sixth electronic device 850 or the seventh electronic device 860 in FIG. 8 or FIGS. 9A and 9B, or the sixth electronic device 850, the seventh electronic device 860, or the eighth electronic device 1060 in FIGS. 10A and 10B) capable of performing an access point (AP) operation at a server (a cloud server 340 in FIG. 3, a cloud server 440 in FIG. 4, a cloud server 630 in FIG. 6 or FIG. 7, or a cloud server 840 in FIG. 8, FIGS. 9A and 9B, or FIGS. 10A and 10B), receiving, from the server (the cloud server 340 in FIG. 3, the cloud server 440 in FIG. 4, the cloud server 630 in FIG. 6 or FIG. 7, or the cloud server 840 in FIG. 8, FIGS. 9A and 9B, or FIGS. 10A and 10B), an AP mode authority request message requesting authority for switching to an AP mode in which the external electronic device (the AP-possible device 620 in FIG. 6 or FIG. 7, the sixth electronic device 850 or the seventh electronic device 860 in FIG. 8 or FIGS. 9A and 9B, or the electronic device 850, the seventh electronic device 860, or the eighth electronic device 1060 in FIGS. 10A and 10B) performs the AP operation, and transmitting, to the server (the cloud server 340 in FIG. 3, the cloud server 440 in FIG. 4, the cloud server 630 in FIG. 6 or FIG. 7, or the cloud server 840 in FIG. 8, FIGS. 9A and 9B, or FIGS. 10A and 10B), an AP mode authority response message including information indicating whether the authority request is accepted.

According to certain embodiments of the disclosure, if the information indicates that the authority request is accepted, the AP mode authority response message may further include information indicating whether it is possible for the external electronic device (the AP-possible device 620 in FIG. 6 or FIG. 7, the sixth electronic device 850 or the seventh electronic device 860 in FIG. 8 or FIGS. 9A and 9B, or the sixth electronic device 850, the seventh electronic device 860, or the eighth electronic device 1060 in FIGS. 10A and 10B) to perform the AP operation.

According to certain embodiments of the disclosure, the method may further comprise receiving, from the server (the cloud server 340 in FIG. 3, the cloud server 440 in FIG. 4, the cloud server 630 in FIG. 6 or FIG. 7, or the cloud server 840 in FIG. 8, FIGS. 9A and 9B, or FIGS. 10A and 10B), a failure notification message indicating that a failure state has occurred in an AP (an AP 830 in FIG. 8, FIGS. 9A and 9B, or FIGS. 10A and 10B) connected to the electronic device (the fifth electronic device 320 in FIG. 3, the fifth electronic device 420 in FIG. 4 or FIG. 5, the user device 610 in FIG. 6 or FIG. 7, or the fifth electronic device 820 in FIG. 8, FIGS. 9A and 9B, or FIGS. 10A and 10B) and checking whether the AP (the AP 830 in FIG. 8, FIGS. 9A and 9B, or FIGS. 10A and 10B) has been recovered or whether to select a new AP (a new AP 1050 in FIGS. 10A and 10B) which will replace the AP (the AP 830 in FIG. 8, FIGS. 9A and 9B, or FIGS. 10A and 10B), and transmitting, to the server (the cloud server 340 in FIG. 3, the cloud server 440 in FIG. 4, the cloud server 630 in FIG. 6 or FIG. 7, or the cloud server 840 in FIG. 8, FIGS. 9A and 9B, or FIGS. 10A and 10B), a failure notification response message which includes information indicating that the AP (the AP 830 in FIG. 8, FIGS. 9A and 9B, or FIGS. 10A and 10B) has been recovered, or information indicating that the new AP (the new AP 1050 in FIGS. 10A and 10B) will be selected and access information of the new AP (the new AP 1050 in FIGS. 10A and 10B).

According to certain embodiments of the disclosure, the method further comprise transmitting, to another external electronic device (a first electronic device 311, a second electronic device 312, a third electronic device 313, or a fourth electronic device 314 in FIG. 3, a first electronic device 411, a second electronic device 412, a third electronic device 413, or a fourth electronic device 414 in FIG. 4, the fourth electronic device 414 in FIG. 5, a first electronic device 811, a second electronic device 812, a third electronic device 813, or a fourth electronic device 814 in FIG. 8, or the first electronic device 811, the second electronic device 812, or the third electronic device 813 in FIGS. 9A and 9B, or FIGS. 10A and 10B), a registration mode switch request message requesting to switch an operation mode of the other external electronic device (the first electronic device 311, the second electronic device 312, the third electronic device 313, or the fourth electronic device 314 in FIG. 3, the first electronic device 411, the second electronic device 412, the third electronic device 413, or the fourth electronic device 414 in FIG. 4, the fourth electronic device 414 in FIG. 5, the first electronic device 811, the second electronic device 812, the third electronic device 813, or the fourth electronic device 814 in FIG. 8, or the first electronic device 811, the second electronic device 812, or the third electronic device 813 in FIGS. 9A and 9B, or FIGS. 10A and 10B) to a registration mode to register the other external electronic device (the first electronic device 311, the second electronic device 312, the third electronic device 313, or the fourth electronic device 314 in FIG. 3, the first electronic device 411, the second electronic device 412, the third electronic device 413, or the fourth electronic device 414 in FIG. 4, the fourth electronic device 414 in FIG. 5, the first electronic device 811, the second electronic device 812, the third electronic device 813, or the fourth electronic device 814 in FIG. 8, or the first electronic device 811, the second electronic device 812, or the third electronic device 813 in FIGS. 9A and 9B, or FIGS. 10A and 10B) at the server (the cloud server 340 in FIG. 3, the cloud server 440 in FIG. 4, the cloud server 630 in FIG. 6 or FIG. 7, or the cloud server 840 in FIG. 8, FIGS. 9A and 9B, or FIGS. 10A and 10B).

According to certain embodiments of the disclosure, a method performed by an electronic device (a first electronic device 311, a second electronic device 312, a third electronic device 313, or a fourth electronic device 314 in FIG. 3, a first electronic device 411, a second electronic device 412, a third electronic device 413, or a fourth electronic device 414 in FIG. 4, the fourth electronic device 414 in FIG. 5, a first electronic device 811, a second electronic device 812, a third electronic device 813, or a fourth electronic device 814 in FIG. 8, or the first electronic device 811, the second electronic device 812, or the third electronic device 813 in FIGS. 9A and 9B, or FIGS. 10A and 10B) may comprise transmitting, to an access point (AP) (an AP 330 in FIG. 3, an AP 430 in FIG. 4 or FIG. 5, or an AP 830 in FIG. 8, FIGS. 9A and 9B, or FIGS. 10A and 10B), an access request message including access information of the AP (the AP 330 in FIG. 3, the AP 430 in FIG. 4 or FIG. 5, or the AP 830 in FIG. 8, FIGS. 9A and 9B, or FIGS. 10A and 10B), receiving, from the AP (the AP 330 in FIG. 3, the AP 430 in FIG. 4 or FIG. 5, or the AP 830 in FIG. 8, FIGS. 9A and 9B, or FIGS. 10A and 10B), an access response message which is a response message to the access request message, and transmitting, to the AP (the AP 330 in FIG. 3, the AP 430 in FIG. 4 or FIG. 5, or the AP 830 in FIG. 8, FIGS. 9A and 9B, or FIGS. 10A and 10B), a registration request message for registering the electronic device (the first electronic device 311, the second electronic device 312, the third electronic device 313, or the fourth electronic device 314 in FIG. 3, the first electronic device 411, the second electronic device 412, the third electronic device 413, or the fourth electronic device 414 in FIG. 4, the fourth electronic device 414 in FIG. 5, the first electronic device 811, the second electronic device 812, the third electronic device 813, or the fourth electronic device 814 in FIG. 8, or the first electronic device 811, the second electronic device 812, or the third electronic device 813 in FIGS. 9A and 9B, or FIGS. 10A and 10B) at a server (a cloud server 340 in FIG. 3, a cloud server 440 in FIG. 4 or FIG. 5, a cloud server 630 in FIG. 6 or FIG. 7, or a cloud server 840 in FIG. 8, FIGS. 9A and 9B, or FIGS. 10A and 10B) which includes device information for identifying the electronic device (the first electronic device 311, the second electronic device 312, the third electronic device 313, or the fourth electronic device 314 in FIG. 3, the first electronic device 411, the second electronic device 412, the third electronic device 413, or the fourth electronic device 414 in FIG. 4, the fourth electronic device 414 in FIG. 5, the first electronic device 811, the second electronic device 812, the third electronic device 813, or the fourth electronic device 814 in FIG. 8, or the first electronic device 811, the second electronic device 812, or the third electronic device 813 in FIGS. 9A and 9B, or FIGS. 10A and 10B) and accessed AP information indicating an AP (the AP 330 in FIG. 3, the AP 430 in FIG. 4 or FIG. 5, or the AP 830 in FIG. 8, FIGS. 9A and 9B, or FIGS. 10A and 10B) which the electronic device (the first electronic device 311, the second electronic device 312, the third electronic device 313, or the fourth electronic device 314 in FIG. 3, the first electronic device 411, the second electronic device 412, the third electronic device 413, or the fourth electronic device 414 in FIG. 4, the fourth electronic device 414 in FIG. 5, the first electronic device 811, the second electronic device 812, the third electronic device 813, or the fourth electronic device 814 in FIG. 8, or the first electronic device 811, the second electronic device 812, or the third electronic device 813 in FIGS. 9A and 9B, or FIGS. 10A and 10B) accesses.

According to certain embodiments of the disclosure, transmitting the registration request message may comprise receiving, from an external electronic device (a fifth electronic device 320 in FIG. 3, a fifth electronic device 420 in FIG. 4 or FIG. 5, a user device 610 in FIG. 6 or FIG. 7, or a electronic device 820 in FIG. 8, FIGS. 9A and 9B, or FIGS. 10A and 10B), a registration mode switch request message requesting to switch an operation mode of the electronic device (the first electronic device 311, the second electronic device 312, the third electronic device 313, or the fourth electronic device 314 in FIG. 3, the first electronic device 411, the second electronic device 412, the third electronic device 413, or the fourth electronic device 414 in FIG. 4, the fourth electronic device 414 in FIG. 5, the first electronic device 811, the second electronic device 812, the third electronic device 813, or the fourth electronic device 814 in FIG. 8, or the first electronic device 811, the second electronic device 812, or the third electronic device 813 in FIGS. 9A and 9B, or FIGS. 10A and 10B) to a registration mode to register the electronic device (the first electronic device 311, the second electronic device 312, the third electronic device 313, or the fourth electronic device 314 in FIG. 3, the first electronic device 411, the second electronic device 412, the third electronic device 413, or the fourth electronic device 414 in FIG. 4, the fourth electronic device 414 in FIG. 5, the first electronic device 811, the second electronic device 812, the third electronic device 813, or the fourth electronic device 814 in FIG. 8, or the first electronic device 811, the second electronic device 812, or the third electronic device 813 in FIGS. 9A and 9B, or FIGS. 10A and 10B) at the server (the cloud server 340 in FIG. 3, the cloud server 440 in FIG. 4 or FIG. 5, the cloud server 630 in FIG. 6 or FIG. 7, or the cloud server 840 in FIG. 8, FIGS. 9A and 9B, or FIGS. 10A and 10B), switching the operation mode to the registration mode, and transmitting, to the AP (the AP 330 in FIG. 3, the AP 430 in FIG. 4 or FIG. 5, or the AP 830 in FIG. 8, FIGS. 9A and 9B, or FIGS. 10A and 10B), the registration request message in the registration mode.

According to certain embodiments of the disclosure, a method performed by a server (a cloud server 340 in FIG. 3, a cloud server 440 in FIG. 4 or FIG. 5, a cloud server 630 in FIG. 6 or FIG. 7, or a cloud server 840 in FIG. 8, FIGS. 9A and 9B, or FIGS. 10A and 10B) may comprise detecting that a failure state has occurred in an access point (AP) (an AP 830 in FIG. 8, FIGS. 9A and 9B, or FIGS. 10A and 10B), select at least one electronic device (an AP-possible device 620 in FIG. 6 or FIG. 7, a sixth electronic device 850 or a seventh electronic device 860 in FIG. 8 or FIGS. 9A and 9B, or the sixth electronic device 850, the seventh electronic device 860, or an eighth electronic device 1060 in FIGS. 10A and 10B) among electronic devices (the AP-possible device 620 in FIG. 6 or FIG. 7, the sixth electronic device 850 or the seventh electronic device 860 in FIG. 8 or FIGS. 9A and 9B, or the sixth electronic device 850, the seventh electronic device 860, or the eighth electronic device 1060 in FIGS. 10A and 10B) capable of performing an AP operation as a temporary AP which will perform an AP operation instead of the AP (the AP 830 in FIG. 8, FIGS. 9A and 9B, or FIGS. 10A and 10B), and transmitting an AP operation command message commanding to perform an AP operation and including access information of the AP (the AP 830 in FIG. 8, FIGS. 9A and 9B, or FIGS. 10A and 10B) to the at least one electronic device (the AP-possible device 620 in FIG. 6 or FIG. 7, the sixth electronic device 850 or the seventh electronic device 860 in FIG. 8 or FIGS. 9A and 9B, or the sixth electronic device 850, the seventh electronic device 860, or the eighth electronic device 1060 in FIGS. 10A and 10B) which is selected as the temporary AP.

According to certain embodiments of the disclosure, the method may further comprise receiving, from an external electronic device (a user device 610 in FIG. 6 or 7, or a fifth electronic device 820 in FIG. 8, FIGS. 9A and 9B, or FIGS. 10A and 10B), a message including access information of a new AP (a new AP 1050 in FIGS. 10A and 10B) which will replace the AP (the AP 830 in FIG. 8, FIGS. 9A and 9B, or FIGS. 10A and 10B) and commanding to switch the AP (the AP 830 in FIG. 8, FIGS. 9A and 9B, or FIGS. 10A and 10B) to the new AP (the new AP 1050 FIGS. 10A and 10B), and transmitting, to the at least one electronic device (the AP-possible device 620 in FIG. 6 or FIG. 7, the sixth electronic device 850 or the seventh electronic device 860 in FIG. 8 or FIGS. 9A and 9B, or the sixth electronic device 850, the seventh electronic device 860, or the eighth electronic device 1060 in FIGS. 10A and 10B), a message including the access information of the new AP (the new AP 1050 FIGS. 10A and 10B).

According to certain embodiments of the disclosure, the method may further comprise transmitting, to the at least one electronic device (the AP-possible device 620 in FIG. 6 or FIG. 7, the sixth electronic device 850 or the seventh electronic device 860 in FIG. 8 or FIGS. 9A and 9B, or the electronic device 850, the seventh electronic device 860, or the eighth electronic device 1060 in FIGS. 10A and 10B), an AP operation termination message commanding to terminate the AP operation.

According to certain embodiments of the disclosure, the method may further comprise transmitting, to an external electronic device (the user device 610 in FIG. 6 or 7, or the fifth electronic device 820 in FIG. 8, FIGS. 9A and 9B, or FIGS. 10A and 10B), a failure notification message indicating that a failure state has occurred in the AP (the AP 830 in FIG. 8, FIGS. 9A and 9B, or FIGS. 10A and 10B) which has been connected to the external electronic device (the user device 610 in FIG. 6 or 7, or the fifth electronic device 820 in FIG. 8, FIGS. 9A and 9B, or FIGS. 10A and 10B) and checking whether the AP (the AP 830 in FIG. 8, FIGS. 9A and 9B, or FIGS. 10A and 10B) has been recovered or whether to select a new AP (the new AP 1050 FIGS. 10A and 10B) which will replace the AP (the AP 830 in FIG. 8, FIGS. 9A and 9B, or FIGS. 10A and 10B), and receiving, from the external electronic device (the user device 610 in FIG. 6 or 7, or the fifth electronic device 820 in FIG. 8, FIGS. 9A and 9B, or FIGS. 10A and 10B), a failure notification response message including information indicating that the AP (the AP 830 in FIG. 8, FIGS. 9A and 9B, or FIGS. 10A and 10B) has been recovered, or information indicating that the new AP (the new AP 1050 FIGS. 10A and 10B) will be selected and access information of the new AP (the new AP 1050 FIGS. 10A and 10B).

According to certain embodiments of the disclosure, detecting that the failure state has occurred in the AP (the AP 830 in FIG. 8, FIGS. 9A and 9B, or FIGS. 10A and 10B) may comprise detecting that the failure state has occurred in the AP (the AP 830 in FIG. 8, FIGS. 9A and 9B, or FIGS. 10A and 10B) upon detecting that all connections of other external electronic devices (a first electronic device 311, a second electronic device 312, a third electronic device 313, or a fourth electronic device 314 in FIG. 3, a first electronic device 411, a second electronic device 412, a third electronic device 413, or a fourth electronic device 414 in FIG. 4, the fourth electronic device 414 in FIG. 5, a first electronic device 811, a second electronic device 812, a third electronic device 813, or a fourth electronic device 814 in FIG. 8, or the first electronic device 811, the second electronic device 812, or the third electronic device 813 in FIGS. 9A and 9B, or FIGS. 10A and 10B) which have been connected to the AP (the AP 830 in FIG. 8, FIGS. 9A and 9B, or FIGS. 10A and 10B) are released.

According to certain embodiments of the disclosure, the at least one of the electronic devices (the AP-possible device 620 in FIG. 6 or FIG. 7, the sixth electronic device 850 or the seventh electronic device 860 in FIG. 8 or FIGS. 9A and 9B, or the sixth electronic device 850, the seventh electronic device 860, or the eighth electronic device 1060 in FIGS. 10A and 10B) capable of performing the AP operation may be selected as the temporary AP based on location information of the other external electronic devices (the first electronic device 311, the second electronic device 312, the third electronic device 313, or the fourth electronic device 314 in FIG. 3, the first electronic device 411, the second electronic device 412, the third electronic device 413, or the fourth electronic device 414 in FIG. 4, the fourth electronic device 414 in FIG. 5, the first electronic device 811, the second electronic device 812, the third electronic device 813, or the fourth electronic device 814 in FIG. 8, or the first electronic device 811, the second electronic device 812, or the third electronic device 813 in FIGS. 9A and 9B, or FIGS. 10A and 10B) which have been connected to the AP (the AP 830 in FIG. 8, FIGS. 9A and 9B, or FIGS. 10A and 10B).

According to certain embodiments of the disclosure, the at least one of the electronic devices (the AP-possible device 620 in FIG. 6 or FIG. 7, the sixth electronic device 850 or the seventh electronic device 860 in FIG. 8 or FIGS. 9A and 9B, or the electronic device 850, the seventh electronic device 860, or the eighth electronic device 1060 in FIGS. 10A and 10B) capable of performing the AP operation may be selected as the temporary AP based on a set order.

According to certain embodiments of the disclosure, the set order may be received from the external electronic device (the user device 610 in FIG. 6 or 7, or the fifth electronic device 820 in FIG. 8, FIGS. 9A and 9B, or FIGS. 10A and 10B).

Certain embodiments have been described with a degree of particularity and specificity. It shall be understood that the embodiments are only described by way of example, and this disclosure shall not be considered limited to the embodiments described herein. Moreover, various modification, revisions, adaptations, omission of parts, and addition of parts can be made to the embodiments without departing from the spirit and scope of this disclosure. Accordingly, this disclosure shall only be considered limited by the following claims and equivalents thereof

What is claimed is:

1. An electronic device, comprising:
    memory storing instructions:
    a communication circuit; and
    at least one processor operatively connected with the communication circuit and the memory, wherein the instructions, when executed by the at least one processor, cause electronic device to:
        transmit, to a server through the communication circuit, a registration request message including information indicating that it is possible for the electronic device to perform an access point (AP) operation,
        receive, from the server through the communication circuit, a message with a command to perform the AP operation, including access information of an external AP device in which a failure state has occurred, and
        perform the AP operation using the access information of the external AP device in which the failure state has occurred.

2. The electronic device of claim 1, wherein the instructions, when executed by the at least one processor, cause the electronic device further to:
    receive, from the server through the communication circuit, an AP operation termination message commanding to terminate the AP operation while performing the AP operation, and
    terminate the AP operation in response to receiving the AP operation termination message.

3. The electronic device of claim 1, wherein the instructions, when executed by the at least one processor, cause the electronic device further to:
    receive, from the server through the communication circuit, a message including access information of another AP device, and
    transmit, through the communication circuit, a message including the access information of the other AP device to at least one external electronic device which is connected to the server through the electronic device.

4. The electronic device of claim 3, wherein the instructions, when executed by the at least one processor, cause the electronic device further to:
    after transmitting the message including the access information of the other AP device, terminate the AP operation.

5. The electronic device of claim 3, wherein the instructions, when executed by the at least one processor, cause the electronic device further to:
    receive, from the server through the communication circuit, an AP operation termination message commanding to terminate the AP operation, and
    terminate the AP operation in response to receiving the AP operation termination message.

6. The electronic device of claim 1, wherein the instructions, when executed by the at least one processor, cause the electronic device to:
    receive, from another external electronic device through the communication circuit, a registration mode switch request message requesting to switch an operation mode of the electronic device to a registration mode to register the electronic device at the server,
    switch the operation mode to the registration mode in response to receiving the registration mode switch request message, and
    transmit, to the server through the communication circuit, the registration request message in the registration mode.

* * * * *